(12) United States Patent
Mallur et al.

(10) Patent No.: US 9,146,729 B2
(45) Date of Patent: Sep. 29, 2015

(54) DEPLOYMENT AND UPDATING OF APPLICATIONS AND DRIVERS ON A CLIENT DEVICE USING AN EXTENSIBLE MARKUP LANGUAGE (XML) CONFIGURATION FILE

(71) Applicants: Muralidhara Mallur, Bangalore (IN);
Jyothi Bandakka, Bangalore (IN);
Sanmati Tukol, Bangalore (IN)

(72) Inventors: Muralidhara Mallur, Bangalore (IN);
Jyothi Bandakka, Bangalore (IN);
Sanmati Tukol, Bangalore (IN)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 109 days.

(21) Appl. No.: 14/083,986

(22) Filed: Nov. 19, 2013

(65) Prior Publication Data
US 2014/0082602 A1    Mar. 20, 2014

(51) Int. Cl.
*G06F 15/177*      (2006.01)
*G06F 9/445*       (2006.01)

(52) U.S. Cl.
CPC ... *G06F 8/65* (2013.01); *G06F 8/63* (2013.01)

(58) Field of Classification Search
CPC ..................................... G06F 8/65; G06F 8/63
USPC .......... 709/221, 203, 220, 248, 219; 717/171, 717/170, 173; 719/321; 707/609, 640, 610
See application file for complete search history.

(56) References Cited

U.S. PATENT DOCUMENTS

| | | | |
|---|---|---|---|
| 6,385,766 B1 | 5/2002 | Doran, Jr. et al. | |
| 6,523,103 B2 | 2/2003 | Page | 711/173 |
| 6,934,722 B1 | 8/2005 | Goshey et al. | |
| 7,293,272 B1 | 11/2007 | Okcu et al. | |
| 7,330,924 B1 | 2/2008 | Kao et al. | |
| 7,454,653 B2 | 11/2008 | Nicholson et al. | |
| 7,493,376 B1 | 2/2009 | Pulpatta et al. | |
| 7,756,953 B2 | 7/2010 | Pulpatta et al. | |
| 7,877,360 B2 | 1/2011 | Rohit et al. | |
| 8,225,306 B2 | 7/2012 | Kennedy et al. | |
| 8,612,516 B2 | 12/2013 | Mallur et al. | |
| 8,700,567 B2 * | 4/2014 | Watanabe et al. | 707/610 |
| 2002/0062287 A1 | 5/2002 | Katz et al. | |
| 2002/0066093 A1 * | 5/2002 | Yen et al. | 717/169 |
| 2002/0116497 A1 | 8/2002 | Tung | |

(Continued)

OTHER PUBLICATIONS

International Search Report and Written Opinion; PCT/US2012/050811; pp. 18, Oct. 26, 2012.

(Continued)

*Primary Examiner* — Jude Jean Gilles
(74) *Attorney, Agent, or Firm* — Baker Botts L.L.P.

(57) ABSTRACT

The deployment and updating of applications and drivers on a client device having a write-filter is described. A first deployment extensible markup language (XML) configuration file is obtained for deploying a first application or driver at the client device. A first application or driver is deployed on the client device based on the first deployment XML configuration file, while the write-filter of the client device is disabled. The write-filter is enablable to prohibit a file stored on the client device with the write-filter enabled from persisting across a reboot of the device. Following the deployment, automatic updating is performed by determining whether an autoupdate is available, obtaining a second deployment XML configuration file for updating the first application or driver, and updating the first application or driver based on the second deployment XML configuration file, while the write-filter is disabled. The automatic updating may be repeated.

20 Claims, 47 Drawing Sheets

(56) References Cited

U.S. PATENT DOCUMENTS

| | | |
|---|---|---|
| 2002/0120606 A1 | 8/2002 | Hose et al. |
| 2003/0018865 A1 | 1/2003 | Page .......................... 711/163 |
| 2003/0106051 A1 | 6/2003 | Morrison et al. |
| 2003/0120624 A1 | 6/2003 | Poppenga et al. |
| 2003/0158947 A1 | 8/2003 | Bloch et al. ................. 709/227 |
| 2004/0117338 A1 | 6/2004 | Kennedy et al. |
| 2004/0123285 A1 | 6/2004 | Berg et al. .................... 717/174 |
| 2004/0187103 A1 | 9/2004 | Wickham et al. |
| 2005/0027957 A1 | 2/2005 | Page et al. |
| 2005/0257214 A1 | 11/2005 | Moshir et al. |
| 2006/0053305 A1 | 3/2006 | Wahlert et al. |
| 2006/0075001 A1 | 4/2006 | Canning et al. |
| 2006/0184375 A1 | 8/2006 | Stone et al. ..................... 705/1 |
| 2006/0265756 A1 | 11/2006 | Campbell et al. |
| 2007/0169097 A1 | 7/2007 | Al Saadi et al. ............. 717/168 |
| 2007/0260699 A1 | 11/2007 | Sheshagiri et al. ........... 709/217 |
| 2008/0028390 A1 | 1/2008 | Fors et al. .................... 717/174 |
| 2008/0189446 A1 | 8/2008 | Pulpatta et al. |
| 2008/0292113 A1 | 11/2008 | Tian |
| 2009/0228471 A1 | 9/2009 | Dawson et al. |
| 2010/0250653 A1 | 9/2010 | Hudgeons et al. ............ 709/203 |
| 2011/0035754 A1 | 2/2011 | Srinivasan .................... 718/105 |
| 2011/0041124 A1 | 2/2011 | Fishman et al. |
| 2011/0219146 A1 | 9/2011 | Jacobson et al. |
| 2011/0238851 A1 | 9/2011 | Zhang et al. .................. 709/230 |
| 2011/0320504 A1 | 12/2011 | Marin ........................... 707/805 |
| 2012/0117109 A1 | 5/2012 | Bauernfeind et al. ........ 707/769 |
| 2012/0311263 A1 | 12/2012 | Kamath et al. ................ 711/118 |
| 2013/0198732 A1 | 8/2013 | Fujita ........................... 717/170 |
| 2015/0074561 A1* | 3/2015 | Zhou ............................ 715/760 |

OTHER PUBLICATIONS

International Search Report and Written Opinion; PCT/US2012/050973; pp. 9, Nov. 14, 2012.

International Search Report and Written Opinion ; PCT/US2012/38872; 12 Pages, Aug. 1, 2012.

Microsoft RemoteFX; Retrieved on Feb. 22, 2012 from http://technet.microsoft.com/en-us/library/ff817578%28WS.10%29.aspx, Feb. 22, 2012.

Driver Store (Windows Driver Kit); Retrieved on Feb. 22, 2012 from http://web.archive.org/web/20100924122613/http://msdn.microsoft.com/en-us/library/ff544868%28VS.85%29.aspx, Feb. 22, 2012.

* cited by examiner

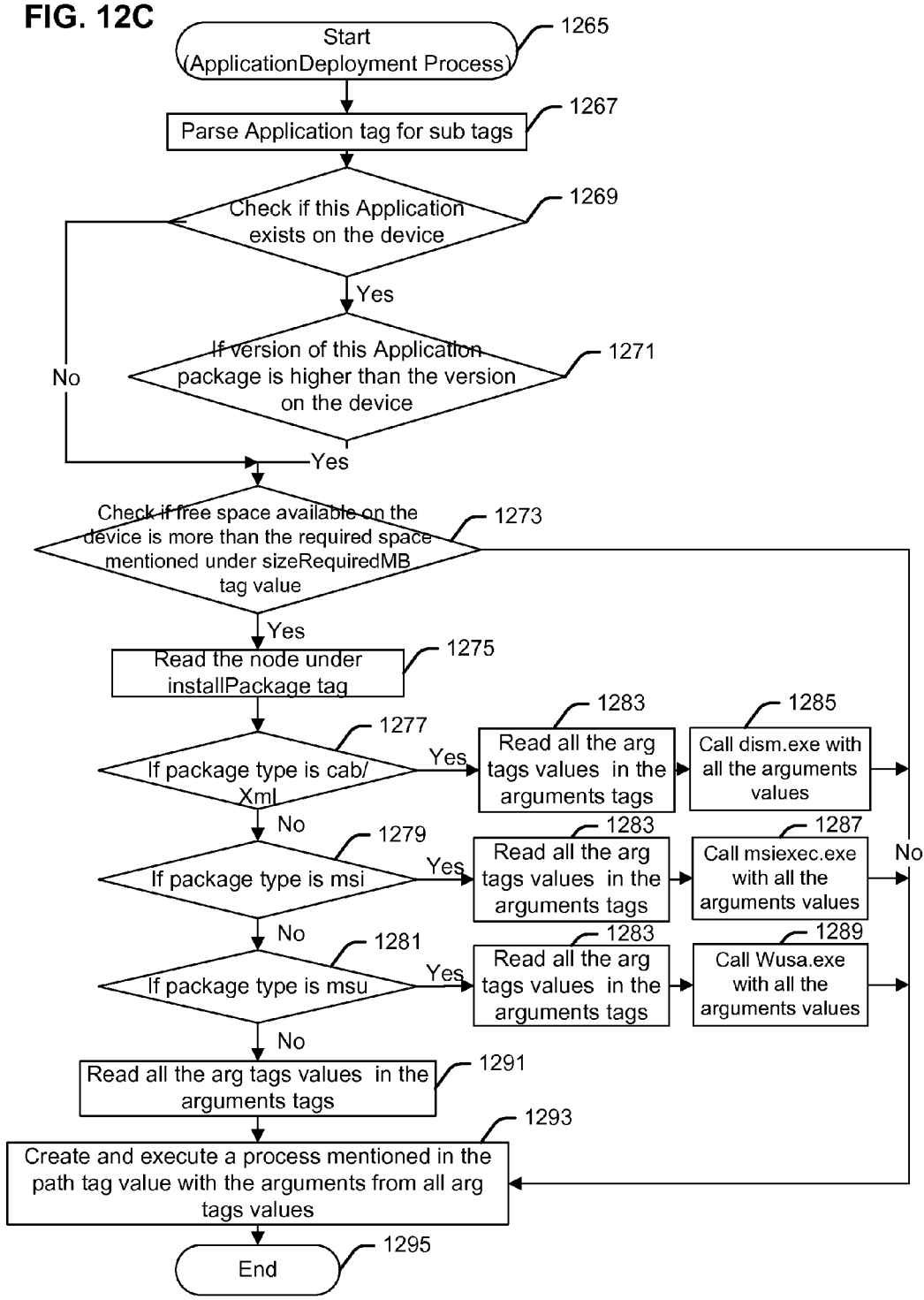

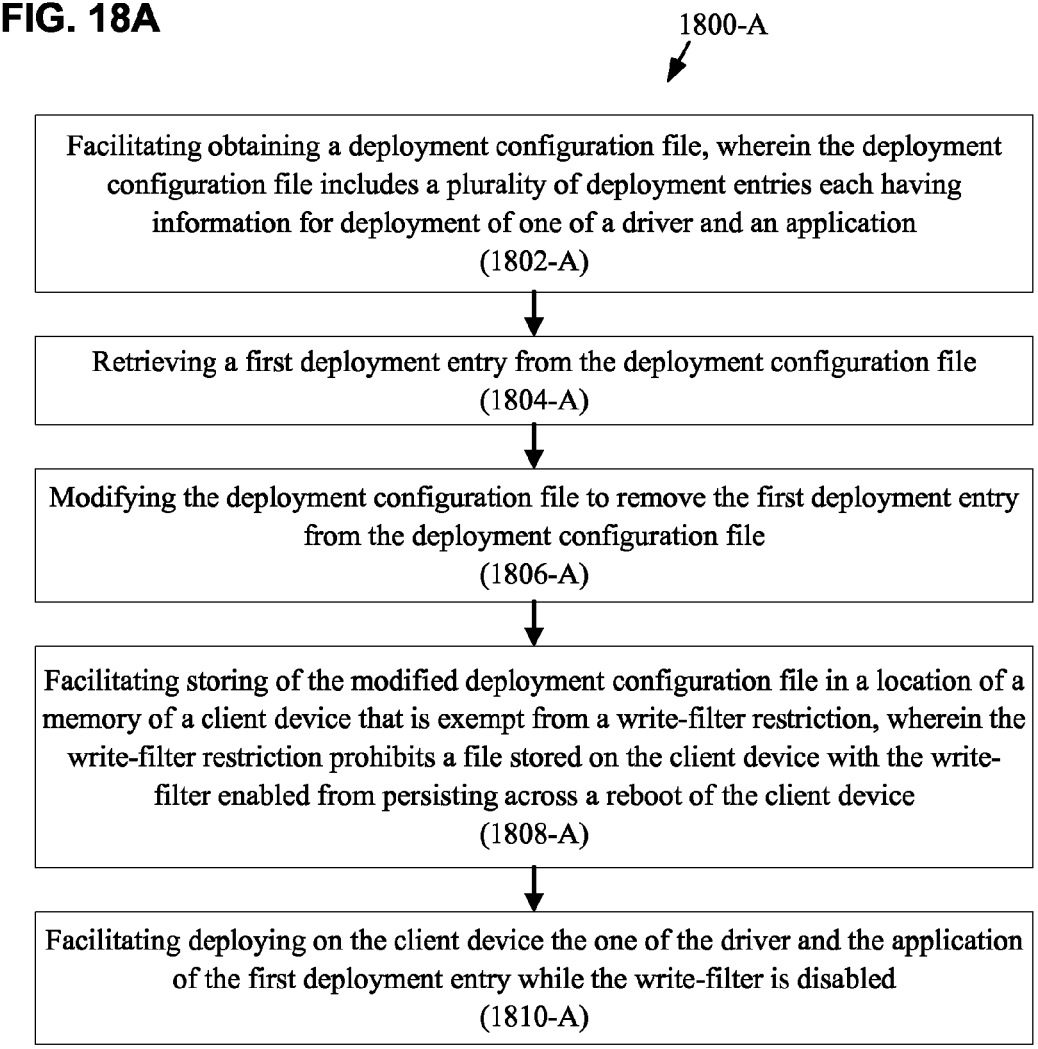

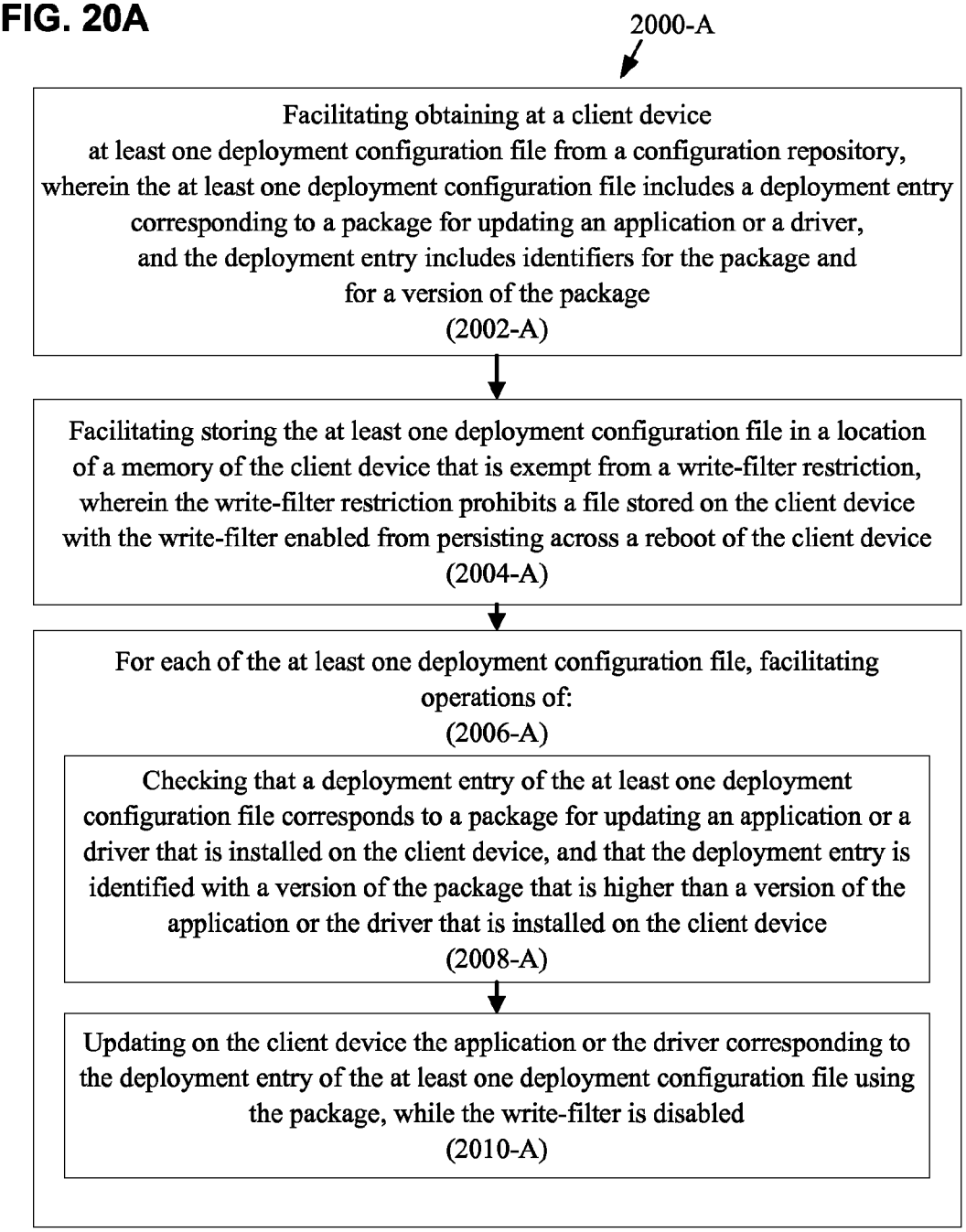

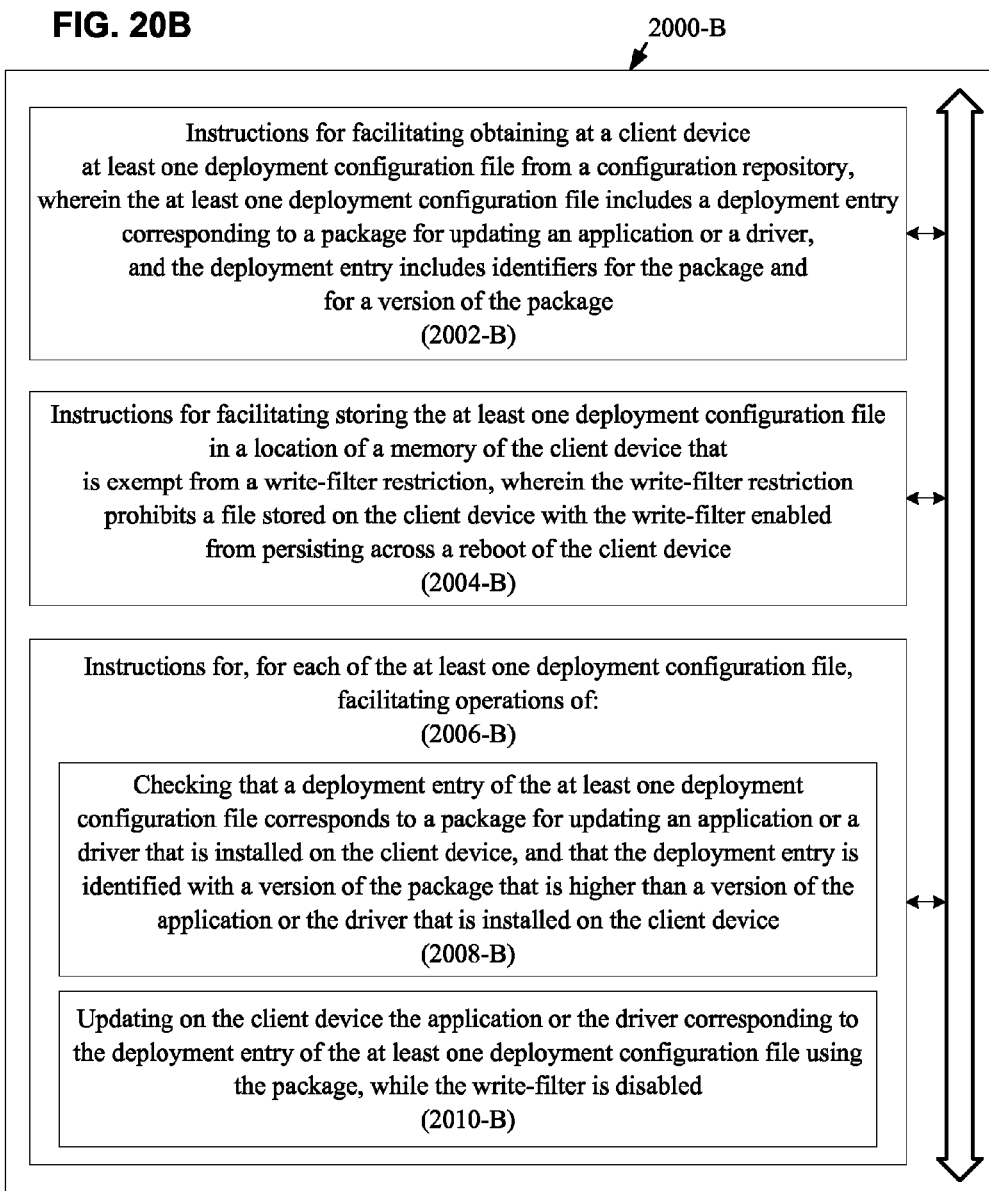

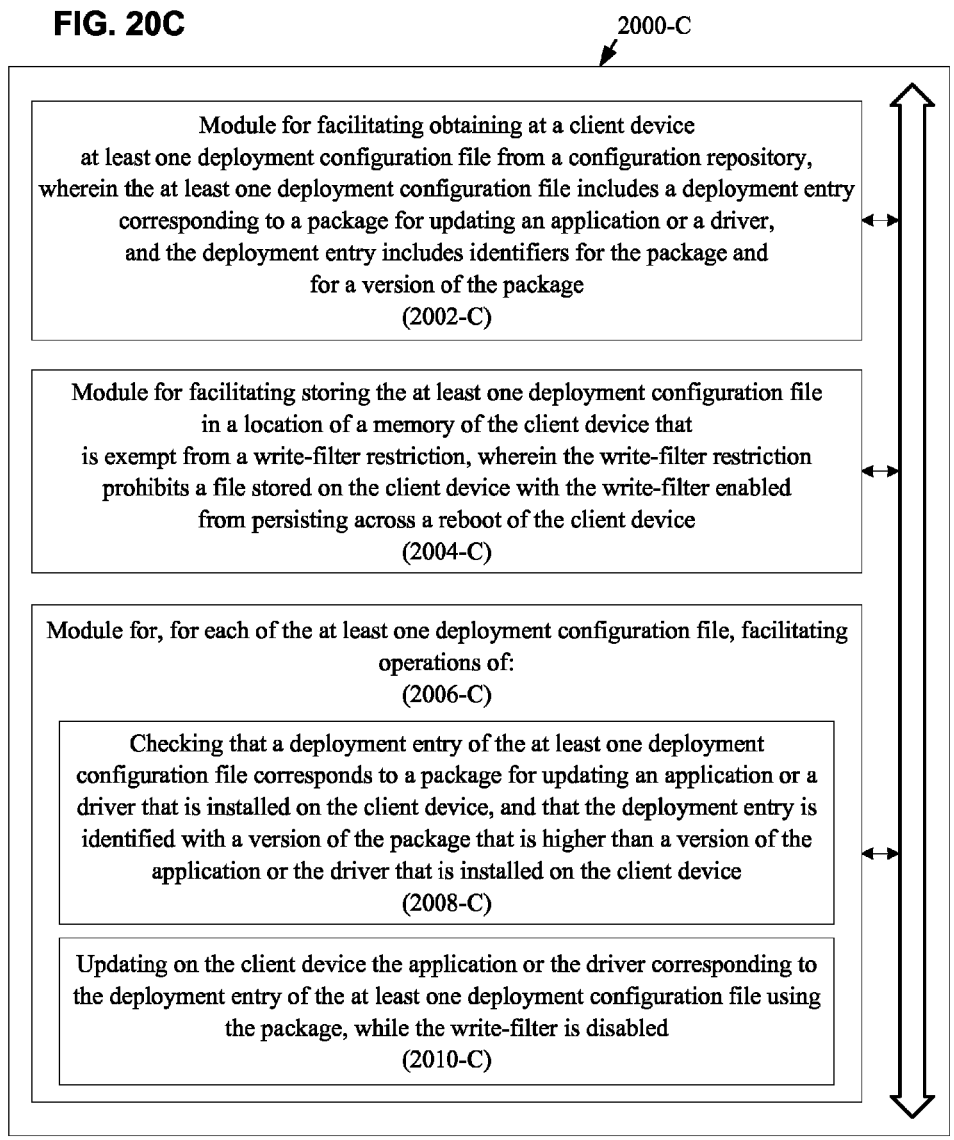

DEPLOYMENT AND UPDATING OF APPLICATIONS AND DRIVERS ON A CLIENT DEVICE USING AN EXTENSIBLE MARKUP LANGUAGE (XML) CONFIGURATION FILE

CROSS-REFERENCE TO RELATED APPLICATIONS

This application is a continuation of pending U.S. patent application Ser. No. 13/305,653 filed Nov. 28, 2011; the contents of which is incorporated herewith in its entirety by reference.

FIELD

The subject technology relates in general to configuration management, and more particularly to deployment and updating of applications and drivers on a client device using an extensible markup language (XML) configuration file.

BACKGROUND

In order for network administrators or system integrators to install, update, or otherwise maintain software applications and/or drivers on large numbers of thin client devices, the administrators are faced with two options. An administrator can install or update the software and/or driver on one device, create an image of the device, and copy the image to all similar devices. In this approach, however, the created image is configured for use on a single hardware platform only, and may not function properly if installed on a devices having a different hardware platform. As a result, a different image may need to be created for each different hardware platform maintained by the administrator, which may result in a large number of images needing to be created. In addition, a disk image may be a very large file, and the installation of the disk image on multiple client devices can result in the transfer of potentially very large image files to all devices. In order not to have to create a disk image for each different hardware platform, and in order not to have to transfer a large disk image file to each client device, the administrator can instead individually install or update the software applications and/or drivers on each device. The individual installation approach, however, is prohibitively time consuming especially when large numbers of devices or frequent updates/installations are concerned.

SUMMARY

Examples of methods and apparatus are provided for configuration management. For instance, examples of methods and apparatus are provided for, among others, deploying and updating of applications and drivers on a client device having a write filter using an extensible markup language (XML) configuration file.

In one aspect, an apparatus can include an update agent module of the target client device configured to obtain a first deployment extensible markup language (XML) configuration file for deploying a first application or driver at the client device, from a configuration repository having deployment XML configuration files for deploying applications and drivers on client devices and deployment XML configuration files for updating applications and drivers on the client devices. The update agent module can automatically deploy on the client device the first application or driver based on the first deployment XML configuration file, while the write-filter is disabled. The write-filter can be enablable to prohibit a file stored on the client device with the write-filter enabled from persisting across a reboot of the client device. Following the automatic deployment, the update agent module can perform automatic updating, by determining whether an autoupdate is available, obtaining from the configuration repository a second deployment XML configuration file for updating the previously deployed application or driver at the client device, and updating on the client device the previously deployed application or driver based on the second deployment XML configuration file, while the write-filter is disabled. The update agent module can then repeat the automatic updating.

BRIEF DESCRIPTION OF THE DRAWINGS

FIGS. 12A, 12B, and 12C illustrate examples of processes for automatically deploying drivers and/or applications on a client device using a deployment configuration file.

FIGS. 18A, 18B, and 18C are block diagrams representing examples of a method, a machine-readable storage medium encoded with instructions, and an apparatus for deploying a driver or an application on a client device having a write-filter, in accordance with one aspect of the disclosure.

FIGS. 20A, 20B, and 20C are block diagrams representing examples of a method, a machine-readable storage medium encoded with instructions, and an apparatus for automatically updating an application or a driver on a client device, in accordance with one aspect of the disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

General Organization

In general, the disclosure describes various illustrations of methods and systems for creating a master disk image configured for deployment on a plurality of hardware platforms, and for intelligently deploying and installing the master disk image on any of the hardware platforms. The master disk image includes device drivers and applications for each of the plurality of hardware platforms, and can be automatically configured for use on any one of the hardware platforms. The disclosure additionally describes various illustrations of method and systems for efficiently deploying software applications, drivers, updates (e.g., QFEs), and feature components (e.g., Microsoft feature components) to client devices, for example, running embedded clients in enterprise network environments. The disclosure is generally organized around four illustrations of methods (and associated systems) for performing the deployment.

Figure 3A:
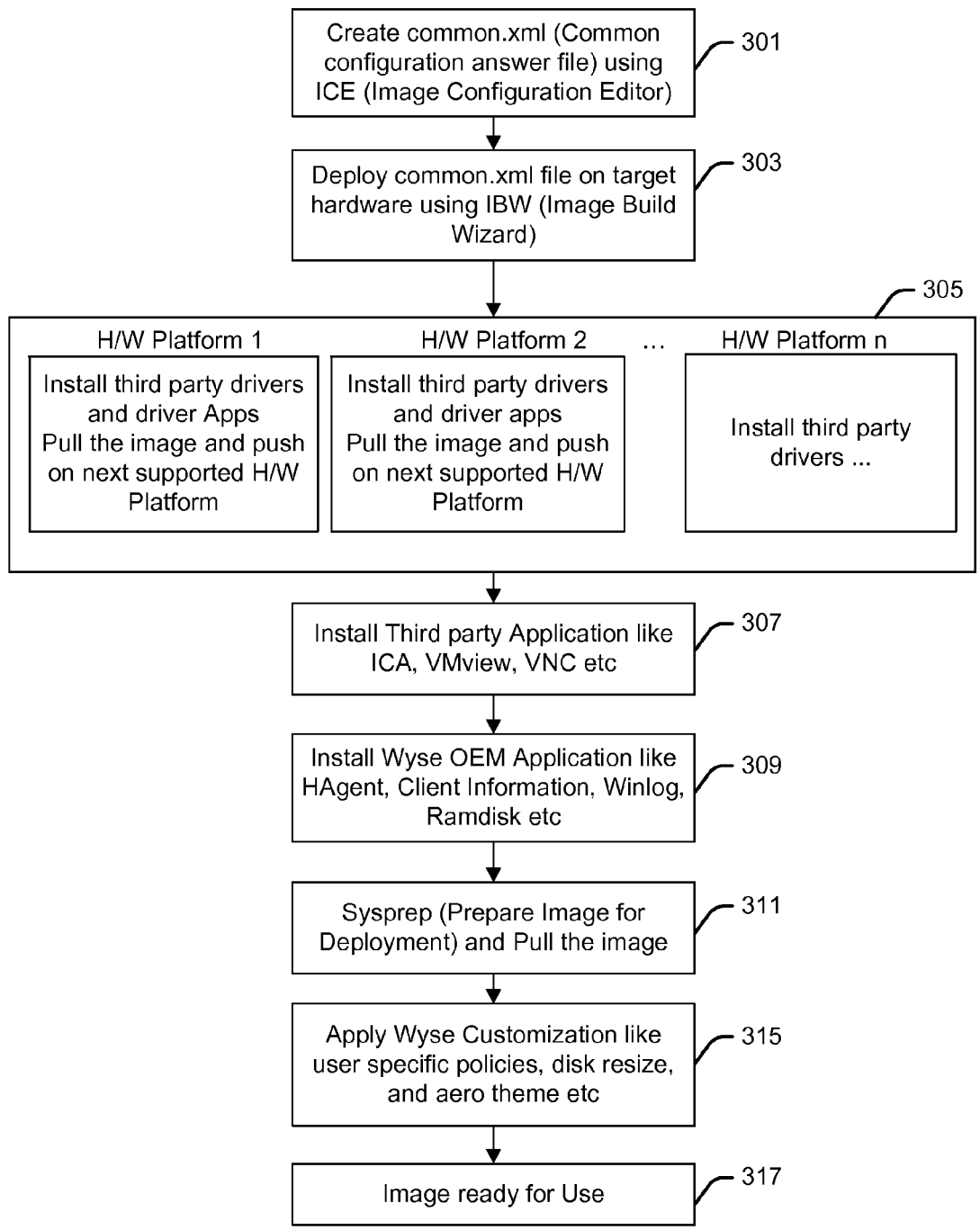
FIGS. 3A and 3B illustrate examples of processes for creating a disk image for installation on client devices having any of a variety of client platforms and installing the disk image on a client device having one of the client platforms.
Figure 3B:
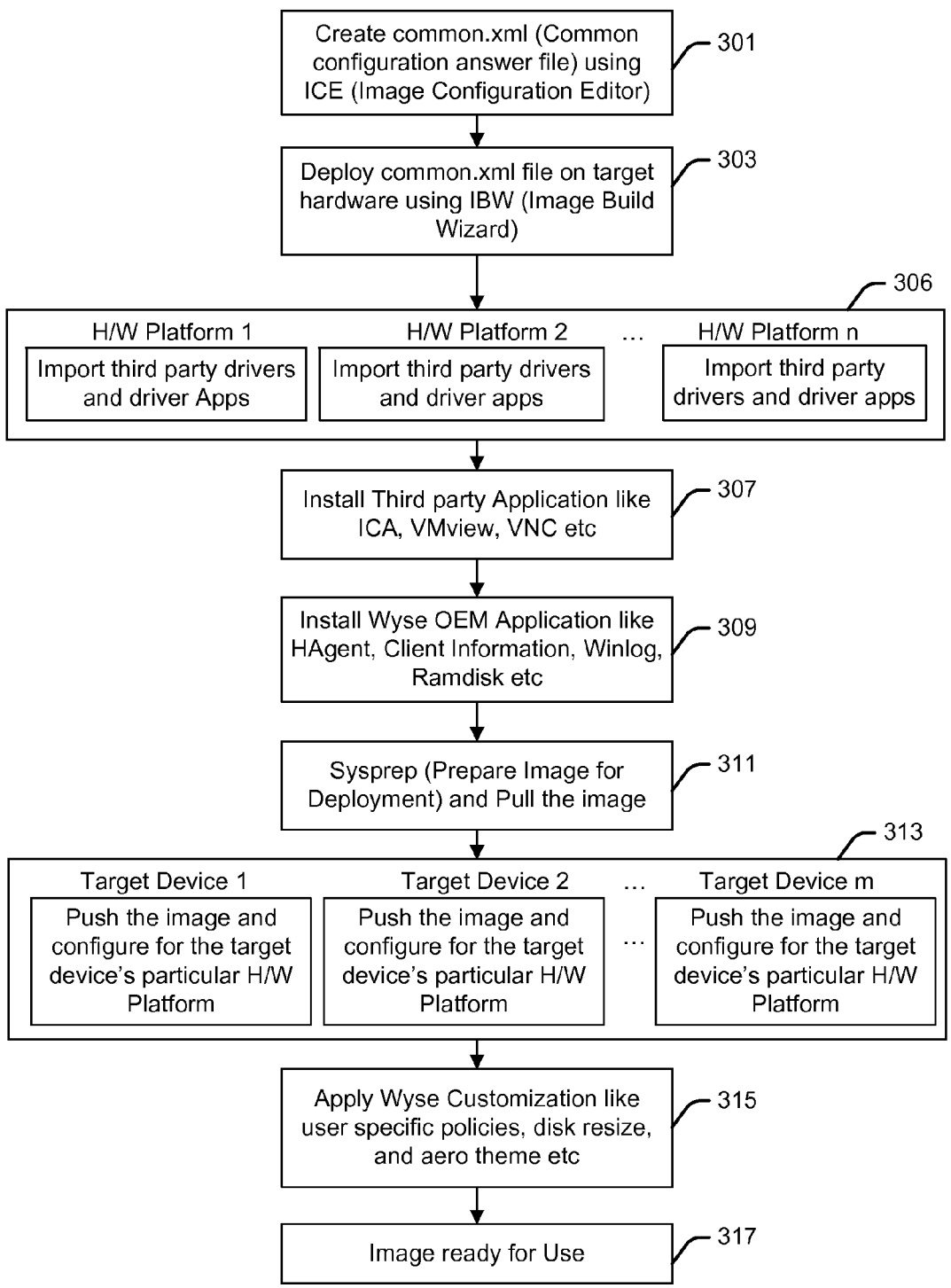

First Illustration:

According to a first illustration shown and described mainly in relation to the flow diagrams of FIGS. 3A and 3B, creation and installation of a disk image, including the applications and/or drivers for multiple hardware platforms, are described.

Figure 6A:
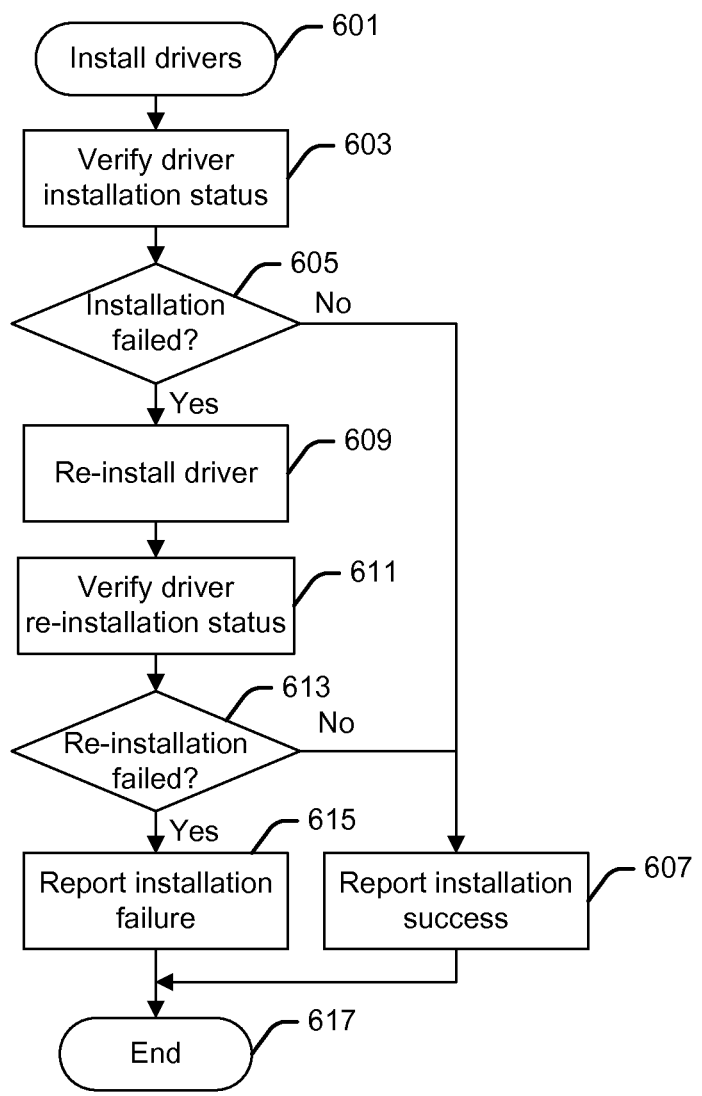
FIGS. 6A and 6B illustrate examples of processes for installing and verifying the installation of drivers on a client device.
Figure 6B:
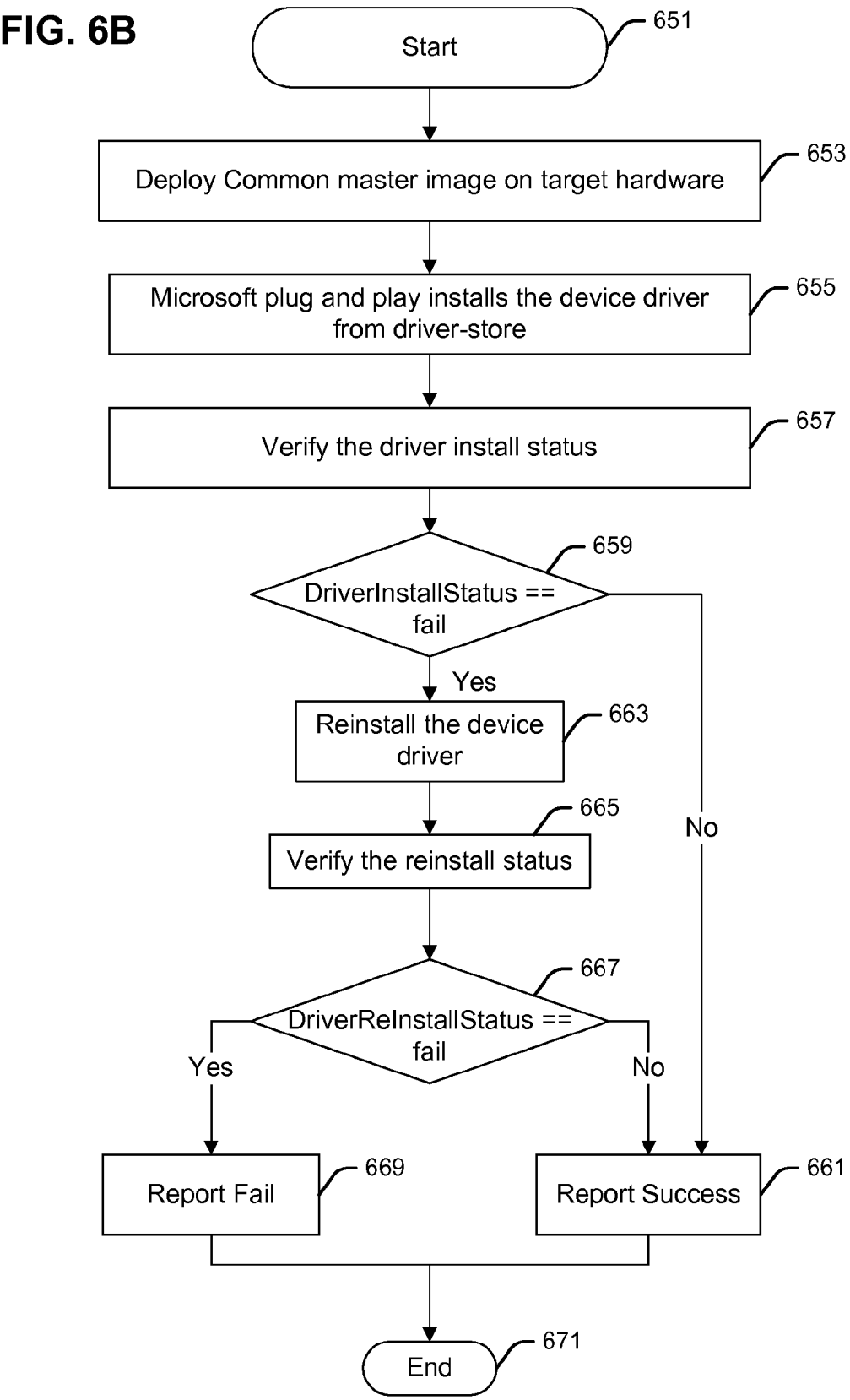
Figure 7A:
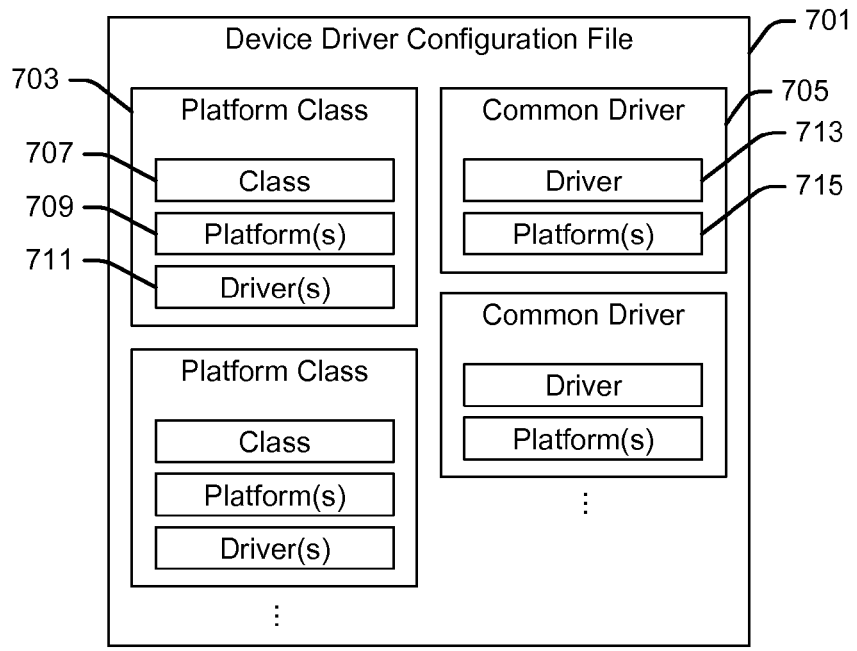
FIGS. 7A and 7B show examples of data structures respectively for storing a device driver configuration file and associated data, and for storing a disk-image and associated data.
Figure 7B:
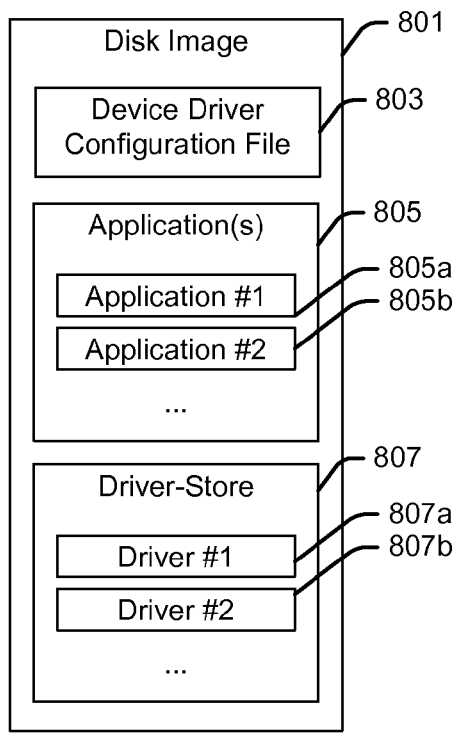

Second Illustration:

According to a second illustration for installing one or more applications and/or drivers on client devices having any of various hardware platforms, an image-build device is configured to create a disk image including the applications and/or drivers for each of the various hardware platforms. In the second illustration, the disk image includes a device driver configuration file. After copying the disk image onto a target client device and determining the particular hardware platform of the target device, those drivers included in the image for the particular hardware platform are installed on the device. The device driver configuration file is then used to remove unused drivers from the device. The creation of the disk-image according to the second illustration is shown and described mainly in relation to FIGS. 4A and 4B, while the installation and configuration of the created disk-image on a client device is described in relation to the flow diagrams of FIGS. 5A, 5B, and 5C. FIGS. 6A and 6B illustrate an additional aspect of the second illustration. FIGS. 7A and 7B show exemplary data structures used in the first and second illustrations.

Third Illustration:

According to a third illustration, one or more applications and/or drivers are installed directly on client devices having any of various hardware platforms. The third illustration is shown and described mainly in relation to the flow diagrams of FIGS. 10, 11, and 12A-12C. FIG. 12A provides a general flow diagram of a process for initiating the deployment of applications and/or drivers, while FIGS. 10 and 12B relate more particularly to the deployment of drivers and FIGS. 11 and 12C relate more particularly to the deployment of applications. Each device retrieves a deployment configuration file including information for the deployment of new or updated drivers or applications on the device. The device determines whether sufficient storage space is available on the device. The device then retrieves installation arguments from the deployment configuration file, and proceeds with the installation or upgrading of the applications and/or drivers.

Fourth Illustration:

Finally, according to a fourth illustration, one or more applications and/or drivers can be updated on client devices having any of various hardware platforms. The fourth illustration is shown and described mainly in relation to the flow diagrams of FIGS. 14A and 14B. Each device can locate an autoupdate folder on the device or on a repository server, retrieve a deployment configuration file from the folder, and automatically update or install a driver or application based on the deployment configuration file.

Figure 16A:
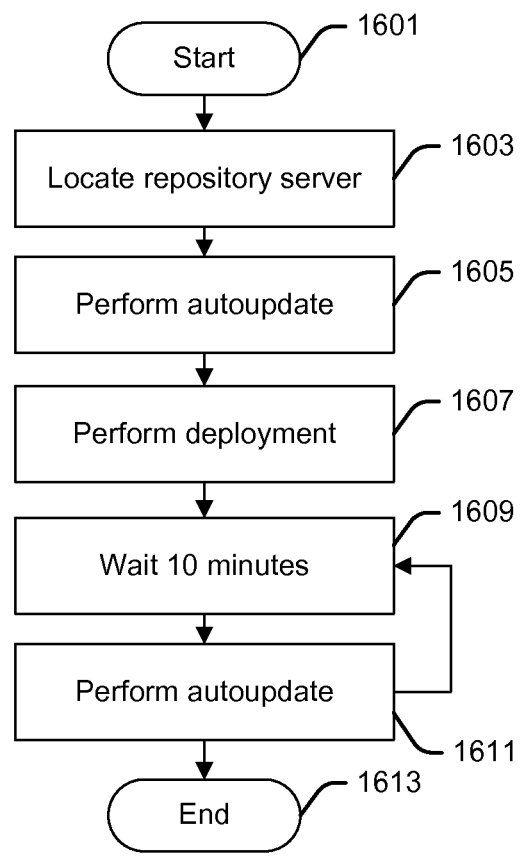
FIGS. 16A and 16B illustrate examples of processes for automatically updating and deploying drivers and applications on a client device.
Figure 16B:
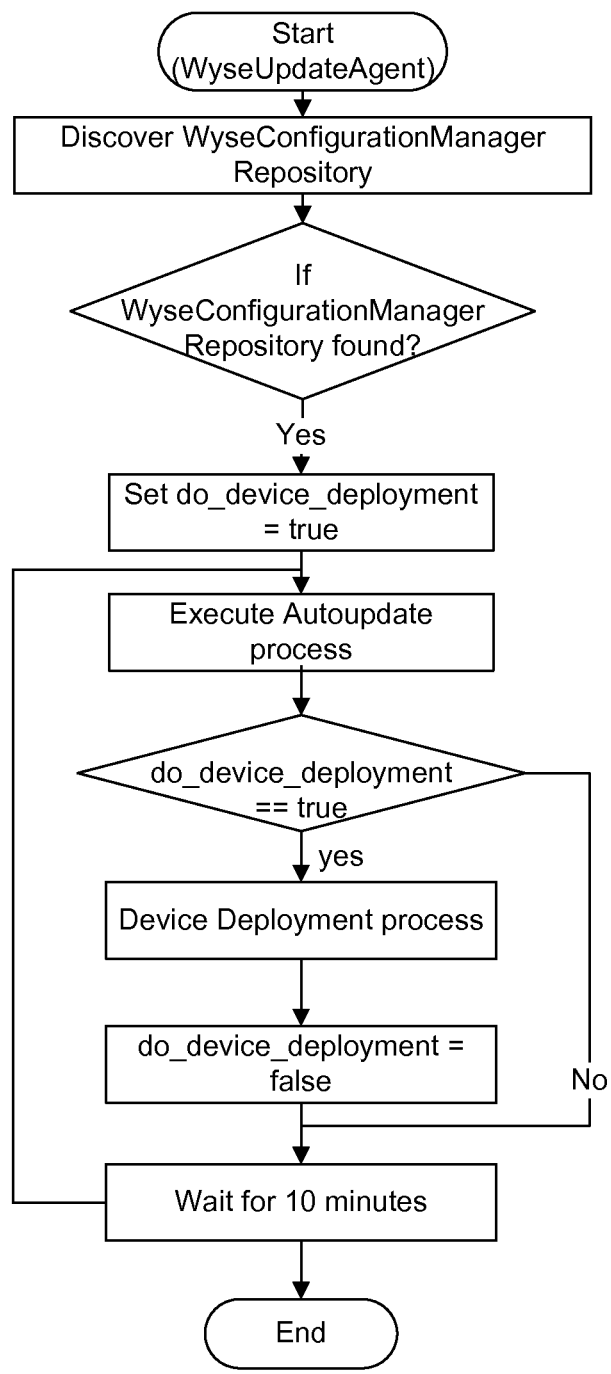

While the first, second, third and fourth illustrations are generally described in relation to the respective flow diagrams indicated above, the illustrations are not exclusively described in relation to those diagrams. Various steps, operations, elements, or features of each illustration may be described in flow diagrams other than those indicated above, and various steps, operations, elements, or features of one illustration may advantageously be used in the context of a different illustration. By way of illustration, FIGS. 16A and 16B show an exemplary process combining the teachings of the third and/or fourth illustrations.

The disclosure further includes figures showing general system elements for implementing the methods (see, FIGS. 1 and 2), data structures used in the various illustrations (see, FIGS. 7A, 7B, 13A, 13B, and 15), and components used in implementing the various illustrations (see, FIGS. 8A, 8B and 9A-9I).

Appendices:

In addition to the attached figures and accompanying detailed description, the disclosure includes five appendices which outline in further detail various aspects of the invention. Appendix A includes exemplary schema for device driver configuration files and deployment configuration files;

Appendix B includes exemplary device driver configuration files and deployment configuration files; Appendix C includes an exemplary products requirement specification; Appendix D includes an exemplary requirements specification for windows embedded standard 7-Release 2; and Appendix E includes an exemplary detailed design specification for a driver management application (such as an application named "Drvmgmt.exe") used to handle a driver-store and an intelligent third party driver installation based on the hardware platform.

Overall System

Figure 1:
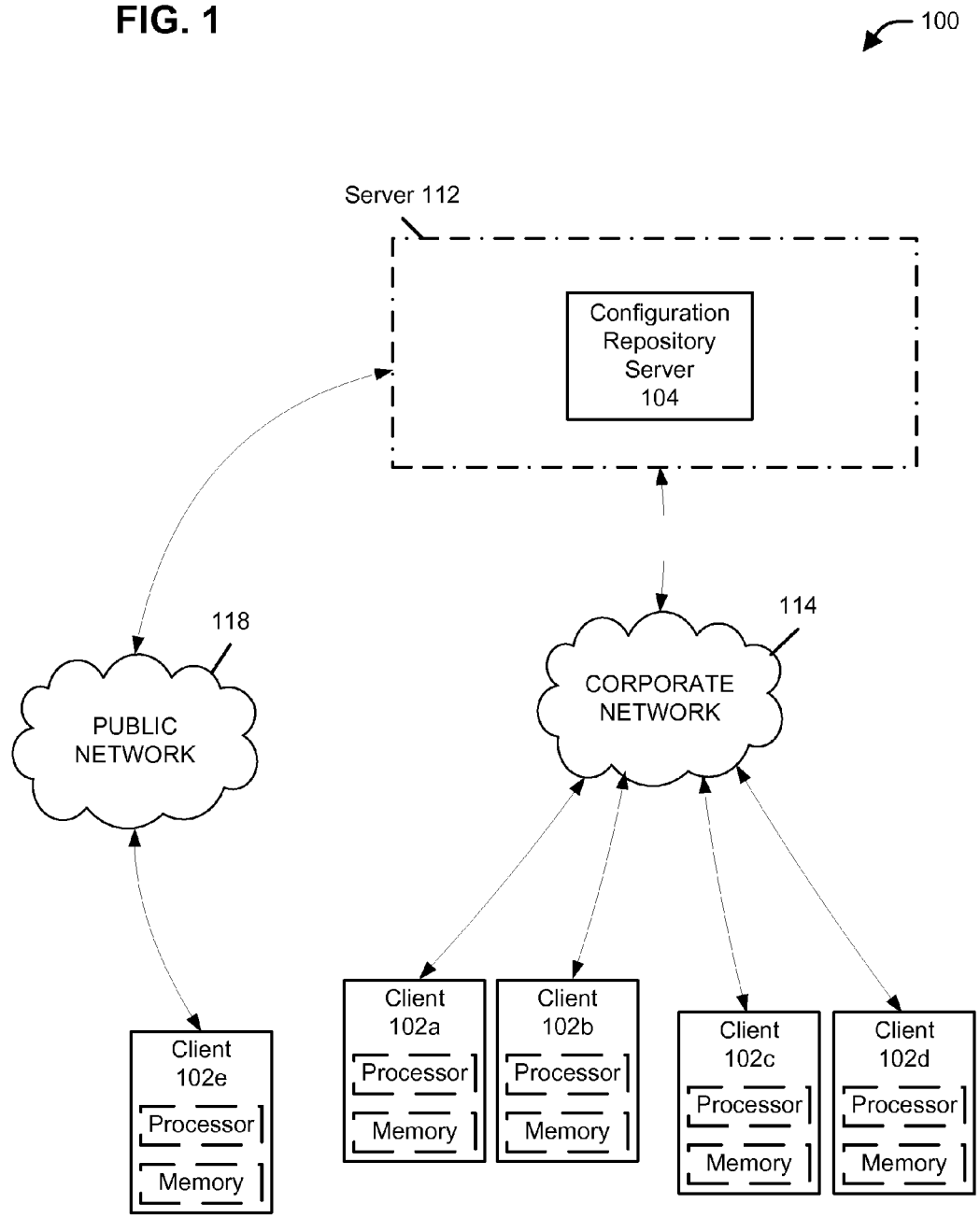
FIG. 1 illustrates an example of a system for deploying applications and/or drivers to a plurality of client devices running on various hardware platforms.

In one aspect, the creation of a disk-image including drivers and applications and configured for deployment on any of plurality of hardware platforms, the deployment of the disk-image on a particular target hardware platform, and the deployment of applications or drivers using device driver configuration files and deployment configuration files, can be generally performed by an enterprise system such as that shown in FIG. 1.

FIG. 1 illustrates an example of a system 100 for deploying applications, drivers, and/or disk images (e.g., disk images including applications and/or drivers) to a plurality of client devices running on various hardware platforms, in accordance with various aspects of the subject technology. The system 100 may include one or more client devices 102 (e.g., 102a, 102b, 102c, 102d, 102e) in communication with a server computing device 112 (server) via either a public network 118 or a corporate network 114. In some aspects, the server 112 is configured to allow remote sessions (e.g., remote desktop sessions) wherein users can access applications and files on the server 112 by logging onto the server 112 from a client device 102. Such a connection may be established using any of several well-known techniques such as the Remote Desktop Protocol (RDP) on a Windows-based server. In some aspects, the client devices 102 may communicate with the server 112 using file transfer protocol (FTP), hypertext transfer protocol (HTTP), hypertext transfer protocol secure (HTTPS), or other suitable protocols.

By way of illustration and not limitation, a client device 102 can represent a computer, a mobile phone, a laptop computer, a thin client device, a personal digital assistant (PDA), a portable computing device, or a suitable device with a processor. In one example, a client device 102 is a smartphone (e.g., iPhone, Android phone, Blackberry, etc.). In certain configurations, a client device 102 can represent a cashier device, an audio player, a game console, a camera, a camcorder, an audio device, a video device, a multimedia device, or a device capable of supporting a connection to a remote server. In one example, a client device 102 can be mobile. In another example, a client device 102 can be stationary. According to one aspect of the disclosure, a client device 102 may be a device having at least a processor and a memory, where the total amount of memory of the client device 102 could be less than the total amount of memory in a server 112. In one example, a client device 102 does not have a hard disk. In one aspect, a client device 102 may comprise flash memory instead of a hard disk. In one aspect, a client device may be one or more servers. In one aspect, a client device may include one or more client devices.

In one aspect, a client device has an associated hardware platform determined by the hardware and other components that form part of the client device. The hardware platform of a client device can be determined based on the particular models of processors, memories, and/or interface devices (e.g., display devices, graphics or audio cards, keypads or other input devices, wired or wireless networking interfaces and cards, card-readers, USB ports, bar code scanners, etc.) forming part of or installed on the client device. A hardware platform is commonly given a name (e.g., platform name "SATURN") and is associated with one or more hardware components which all client devices associated with the platform have. In one example, all client devices having a hardware platform named "SATURN" may have a Realtek high definition Audio card and an AM Radcon HD6310 graphics interface card, for example. Hardware platforms can be organized into classes, such that multiple hardware platforms having one or more components in common can be grouped into a class. For example, a hardware platform class named "R" can include platforms named "MERCURY" and "PLUTO", such that all client devices having hardware platform named either "MERCURY" or "PLUTO" form part of class "R". In some instances, each client device stores an identifier for the client device's hardware platform and/or hardware platform class. In other instances, however, the client device's hardware platform and/or class are determined by performing an inventory of hardware components installed on the client device, and determining the client device's hardware platform and class based on the results of the inventory.

In a preferred aspect, a client device 102 is a specific-purpose client device designed for a specific-purpose (rather than a general purpose). In a preferred aspect, a client device 102 is not a conventional personal computer (PC). In one aspect, a specific-purpose client device may be designed to perform one or a few pre-defined, dedicated functions. For example, a specific-purpose client device may be designed to perform less than 10 dedicated functions, less than 5 dedicated functions, less than 3 dedicated functions, or 1 dedicated function. A specific-purpose client device may be, for example, a client device designed as a cashier machine at a department store, a client device designed to carry out specific tests or measurements, a client device designed to carry out a specific medical application for diagnosis and/or treatment of a patient, etc. A specific-purpose client device preferably includes a write-filter that is enabled during its normal operation so that if a user (e.g., a cashier, not an administrator) changes any configuration of an embedded image of the client device, such change does not persist across a reboot.

In one aspect, a server 112 may represent a computer, a laptop computer, a computing device, a database, an in-house server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server) or a suitable device with a processor. In a preferred aspect, a server 112 is stationary. In another aspect, a server 112 can be mobile. In yet another aspect, a server 112 can be embedded. In certain configurations, a server 112 may be any device that can represent a client device. In a preferred aspect, the server 112 is not a client. In one aspect, a server 112 may include one or more servers, or functions of one or more servers.

In one example, a first device is remote to a second device when the first device is not directly connected to the second device. In one example, a first remote device may be connected to a second device over a communication network such as a Local Area Network (LAN), a Wide Area Network (WAN), and/or other network for remote operations.

When a client device 102 and a server 112 are remote with respect to each other, a client device 102 may connect to a server 112 over a public network 118 and/or the corporate network 114, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other remote network connection. The public network 118 or the corporate network 114 can be a LAN network, a WAN network, a wireless network, the Internet, an intranet or other remote network. A remote device (e.g., client device, server) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. But the subject technology is not limited to these examples.

In one aspect of the disclosure, a "client device" may be sometimes referred to as a client, a target client device, a target device, or vice versa. Similarly, a "server" may be sometimes referred to as a server device or vice versa.

In one aspect, the terms "local" and "remote" are relative terms, and a client device may be referred to as a local client device or a remote client device, depending on whether a client device is described from a client side or from a server side, respectively. In one aspect, devices placed on a client side (e.g., devices connected directly to a client device(s) or to one another using wires or wirelessly (e.g., using Bluetooth having a short range such as 35 feet or Infrared)) may be referred to as local devices with respect to a client device and remote devices with respect to a server. Similarly, devices placed on a server side (e.g., devices connected directly to a server(s) or to one another using wires or wirelessly (e.g., using Bluetooth having a short range such as 35 feet or Infrared)) may be referred to as local devices with respect to a server and remote devices with respect to a client device.

In some aspects, the server 112 may comprise a configuration repository server 104. Although the server 112 is shown as comprising only one server 104, one or more additional servers, such as a DHCP server, a DNS server, an application server, or the like, may be placed inside or outside of server 112. In some aspects, one or more of these servers may be combined together as a single server. In some aspects, the server 112 may also be referred to as an in-house server because the server 112 may primarily operate to communicate with clients 102a, 102b, 102c, and 102d over a private network such as the corporate network 114.

In some aspects, at least a portion of the server 112 may be accessible from the public network 118. For example, as shown in FIG. 1, the configuration repository server 104 is accessible from the public network 118. Thus, the client device 102e may communicate with the server 112 (e.g., the configuration repository server 104) via the public network 118.

In other aspects, one or more public servers (not shown) connected to the public network 118 may be accessible to client device 102e through public network 118, and/or to client devices 102a, 102b, 102c, and 102d through public network 118, server 112, and corporate network 114. The one or more public servers may perform functions substantially similar to any of the functions described herein as being performed by server 112 and/or configuration repository server 104.

According to various aspects of the subject technology, the clients 102 may each be running a windows-based embedded image, such as any of the Windows Embedded family of operating systems (e.g., Windows Embedded Compact, Windows Embedded Standard (WES), Windows Embedded Enterprise, Windows Embedded POSReady, Windows Embedded NAVReady, Windows Embedded Server, etc.) or other suitable embedded images.

In general, an embedded image may comprise a write-filter that may prevent one or more changes applied to the embedded image from persisting across a reboot of a client device running the embedded image. For example, an embedded image may comprise a write filter to allow one or more changes applied to the embedded image with the write-filter enabled, to be discarded when the client device is shut down. In some embodiments, the term "shut down" may refer to shutting down a machine. In another aspect, it may include logging off from a machine. In some embodiments, as used herein, the term "reboot" or "restart" may include situations in which a user logs off and logs back into a client device, or a client device is shut down and then powered back on. In one example, if a user applies a new wallpaper to an embedded image running on a particular client device, the new wallpaper does not remain on the embedded image after that particular client device has rebooted.

The write-filter may be enabled to ensure that a user does not make any permanent changes (e.g., changes that persist across a reboot) to an embedded image of a client device. Enabling the write-filter is beneficial because it allows an administrator to maintain a uniform configuration for all the embedded images of the client devices in a particular system. If a user makes changes to an embedded image of one of the client devices, then only that particular client device needs to be rebooted to reset that embedded image back to the original configuration that is uniform with the other embedded images of the other client devices. Another benefit of enabling the write-filter is that it may prevent harmful changes from being applied permanently (e.g., applied across reboot) to an embedded image of a client device. For example, if a user of a client device accidentally downloads a virus that causes harmful changes to an embedded image of the client device, then only that client device needs to be rebooted to reset the embedded image back to the original configuration that was not harmed by the virus.

Making a desired change to a client device, such as installing or updating applications or drivers, generally requires disabling of the write-filter followed by a reboot of the client device. After the reboot, the write-filter is disabled (or not enabled), and changes to the configuration of the client device can be made. To reinstate the write-filter protection, the write-filter is enabled and the client device is rebooted.

One or more files, folders, or other storage locations on a client device may be exempt from a write-filter restriction or write-filter function (i.e., that can pass through the write filter), such that data stored in those locations persist across a reboot of the client device even when the write-filter is enabled on the client device. Such folders or files may be referenced herein as locations which can pass through the write filter. Files and folders that are exempt from a write-filter restriction or function can be used, for example, to store an installation file or package that should be installed on the client device on a next reboot of the device. In one example, an installation file or package is stored in an exempt storage location, the write-filter is disabled, and the client device is rebooted, such that upon boot of the client device, the client device can install the file or package while the write-filter is disabled.

According to some approaches, in order to apply, to an embedded image, a change that persists across reboot, manual installation of software drivers, applications, and/or firmware updates of the embedded image is performed to create a customized embedded image having the desired change. The customization may be performed on a single client device, and the customized client device may be used to create a disk image. The disk image is then be pulled onto the server (e.g., at the server 112), and then the entire customized embedded image is deployed to all the required client devices (e.g., the client device 102). Thus, customization of an embedded image may involve creation of a customized embedded image, pulling of the customized embedded image from the source client device onto a server 112, transferring of the entire customized embedded image from the server 112 to a client device 102 and/or installing the entire customized image on the client device 102. However, an embedded image can be large in size. In addition, the embedded image may not be configured for the particular hardware platform or hardware configuration of the client device. Thus, transferring and installing an image may be impractical, especially when client devices have different hardware platforms or configurations.

For example, in a large cashier system comprising over 100 cashier machines as client devices, if an administrator wants to install a new cashier program on each embedded image running on each cashier machine, then the administrator may need to create a customized embedded image having the new cashier program on one of the source client device, pull the customized embedded image onto a server, and then transfer the customized embedded image, from the server, to each cashier machine for installation. However, if some cashier machines include hardware platforms or components that are different from those of the source client device and its embedded image (e.g., such as devices having different chipsets, different LAN interface cards, different displays or graphics cards), different embedded images may need to be created and transferred to the client devices having different hardware. If the administrator desires to make frequent changes, then new customized embedded images for each hardware platform or configuration may need to be transferred to each cashier machine each time a change is made.

According to various aspects of the subject technology, an embedded image is created which is configured for installation on client devices running on any of a variety of hardware platforms. The embedded image includes drivers required for each of the hardware platforms, and is configured to automatically install on a target client device those drivers required for the target device's hardware platform and remove drivers not required by the target device's hardware.

According to other aspects of the subject technology, after boot up of a client device 102 is initiated, a change may be automatically applied to an embedded image of the client device 102 without intervention by a user of the client device 102, thereby making the change appear to the user to be persistent across a reboot of the client device 102. Thus, aspects of the subject technology obviate reinstallation of an entire embedded image with the change onto the client device 102, and the problem of downloading and/or installing large images onto the client device 102 may be avoided. According to certain aspects, a configuration file (e.g., a device driver configuration file or a deployment configuration file) may be used to apply such a change to the embedded image.

System Diagram

Figure 2:
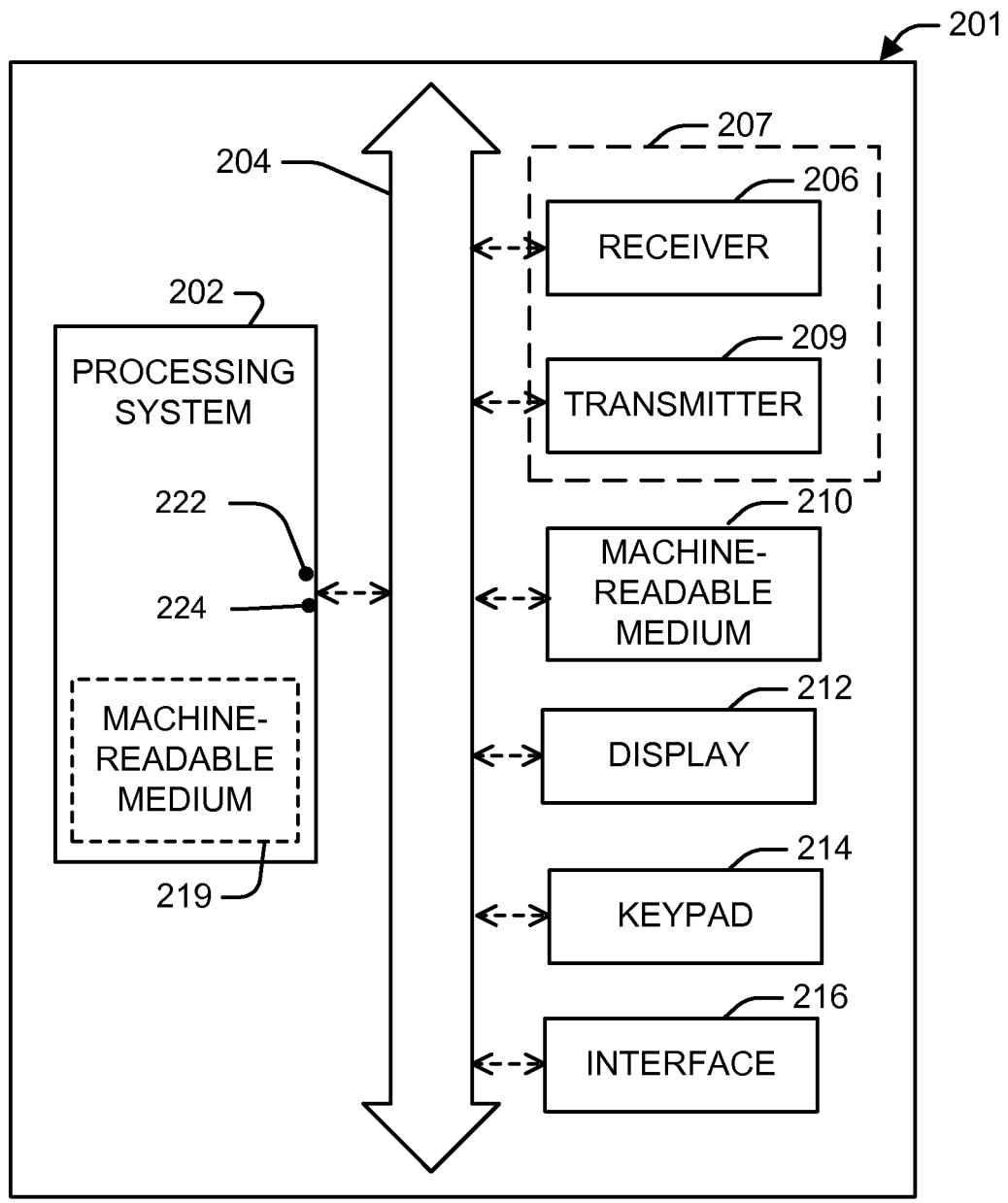
FIG. 2 is a conceptual block diagram illustrating an example of a system, in accordance with various aspects of the subject technology.

FIG. 2 is a conceptual block diagram illustrating an example of a system, in accordance with various aspects of the subject technology. A system 201 may be, for example, a client device (e.g., client device 102) or a server (e.g., server 112, 104, 106, 108, 110). The system 201 may include a processing system 202. The processing system 202 is capable of communication with a receiver 206 and a transmitter 209 through a bus 204 or other structures or devices. It should be understood that communication means other than busses can be utilized with the disclosed configurations. The processing system 202 can generate audio, video, multimedia, and/or other types of data to be provided to the transmitter 209 for communication. In addition, audio, video, multimedia, and/or other types of data can be received at the receiver 206, and processed by the processing system 202.

The processing system 202 may include a processor for executing instructions and may further include a memory or machine-readable medium 219, such as a volatile or non-volatile memory, for storing data and/or instructions for software programs. The instructions, which may be stored in a machine-readable medium 210 and/or 219, may be executed by the processing system 202 to control and manage access to the various networks, as well as provide other communication and processing functions. The instructions may also include instructions executed by the processing system 202 for various user interface devices, such as a display 212 and a keypad 214. The processing system 202 may include an input port 222 and an output port 224. Each of the input port 222 and the output port 224 may include one or more ports. The input port 222 and the output port 224 may be the same port (e.g., a bi-directional port) or may be different ports.

The processing system 202 may be implemented using software, hardware, or a combination of both. By way of example, the processing system 202 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A memory or machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 219) may include storage integrated into a processing system, such as might be the case with an ASIC. Machine-readable media (e.g., 210) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. Those skilled in the art will recognize how best to implement the described functionality for the processing system 202. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a non-transitory machine-readable medium, a machine-readable storage medium, or a non-transitory machine-readable storage medium. In one aspect, a computer-readable medium is a non-transitory computer-readable medium, a computer-readable storage medium, or a non-transitory computer-readable storage medium. Instructions may be executable, for example, by a client device or server or by a processing system of a client device or server. Instructions can be, for example, a computer program including code.

An interface 216 may be any type of interface and may reside between any of the components shown in FIG. 2. An interface 216 may also be, for example, an interface to the outside world (e.g., an Internet network interface). A transceiver block 207 may represent one or more transceivers, and each transceiver may include a receiver 206 and a transmitter 209. A functionality implemented in a processing system 202 may be implemented in a portion of a receiver 206, a portion of a transmitter 209, a portion of a machine-readable medium 210, a portion of a display 212, a portion of a keypad 214, or a portion of an interface 216, and vice versa. In one aspect, a system 201 may include only some of the components shown in FIG. 2 or a plurality of one or more components shown in FIG. 2.

Method for Creating and Deploying Images for Multiple Hardware Platforms

One approach used for deploying applications and/or drivers onto large numbers of target client devices consists in creating a disk image which includes all of the applications and drivers on one image-build client device, and copying the disk image onto all of the other target client devices so as to deploy the applications and/or drivers onto the target client devices. This approach, however, may prove to be limited in situations in which target client devices have different hardware platforms, and thus require different sets of drivers for the disk image to properly install on each client device's respective hardware platform.

To address these limitations, an approach has been developed to create disk images for deploying applications and/or drivers onto several target client devices having different hardware platforms. FIG. 3A is a flow diagram illustratively showing operations for creating a disk image for deployment on target client devices having different hardware platforms. The example of FIG. 3A is concerned with supporting multiple hardware platforms with a Windows Embedded Standard (WES) 7 Thin Client Image. However, the teachings of FIG. 3A may more generally be applied to client devices running other operating systems. The approach to support multiple hardware platforms with WES 7 thin client image is to build a common master image by installing all the third party drivers required for client devices' different hardware platforms, as described in the standard image build process below.

In accordance with the flow diagram of FIG. 3A, the process begins in operation 301 with the creation of a common configuration answer file (also referred to as a common configuration file, or "common.xml"). The common configuration answer file is an extensible markup language (XML) configuration file. The common configuration answer file is created using an image configuration editor (ICE). The common configuration answer file includes information on all components (e.g., Microsoft components) that should be included in the disk image, and can notably include the windows embedded feature set for the disk image. In general, the common configuration answer file identifies most or all of the components (such as Microsoft components, in the case of a Windows-based embedded operating system) that should be included in the build of the disk-image as part of the windows embedded feature set for the disk image.

In operation 303, the common configuration answer file is deployed onto a target hardware, for example by using an image build wizard. In general, the common configuration answer file is sent to a client device which is selected for creation of the disk image and is referred to herein as an image-build device. In some examples, however, the common configuration answer file can be deployed on other target devices or hardware.

In operation 305, the disk image creation process begins by identifying, for each of the plurality of hardware platforms to be supported by the disk image (e.g., hardware platforms 1 through n), drivers and driver applications associated with each of the platforms. Once the drivers and driver applications are identified, they can be copied onto and/or installed on the image-build device, so as to include all of the drivers and driver applications for each of the hardware platforms on the disk image being created. The drivers and driver applications can be drivers and applications created by third-party entities, such as manufacturers of the devices and other hardware components of each of the hardware platforms, by developers of drivers and applications for the hardware components, or other entities. Operation 305 further includes, for each of the plurality of hardware platforms to be supported by the disk image, pulling the disk image from the image-build device, and pushing the disk image onto a next supported hardware platform.

The creation of the disk image continues in operation 307, with the installation of applications onto the image-build device, such as third party applications (e.g., a citrix "ICA" application, a desktop virtualization application such as "VMView", a remote support software or virtual network computing "VNC" software). In operation 309, additional proprietary applications are installed on the image-build device, such as original equipment manufacturer (OEM) applications (e.g., HAgent, Client Information, Winlog, Ramdisk). The OEM applications may be applications supplied by a manufacturer of the target client devices, a reseller of the target client devices, an entity charged with loading drivers, applications, and software on the client devices, or any other entity involved in supplying and supporting the target client devices. The application may additionally or alternatively include one or more scripts, such as scripts used for implementing or applying customizations on each target client device that the disk-image is deployed on to.

Once drivers for each of the hardware platforms supported by the disk image, and applications to be included in the disk image, have been installed or copied onto the image-build device, the disk-image creation process is complete. The disk-image is therefore prepared for deployment and pulled from the image-build device in operation 311. The preparation of the disk-image can be completed by an application or utility which may be referenced herein as "Sysprep". The preparation may include identifying the files and folders stored on the image-build device that should be included in the disk-image, and creating the disk-image with the identified files and folders. The disk image can be deployed to a target client device using any remote management software mechanism. The preparation can also include compressing the disk-image.

Following the preparation and pulling of the image (operation 311), the image can be deployed on each of the target client devices. Once the image is deployed onto or accessible from the target client device, customizations may be applied on the target client devices (operation 315), such as proprietary customization for user-specific policies, disk resize, aero theme, and the like. The customization may be performed based on information contained in the disk image (e.g., based on one or more scripts loaded as part of the disk-image), or based on information from other sources. Following customization, the image is ready for use in operation 317.

FIG. 3B shows a second exemplary process for creating a disk image for deployment on target client devices having different hardware platforms. The flow diagram of FIG. 3B includes operations that are substantially similar to similarly numbered operations of FIG. 3A.

In the diagram of FIG. 3B, however, operation 305 of FIG. 3A has been replaced by new operation 306. In operation 306, the disk image creation process begins by identifying, for each of the plurality of hardware platforms to be supported by the disk image (e.g., hardware platforms 1 through n), drivers and driver applications associated with each of the platforms. Once the drivers and driver applications are identified, they can be copied onto or imported on the image-build device, so as to include all of the drivers and driver applications for each of the hardware platforms on the disk image being created. The drivers and driver applications can be copied or imported into a dedicated folder, storage location, or storage device of the image-build device which can be referred to as a driver-store. The drivers and driver applications can be drivers and applications created by third-party entities, such as manufacturers of the devices and other hardware components of each of the hardware platforms, by developers of drivers and applications for the hardware components, or other entities. Upon importing the third-party drivers and driver applications on the image-build device for each of the hardware platforms, operation proceeds to operation 307.

The flow diagram of FIG. 3B further includes an additional operation 313 interposed between operations 311 and 315 of FIG. 3A. In operation 313, the image is pushed onto or pulled onto each of the target client devices (target devices 1 through m) having an associated hardware platform. The image can be received on each target client device from the image-build device (which can be a server), for example, upon determining that an image is stored in the image-build device. The image can alternatively be copied onto each of the target client devices, or otherwise transferred to the target client devices (e.g., through a network connection to server 112, through a USB flash drive connected to the client device, or the like). Once the image is copied onto or accessible from the target client device, the disk image can be configured for the particular hardware platform of the target client device, for example by installing drivers for the hardware components of the client device. Customizations may be applied on the target client devices (operation 315), such as proprietary customizations for user-specific policies, disk resize, aero theme, and the like. Following customization, the image is ready for use in operation 317.

The installation of all third party device drivers of all supported platform described in relation to FIGS. 3A and 3B can result, in one example, in the creation of an Embedded standard 7 Thin Client master common image. By including drivers for all supported platforms, however, the approaches presented in FIG. 3A can create negative impacts on storage space on solid-state drive (SSD) flash or other storage drives on the target client devices, and can also create problems related to driver overlap and driver conflict, thus negatively affecting the image performance of target client devices and negatively affecting the image build process time. In order to overcome some of these issues, an improved approach to creating disk-images for deployment on multiple hardware platforms is described in relation to FIGS. 4-6 below. The improved approach provides intelligent third party device driver installation based on the hardware platform using a driver-store.

The approaches shown in FIGS. 3A and 3B support third party drivers and/or applications by developing a custom image where all the drivers and applications are installed on one thin client on top of a standard build, pulling the image of the thin client from the device, and pushing the image onto all the other target thin client devices. The approaches, however, have the disadvantage that they cannot efficiently be used for maintenance, for example to update applications or drivers on thin client devices. In addition, the approaches cannot be used to customize a client device or install a device driver on a thin client that is already in use. When thin clients are deployed at customer places, if a customer needs to add a custom application or a device driver, the customization is a tedious process.

The customization can be done in three exemplary ways. In a first method, a person manually installs the applications or device drivers on each of the thin clients. This first method presents a very tedious process if the customer has hundreds of thin clients. In a second method, the customization is installed on one thin client, and the firmware is pulled off of that device and deployed to remaining other devices. This second method, however, is very time consuming since the firmware deployment can take significant time as the size of the image grows bigger and bigger (typical image sizes may range from 2 GB, to 4 GB and beyond). In addition, in cases in which there are updates to the application or driver, the second method requires repeating of the entire image creation and installation processes with the latest version of application or driver. The third method provides a custom firmware prepared by field engineers, in which the customized firmware contains customer applications and drivers preinstalled. The custom firmware is released to the customer, and to a factory where thin clients are programmed with the custom firmware for a particular customer shipment during manufacturing of the thin clients. This third approach requires additional effort, because different people like field engineers and quality engineers have to be involved in preparing and validating the firmware. Additionally, the entire process needs to be repeated if any new versions of an application or driver need to be deployed later. In each of the three methods, either a proprietary management software or a manual process of updating the component on the device is required if there are any newer versions of the components available, such as standard components of the firmware or proprietary specific components.

To overcome these issues and the limitations of the approaches presented above, three new approaches are introduced. In accordance with two of the new approaches, a customer creates a configuration file (e.g., a file such as "DeviceDeploymentConfig.xml" (which can be referred to as a deployment configuration file or a device deployment configuration file), or the like) having proper information relating to the different applications and device drivers that the customer wants to deploy on the thin client, the configuration file identifying appropriate packages for installation of the applications and devices that are kept in a configuration repository such as a repository server (e.g., server 112, or configuration repository server 104). When a thin client device boots up, the device automatically retrieves the device deployment configuration file, and performs the deployment onto the thin client device.

In accordance with a third one of the new approaches, a customer can simply update components or application packages stored in the configuration repository to the latest version of the components or applications released by a proprietary vendor. A thin client device automatically retrieves or picks the updated components or application packages from the configuration repository, and proceeds to update the components or applications during the device's booting process.

The three new approaches overcome various limitations presented by other approaches. In one aspect, the new approaches may overcome the following limitations. First, in the other approaches, if any updates to drivers or applications are available, then the upgrade of drivers, applications, or other components is performed on one client device, an image of the client device is pulled, and the image is deployed onto all other client devices again. The time it takes for pulling the image or imaging the device is high, and the time depends on the size of the flash or image. The deployment of the image on client devices or units that are located in a customer environment will depend on (or be performed by) either a proprietary device manager or a simple USB imaging tool. The proprietary device manager is a management software which can be used for remote deployment of mass imaging job. The updating of components on thin clients can be highly dependent on the device management software to schedule the updates of the add-ons on to the device. If a customer is not using the device management software, then the customer may have to update the complete image which contains the latest components using some other imaging tool from like a USB imaging tool. The simple USB imaging tool can be straightforward to use, but its use may be tedious if the number of client devices that need updating of an image is large. The new approaches may be helpful because automatic updating of components has not always been supported in WES 7 based thin clients. As a result, components on WES 7 based thin clients have, at times, been updated only using remote management software.

In one aspect, one of the new approaches makes a master image, such as a Windows thin client master image, both portable and intelligent by preloading the device drivers into a driver-store repository of the image, such as a driver-store repository of the WES 7 thin client master image. When the master image is deployed onto a target or destination client device, the new approach configures the target device image appropriately by installing all required device drivers from the driver-store, and removing remaining other drivers (i.e., drivers included in the master image but not installed on the target client device) so that the storage space on the target client device (e.g., flash space) is used efficiently and effectively. Since only drivers required by the target client device are installed, the incidence of conflicts of drivers and performance issues on the target thin client device are reduced.

The new approaches may further use an extensible markup language (XML)-based deployment support to third party applications and for managing the device drivers on the client, for example to deploy a WES 7 Thin client Runtime Image. The XML-based deployment support can reduce the demand for custom images that were previously required when a customer wanted to integrate any third party device drivers or applications on thin client images of WES 7 based thin clients. The XML-based deployment further reduces support engineers' or field engineers' burden of preparing a custom image and performing the custom image's maintenance. The XML-based deployment therefore helps to minimize management load presented by thin clients.

Finally, the new approaches can perform automatic updating of thin client components and applications. The automatic updating minimizes the management required for WES 7 based thin clients where there will not be any dependency of management software to manage WES 7 based thin clients.

Embedded Image Creation and Installation

To address the problems mentioned above, an improved method for creating a master image for deployment of client devices (such as thin clients) is presented. The method creates a master disk-image, also referred to as a Windows thin client master image, that is both portable and intelligent by preloading all device drivers needed by a variety of hardware platforms into a driver-store repository of the disk-image. When the master image is deployed onto a target or destination device, the target device configures the device image appropriately by installing the required device drivers for the target device's hardware platform from the driver-store. An application (e.g., an application referenced herein as "drvmgmt.exe") is executed during the deployment to remove the other drivers which are not required on the target client device. The application performs the removal of the other drivers based on a device driver configuration file (e.g., a file named "DriverConfig.xml", and specifying which drivers should be installed on each hardware platform). The application also supports other functions such as installing of drivers, enumerating of drivers, removal of drivers, or the like, such that the application can be used for all kinds of driver deployment functions.

Figure 4A:
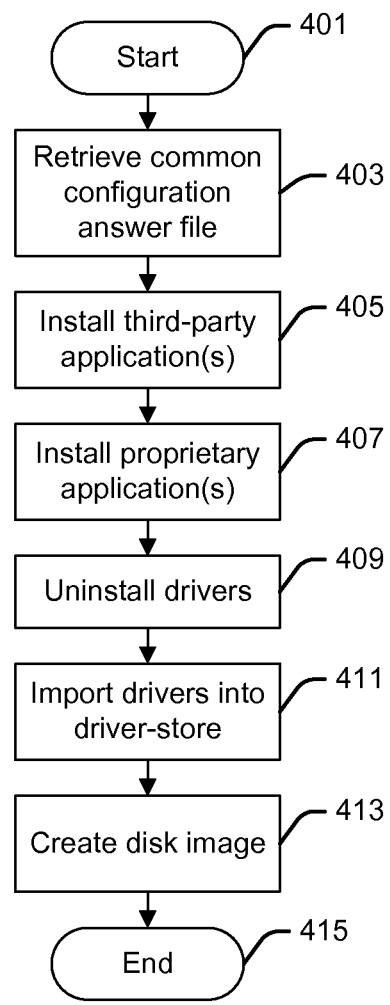
FIGS. 4A and 4B illustrate examples of processes for creating a disk image for installation on client devices running any of a variety of client platforms.

FIG. 4A shows an exemplary process for creating a disk image (or master image) for installation on target client devices having any of a variety of client hardware platforms. Once created, the disk image is configured to automatically install applications and drivers on target devices running any of a variety of hardware platforms. For this purpose, the created disk image includes drivers and applications for each of the variety of hardware platforms.

The disk image creation process can be performed by an image-build module of an image-build device, and the process begins in operation 401 on an image-build device. In general, the image-build device is a client device, such as client device 102, which has or runs an image-build module. However, the image-build device can also be a server, such as server 112, or another appropriate device having a memory for creating the master disk image.

In operation 403, a common configuration answer file is retrieved on the image-build device. The common configuration answer file includes information on all components (e.g., Microsoft components) that should be included in the disk image, and can notably include the windows embedded feature set for the disk image. The common configuration answer file is substantially similar to that described in relation to operations 301 and 303 of FIG. 3A above.

In operations 405 and 407, third-party applications and proprietary (or original equipment manufacturer) applications are installed on the image-build device. In particular, the applications may be installed on a memory of the image-build device, such as machine readable medium 210 for examples in which image-build device is a system such as that shown in FIG. 2. Following the installation of the applications, pre-existing drivers are uninstalled from the image-build device in operation 409. The pre-existing drivers are drivers included on the image-build device, and that were previously installed on the image-build device for example as part of the installation of an operating system, of applications (such as applications installed in operations 405 and 407), of hardware components, or the like. In an example in which the build-device runs a WES 7 thin client, the pre-existing drivers may include Microsoft compatible drivers that were preloaded on the device as part of an operating system installation.

The image-build process proceeds to operation 411, in which drivers are imported into a driver-store of the image-build device. In general, all drivers required for installation of the master disk-image on the hardware platform of any of the target client devices are imported into the driver-store. In one aspect, operation 411 can rely on a device driver configuration file, which stores associations of drivers with each of the hardware platforms of target client devices, to identify and import drivers to include in the driver-store. Both drivers associated with one or more classes of hardware platforms identified in the device driver configuration file, and common drivers associated with two or more hardware platforms identified in the device driver configuration file, can be imported into the driver-store. The driver-store can be, for example, a folder in a memory of the image-build device which is used to store setup information files (e.g., ".inf" files) related to drivers.

Once all drivers are imported into the driver-store, the disk-image is created in operation 413. The disk-image is generally created based on the contents of a memory of the image-build device, such as a machine-readable medium of the image-build device storing the applications installed in operations 405 and 407 and the drivers imported into driver-store in operation 411. In operation 413, the image can be prepared for deployment, and pulled from the image-build device for later transmission or deployment to target client devices. The pulled disk-image can be stored in a server (e.g., in server 112), for example, for later deployment to any of target client devices 102a-102e. The disk-image creation process then ends in operation 415. All operations shown in FIG. 4A may be performed automatically without the intervention of a user.

In one aspect, the exemplary process of FIG. 4A can include an additional operation for importing a device driver configuration file on the image-build device. The device driver configuration file can be imported, for example after completing operation 411, into a memory of the image-build device. The device driver configuration file specifies association between drivers and hardware platforms, and is in particular used to identify drivers to install on a target client device based on the client device's hardware platform. The device driver configuration file can be used during the process of installing a disk-image on a particular target client device (see, e.g., the description relating to FIGS. 5A-5C below).

In some instances, the device driver configuration file includes configuration data for several classes of hardware platforms, each class being identified by a class name. For each class, the configuration file lists the one or more platforms associated with the class, and one or more drivers associated with the class. Each platform can be identified by a platform identifier (platform ID) such as a unique numerical identifier and by a platform name, while each driver can be identified by a driver identifier (driver ID) such as a unique numerical identifier, a driver type, a driver description, and a filename and/or path for a setup information file related to the driver. The driver type can include "AUDIO" for a an audio driver, "VGA" for a graphics driver, "LAN" or "WLAN" for wired or wireless networking adapter drivers, "CARDREADER" or "USB3.0" for drivers of various types of controllers or interfaces, or the like.

The device driver configuration file can also include configuration data for all hardware platforms, such as a list of one or more drivers that should be installed on all hardware platforms. The device driver configuration file can further include lists of common drivers that are shared between multiple platforms (but that are not necessarily shared by all platforms within a class). Each common driver is identified by a driver ID, a driver type, a driver description, and a filename and/or path. For each common driver, the configuration file lists two or more platforms associated with the driver. As such, the configuration file includes information for installing particular drivers on each of the hardware platforms, and identifies, for each class of hardware platforms, the drivers associated with the class, and for each common driver, the platforms associated with the common driver. The device driver configuration file can be an extensible markup language (XML) configuration file.

Figure 4B:
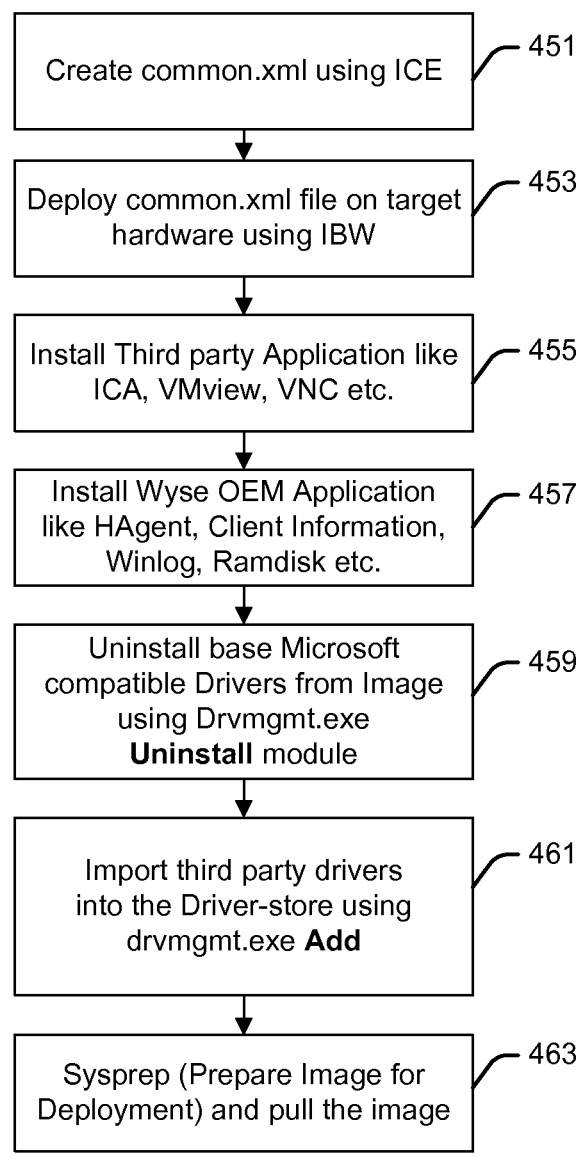

FIG. 4B shows a particular example of a process for creating a disk-image by an image-build module. The flow diagram shows exemplary operations involved in the creation of a WES 7 image, and all operations shown in FIG. 4B may be performed automatically without the intervention of a user. Certain operations of FIG. 4B are similar to operations shown in FIG. 3, and reference may be made to the description of FIG. 3 in describing those operations.

The creation of the WES 7 image begins in operation 451 with the creation of a common configuration answer file using an image configuration editor (ICE), the common configuration answer file being variously referenced herein as a file named "common.xml" (which can also be referred to as a common configuration file). In operation 453, the common configuration answer file is deployed on a target hardware, such as an image-build device, using an Image Build Wizard (IBW). In operations 455 and 457, third-party applications (such as ICA, VMView, VNC, or the like) and proprietary applications (such as HAgent, ClientInformation, Ramdisk, or the like) are installed on the image-build device. In addition, one or more scripts may be imported onto the image-build device in operation 457, such as scripts used for implementing or applying customizations on target client devices that the disk-image will be deployed on to. Following installation of the applications, base Microsoft compatible drivers are uninstalled from the image using an application such as an uninstall module of a drvmgmt.exe application in operation 459. In operation 461, all device drivers of supported hardware platforms are imported into a driver-store using, for example, an add module of the drvmgmt.exe application. In one aspect, the imported drivers correspond to all drivers identified in the device driver configuration file. Finally, in operation 463, the disk-image is prepared for deployment, for example by using a "Sysprep" application, and the prepared image is pulled.

Generally, in the process of preparing the WES 7 common master image, all the device drivers required by a variety of hardware platform are preloaded in the common master image. However, duplicate copies of device drivers may be added into the driver-store of the master image, for example in cases in which some of the hardware platforms have common hardware components. For example, if multiple hardware platforms (or multiple classes of hardware platforms) have a Realtek high definition audio card, a Realtek-PCI GBF Family controller, and an AMD Radcon HD6310 graphics card, separate copies of the drivers for each the platforms (or classes) having these common components could be included in the driver-store. To avoid unnecessarily storing duplicate (or multiple) copies of the same device driver files in the driver-store, and to thereby reduce the size of deployable disk images, a device driver configuration file can include a section for common drivers shared between multiple platforms (or platform classes).

Figure 5A:
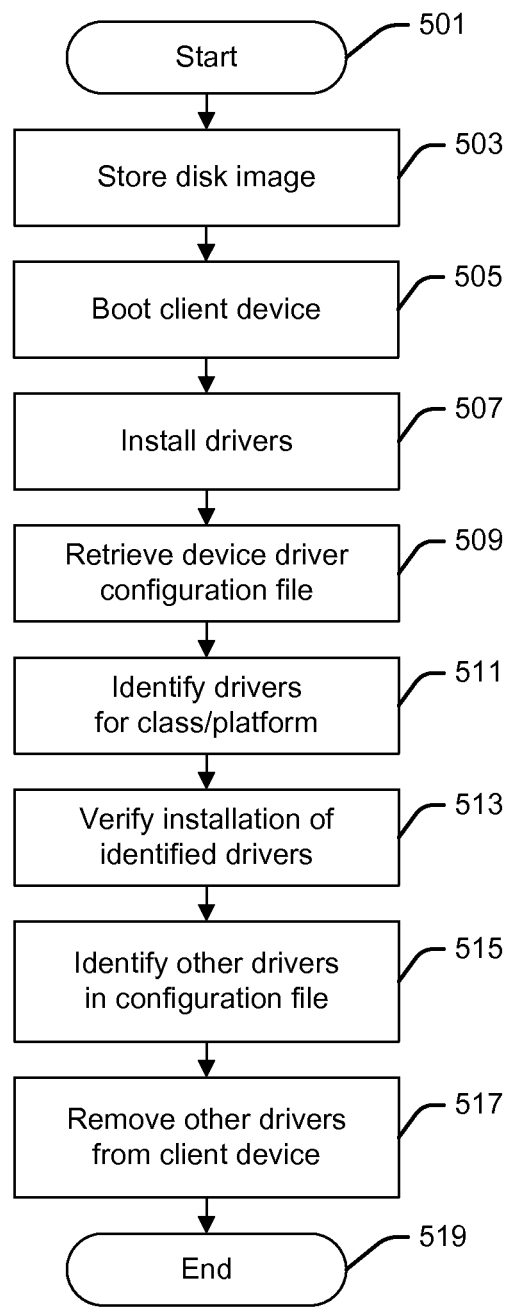
FIGS. 5A, 5B, and 5C illustrate examples of processes for installing a disk image on a client device having one of a variety of client platforms.

FIG. 5A shows an exemplary process for installing a disk image onto a target client device, such as a disk image produced by the processes of FIG. 4A or 4B and including applications and drivers for several hardware platforms. The target client device has one of the several hardware platforms, and the hardware platform of the target client device can be part of a class of platforms identified in a device driver configuration file. The process of FIG. 5A is repeated on each target client device the disk-image is deployed onto.

The installation process starts in operation 501, with a disk image being deployed to a target client device. The process of FIG. 5A can be performed by an image configuration module, for example by an image configuration module of or running on the target client device. The target client device can receive or retrieve the disk-image using any remote management software mechanism. In one aspect, the target client device receives or retrieves the disk-image from a server (e.g., server 112), an image-build device, or another device storing or having access to the disk-image. Alternatively, the disk-image can be pushed onto the target client device, be pre-loaded on a memory installed in or connected to the target client device, or can be otherwise provided to the target client device. In operation 503, the target client device stores the disk image on a memory or other machine-readable medium of the target client device, or otherwise comes into communication with a machine-readable medium storing the disk image. In operation 505, the target client device reboots up, or otherwise performs a boot process to initiate the disk-image installation.

During or following the boot process, the target client device having the disk-image stored therein automatically installs drivers for hardware and other components forming part of the target client device (operation 507). The drivers are installed on the client device based on the particular hardware platform of the client device, and using the setup information files stored in the driver-store of the disk-image. If the client device is running a WES 7 thin client, the driver installation operation can be performed as part of a Windows plug and play process for configuring and installing drivers for the particular hardware of the target client device. The plug and play installation process is generally automatically initiated during the boot process of a WES 7 thin client, and automatically detects hardware components, searches for drivers or associated driver setup information files, and installs the drivers on the thin client. A more detailed description of operations that can be included as part of the installation of drivers performed in operation 507 is included in relation to FIG. 6A below.

In operation 509, a device driver configuration file is retrieved. In general, the device driver configuration file is retrieved from the disk image stored by the client device. However, the device driver configuration file can be retrieved from another storage location, such as from a local or remote storage location. The device driver configuration file is substantially identical to the device driver configuration file described in related to FIG. 4A above. Along with retrieving the device driver configuration file, the client device may apply certain customization(s) to the client device, such as applying specific policies or preferences (e.g., disk resize, aero theme) to the client device. The customization may be user-specific, and may be performed based on customization information included in one or more scripts included in the disk-image, or in another appropriate storage location accessible from the image-build device.

In operation 511, the hardware platform and associated class of the target client device is identified. Based on the identified hardware platform and class, and based on the information included in the device driver configuration file, drivers associated with the hardware platform and class are identified for installation on the client device. Operation 511 may thus include identifying all drivers identified in the device driver configuration file as being associated with the class of the client device hardware platform, and identifying all common drivers identified in the device driver configuration file as being associated with the hardware platform of the client device. As part of operation 511, drivers and driver applications associated with the identified drivers can be installed on the client device. The driver applications may be identified in the device driver configuration file, for example in a portion of the device driver configuration file associated with the driver the application corresponds to. The driver applications are selected for installation on the client device based on the hardware platform of the client device.

In operation 513, the installation status of all drivers identified in operation 511 is verified, to ensure that all drivers associated with the hardware platform and class of the target client device have been installed on the target client device. The verification may include enumerating (or determining) all drivers installed on the target client device, and comparing the enumerated drivers to the drivers identified in operation 511. If all drivers are determined to be installed on the target client device, operation proceeds to operation 515. However, if any driver identified in operation 511 is found not to be installed on the client device, an error is detected. In response to detecting the error, the client device may attempt the re-install any drivers found not to be installed, and/or may issue a driver installation failure alert indicating that one or more drivers have not been installed.

If all drivers are determined to be installed on the target client device, other drivers listed in the device driver configuration file and not associated with either the hardware platform or class of the target client device are identified in operation 515. In operation 517, the other drivers, corresponding to drivers included in the driver-store of the disk-image but having remained unused during the disk-image installation process, are removed from the driver-store of the client device. Once the other unused drivers are cleared, the installation process concludes in operation 519. All operations shown in FIG. 5A may be performed automatically without the intervention of a user.

Figure 5B:
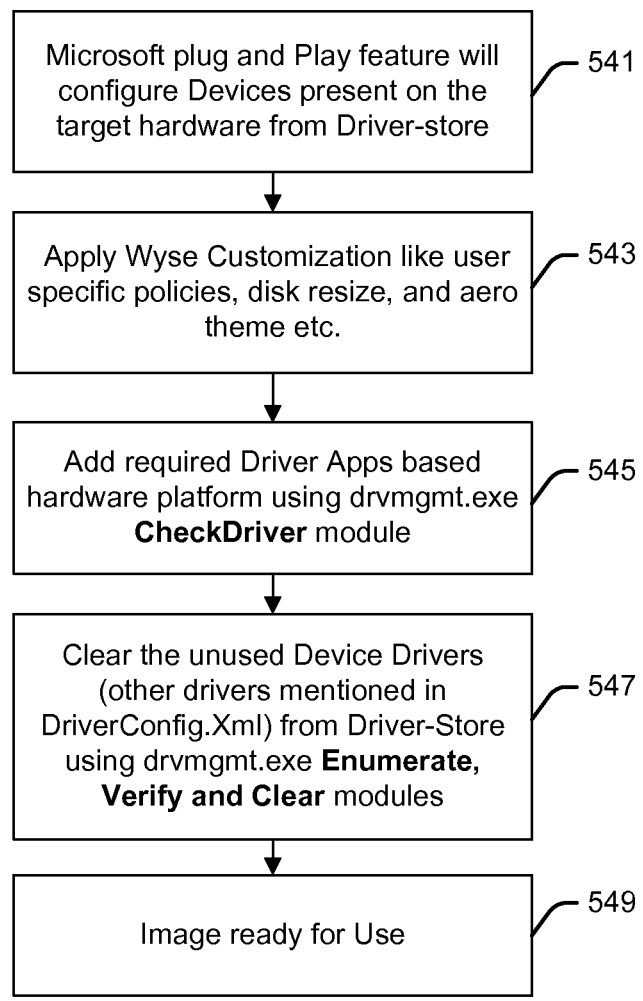
Figure 5C:
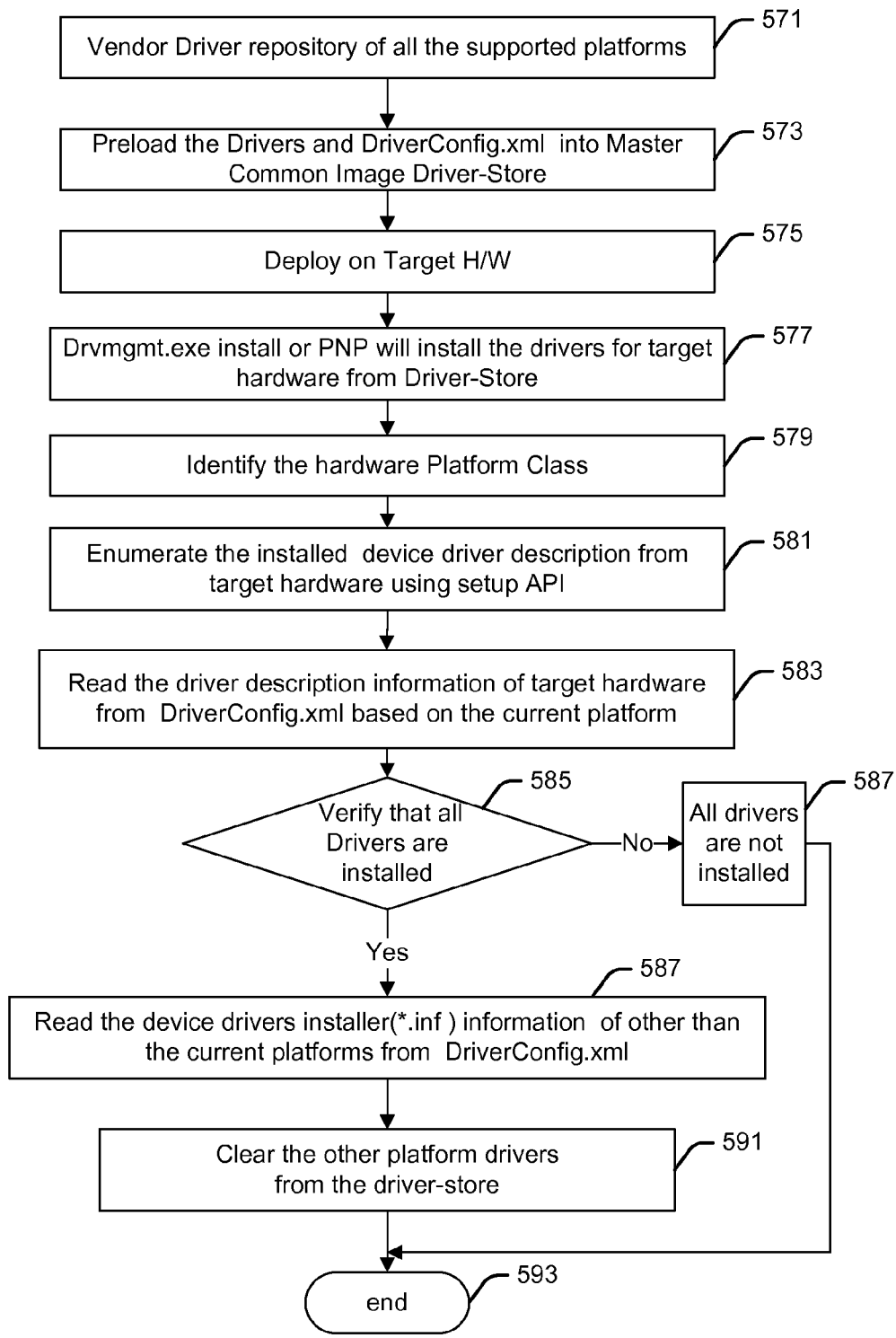

FIGS. 5B and 5C show exemplary flow diagrams of operations involved during deployment of the image on a target client device, such as operations performed by an image configuration module of the target client device.

In FIG. 5B, after the WES 7 image (including a driver-store) is deployed on a target client device hardware, and during a first boot process of the target client device, a process such as a Microsoft plug and play automatic driver installation process will configure and install all the required drivers from the driver-store based on the target hardware (operation 541). In operation 543, customization scripts will run which are responsible for setting up things like user specific policies, disk resize, aero theme, and the like. Required driver applications are added in operation 545 based on the hardware platform of the target client device, for example using a CheckDriver module of the drvmgmt.exe application. In operation 547, any unused device drivers are cleared from the driver-store using enumerate, verify, and clear modules of the drvmgmt.exe application. Following operation 547, the WES 7 thin client is ready for use in operation 549.

In FIG. 5C, a more detailed flow diagram is provided. In operation 571, the driver-repository is created to store vendor drivers for all hardware platforms supported by a disk-image. In operation 573, drivers and a device driver configuration file (which can be referenced as a "DriverConfig.xml" file) are preloaded into the master common disk-image driver-store, and the disk-image is deployed onto a target client device hardware in operation 575. In operation 577, drivers are installed on the target client device using the drivers stored in the driver-store of the disk-image. The installation is performed by a plug and play (PNP) application and/or by an install module of the drvmgmt.exe application. The hardware platform class of the target client device is identified in operation 579. In operation 581, the device drivers installed on the target client device are enumerated, while in operation 583, the drivers associated with the hardware platform and/or class of the target client device in the device driver configuration file are identified. Based on the drivers identified in operations 581 and 583, a determination is made as to whether all drivers associated with the target client device platform and class have been installed (operation 585). If any driver has not been installed (operation 587), execution ends (operation 593).

However, if all drivers have been installed, the device driver configuration file is read to identify other drivers associated with hardware platforms other than the platform of the target client device (operation 589). The other drivers are cleared from the driver-store in operation 591, and the process ends in operation 593. All operations shown in FIGS. 5B and 5C may be performed automatically without the intervention of a user.

FIG. 6A shows an illustrative process for verifying that the installation of drivers on a target client device, such as the installation performed in operation 507 of FIG. 5A, is successful. In the process of deploying a disk-image, such as a WES 7 common master image, on a target client device, the device drivers are installed based on the hardware platform using driver setup information files stored in the driver-store. The device driver installation process is generally performed automatically, for example by a plug and play type of installation process. The device driver install process, however, can fail due to multiple reasons including a lack of free space on a memory or storage device (such as a target SSD flash), the driver corresponding to a non plug and play device which cannot be automatically installed on the target client device, and/or a device's failure to initialize during installation. To resolve these failures during the device driver install process, FIG. 6A provides a method for implementing a multilevel driver installation and verification process.

In operation 601, one or more drivers are installed on the client device. Following installation, a driver installation status is verified in operation 603. In general, the verification consists in checking whether any drivers on the device are indicated as having been unsuccessfully installed. In devices running Windows-based operating systems, for example, the operating system may indicate a device installation status as being failed or unsuccessful. In other types of devices, a flag or other identifier may indicate that a driver installation is not complete. If the installation of all drivers was successful and no installations failed (operation 605—"No"), driver installation can be reported as being a success (operation 607) and the verification process ends in operation 617. However, if the installation of one or more drivers failed, was not successful, or was otherwise not properly completed (operation 605—"Yes), an attempt is made to re-install the driver in operation 609. The driver re-installation is generally performed in substantially the same manner as a driver installation, such as that performed in operations 507 and/or 601. The driver re-installation can also include a driver uninstallation operation, to remove the unsuccessful or incomplete driver installation prior to performing the driver re-installation. Following the driver re-installation, the driver re-installation status is verified in operation 611. If the re-installation of all drivers was successful and no re-installations failed (operation 613—"No"), driver installation can be reported as being a success (operation 607) and the driver installation verification process ends in operation 617. However, if the re-installation of one or more drivers failed (operation 613—"Yes), driver installation is reported as being a failure (operation 615) and the process ends in operation 617.

FIG. 6B shows a particular example of a driver installation verification procedure in accordance with the process described in relation to FIG. 6A. All operations shown in FIGS. 6A and 6B may be performed automatically without the intervention of a user.

FIG. 7A illustratively shows a data structure 700 for storing a device driver configuration file 701 such as that used in the processes of FIGS. 4A-4B, 5A-5C, FIGS. 6A-6B. The device driver configuration file 701 includes one or more platform class structures 703, each platform class structure storing information associated with a particular platform class. In particular, the platform class structure 703 may include a class identifier 707, and lists of one or more platform(s) 709 and driver(s) 711. The class identifier 707 can be a class number, class ID, class name, and/or other identifier(s) for the class associated with the structure. The list of one or more platforms 709 identifies all hardware platforms associated with the class, and may be a list of platform numbers, platform IDs, or platform names, for example. The list of driver(s) 711 identifies all drivers associated with the class, and may be a list of driver numbers, driver IDs, driver names, and/or filename(s) and/or paths of driver setup information files, for example. The device driver configuration file 701 further includes one or more common driver structures 705, each common driver structure storing information associated with a particular common driver. A common driver structure generally stores information for a driver 713 corresponding to the structure, the driver information 713 including a driver number, driver ID, driver name, and/or filename and path for a driver setup information file. The common driver structure also includes a list of platform(s) 715 associated with the common driver.

FIG. 7B illustratively shows a data structure 800 for storing a disk-image 801 such as a disk-image used in the processes of FIGS. 4A-4B, 5A-5C, FIGS. 6A-6B. Disk image 801 can be generally a copy of a hard disk, flash drive, memory, other storage medium, or portion of a storage medium, which stores files, folders, and other data for deployment to target client devices. In the examples of FIGS. 4A-4B, 5A-5C, FIGS. 6A-6B, the disk-image may store substantially all of the data stored on a machine readable medium (e.g., a hard-disk, flash memory, or the like) of the image-build device when the image is prepared and pulled from the image-build device. In some examples, the disk image 801 may include an operating system, applications, and data files stored in a memory of an image-build client device at the time an image of the memory is prepared for deployment. In the example shown in FIG. 7B, disk image 801 includes a device driver configuration file 803, one or more applications 805 which were installed on the image-build client device prior to creation of the disk image, and a driver-store 807 which stores driver files 807a, 807b for a plurality of drivers. The driver files 807a, 807b can be driver files, setup information files (e.g., ".inf" files) or other types of files (e.g., ".msi" installation packet files, ".cab" compressed archive files, ".exe" executable files, etc.) used for installation of drivers, or the like.

Figure 8A:
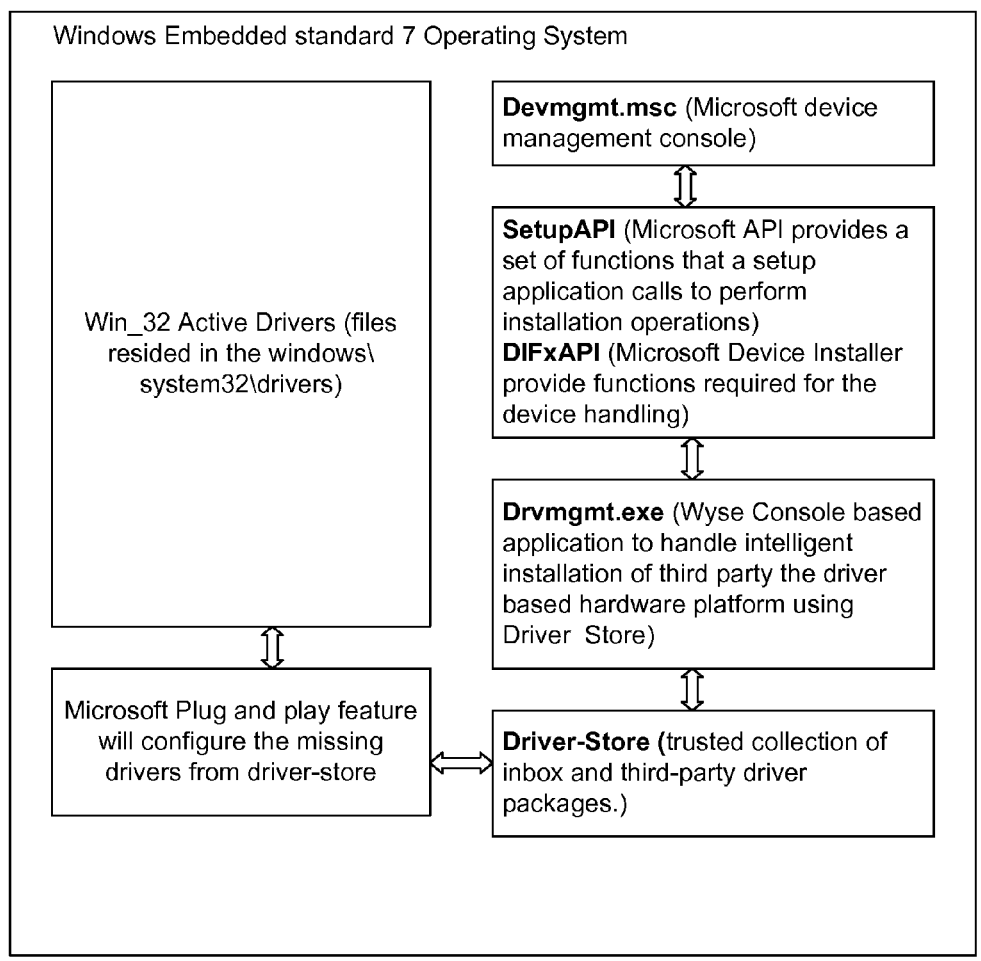
FIG. 8A shows an example of an operating system and associated components for performing operations in accordance with various aspects of the subject technology.

FIG. 8A is a block diagram showing components of an exemplary WES 7 operating system, and of interactions between the operating system components and various storage structures on a client device. In the example of FIG. 8A, the operating system includes a plug and play feature for automatically configuring drivers on the client device. The plug and play feature (e.g., a Microsoft plug and play feature of a Windows operating system) can determine that one of more drivers are missing, for example by identifying one or more components of the client device that do not have associated driver(s) installed, and automatically attempt to the install drivers for the identified components. The drivers may be installed based on driver setup information files or other installation or data files stored in the driver-store of the client device, for example. Once installed, the drivers form part of the set of active drivers on the client device, such as the Win_32 active drivers residing in a windows\system32\drivers folder of a client device operating a Windows-based operating system. The operating system may rely on a Devmgmt.msc application providing a console for device management, a SetupAPI application program interface providing a set of functions that a setup application calls to perform installation operations, and/or a DIFxAPI device installer providing functions required for device handling. The client device or operating system may further use a proprietary application, such as the application referred to herein as Drvmgmt.exe, to handle and perform intelligent installation of third-party drivers based on a hardware platform of the client device and using the driver-store of the client device.

Figure 8B:
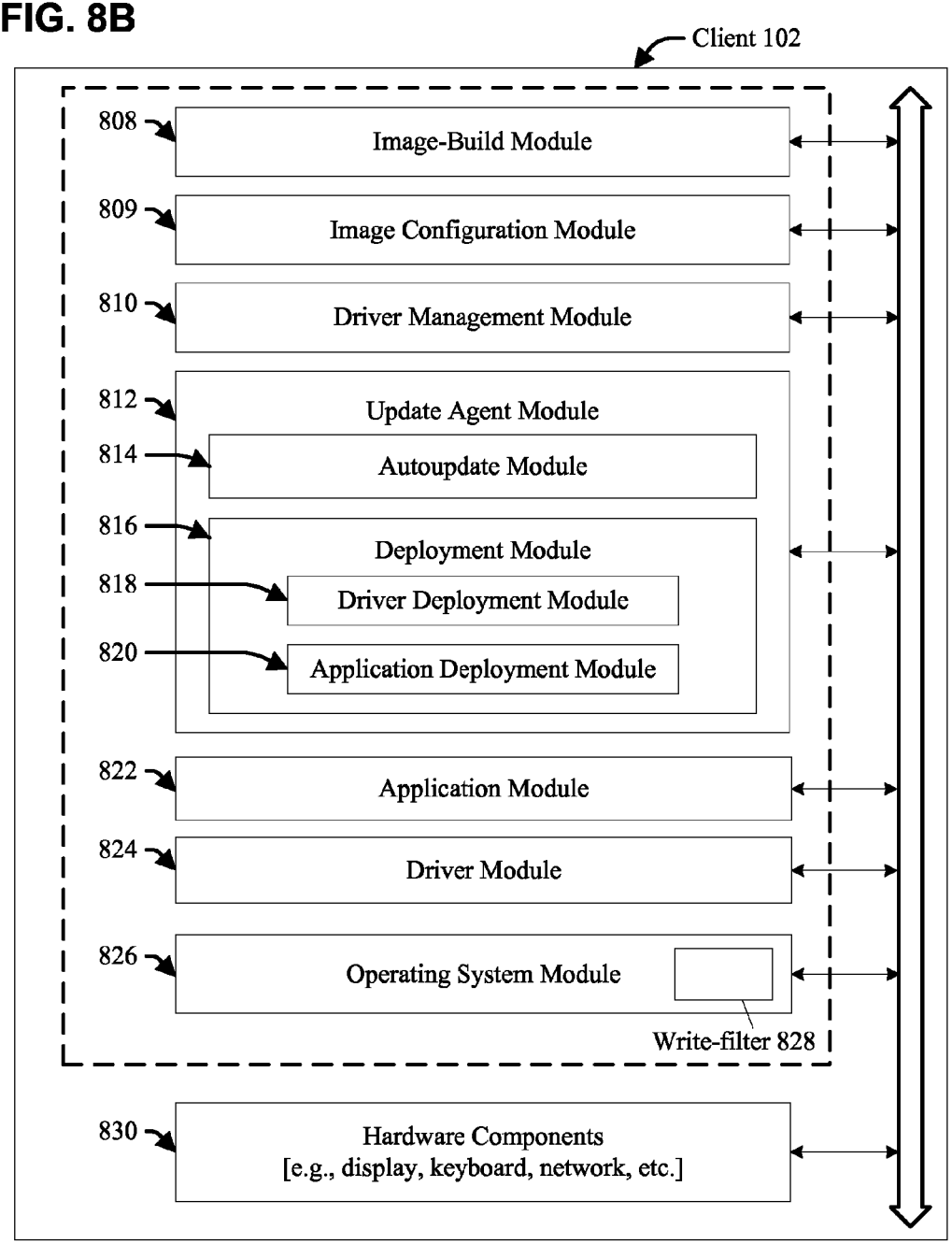
FIG. 8B illustrates a simplified block diagram of a client device, in accordance with various aspects of the subject technology.

FIG. 8B illustrates a simplified block diagram of a client device, in accordance with various aspects of the subject technology. A client device 102 may comprise some or all of the following: an image-build module 808, an image configuration module 809, a driver management module 810, an update agent module 812, an application module 822, a driver module 824, an operating system module 826, and hardware components 830. The update agent module 812 may comprise one or both of: an autoupdate module 814 and a deployment module 816. The deployment module 816 may comprise one or both of: a driver deployment module 818 and an application deployment module 820. The operating system module 826 may preferably include a write-filter 828, which may contain an exclusion list. In some aspects, the driver management module may be implemented in part as a driver management application such as "drivermgmt.exe". The modules and/or components of the client device 102 may be in communication with one another. In some aspects, the hardware components 830 may comprise various interface devices, and the modules of client device 102 are further in communication with the various user interface devices via a human interface devices (HID) connection. The user interface devices may include one or more output devices (e.g., one or more of a display, a speaker, or other audio, image or video output devices) and one or more input devices (e.g., one or more of a keyboard, a mouse, a trackball, a microphone, a stylus, a touch screen, a touch pad, a pen, a tablet, or other audio, image or video input devices). The modules may also be in communication with the public network 118 or the corporate network 114 via a network connection.

In a preferred embodiment, the modules (e.g., 808 through 828) are implemented in software (e.g., a machine-readable medium comprising subroutines or code). In another embodiment, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the present disclosure are further described in the disclosure.

In one example, an embedded image of a client device 102 may comprise the operating system module 826 and some or all of the following: modules 822, 824, and 808. In another example, an embedded image of a client device 102 may comprise the operating system module 826 and some or all of the following: modules 822, 824, and 809. In another example, an embedded image of a client device 102 may comprise the operating system module 826 and some or all of the following: modules 822, 824, and 810. In another example, an embedded image of a client device 102 may comprise the operating system module 826 and some or all of the following: modules 822, 824, 812, and 814. In another example, an embedded image of a client device 102 may comprise the operating system module 826 and some or all of the following: modules 822, 824, 812, 816, 818, and 820. In another example, an embedded image of a client device 102 may comprise the operating system module 826 and some or all of the following: modules 808, 809, 810, 812, 814, 816, 818, 820, 822, and 824. In another example, a client device 102 may comprise an operation system and module 808.

According to some approaches, to mass deploy thin client firmware through management software, a customized firmware image may need to be created as a package. A write-filter of the image may need to be disabled, software/drivers may need to be installed, appropriate configurations may need to be set, and the write-filter may then need to be enabled. After this process, the firmware on the client may need to be pulled from a remote server. This firmware image may be of a large size and may need to be pushed to all the appropriate clients using the customized firmware change.

To prevent this process of a large firmware from being pushed on multiple clients over a network, drivers/applications to be installed may be specified in a configuration file. In some aspects, the applications may also be stored along with the configuration file. As soon as a client boots up, an autoupdate service running on each client device can check the configuration file to determine whether updates are available for any of the drivers or applications on the client device, and the autoupdate service can then download and install the available updates for the corresponding drivers or applications.

Figure 9A:
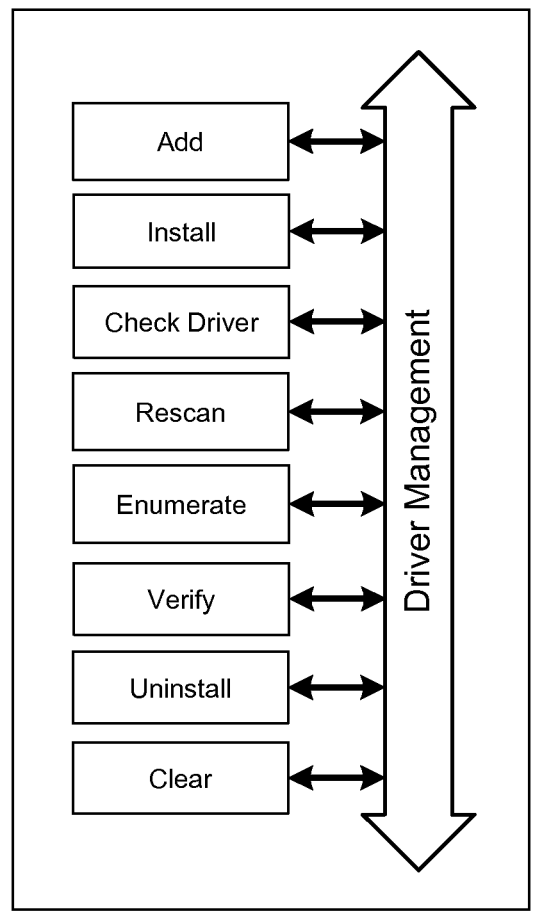
FIG. 9A illustrates an example of a functional block diagram of a driver management application, in accordance with various aspects of the subject technology.
Figure 9B:
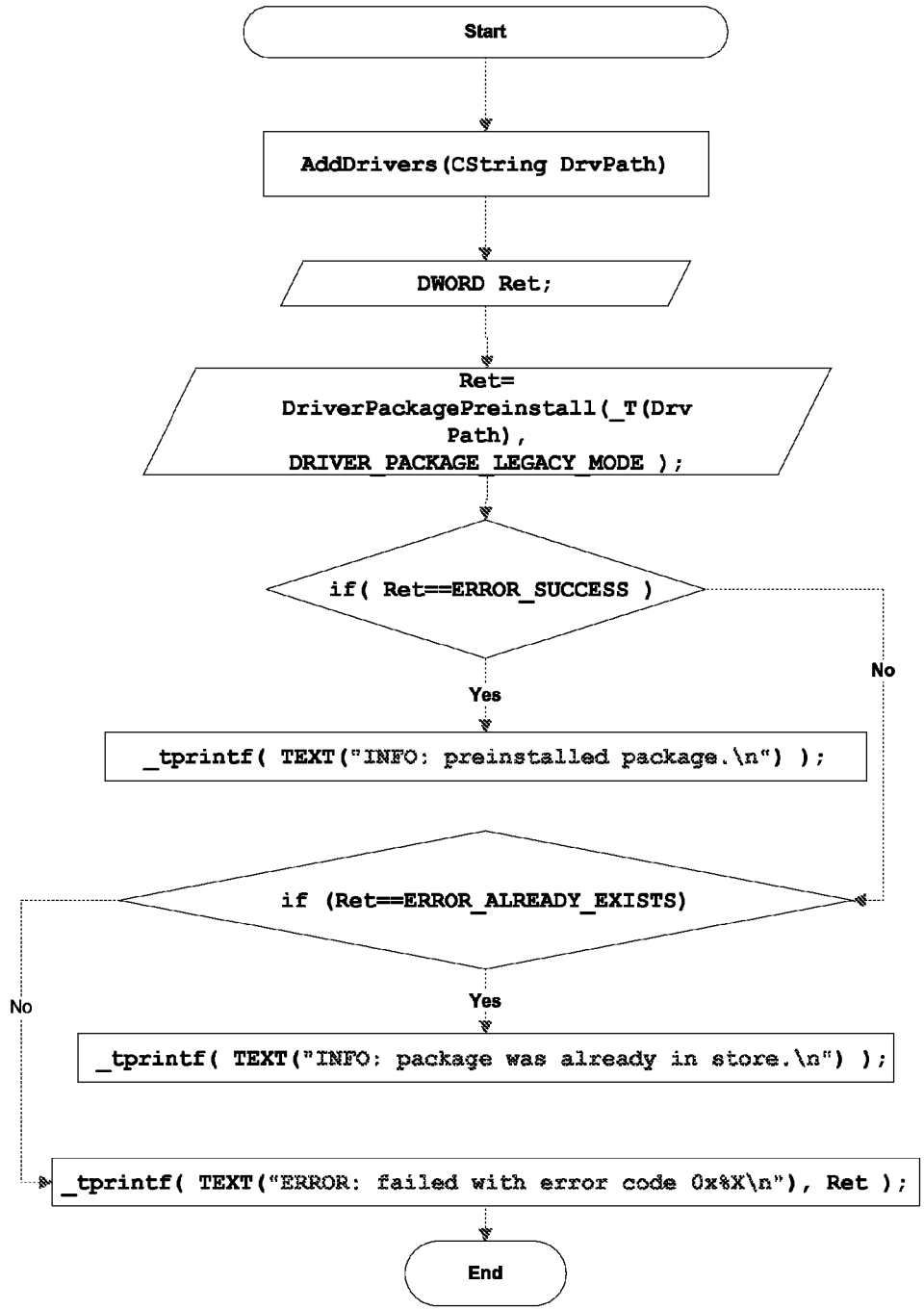
FIGS. 9B-9J illustrate examples of processes for performing various functions related to the subject technology.
Figure 9C:
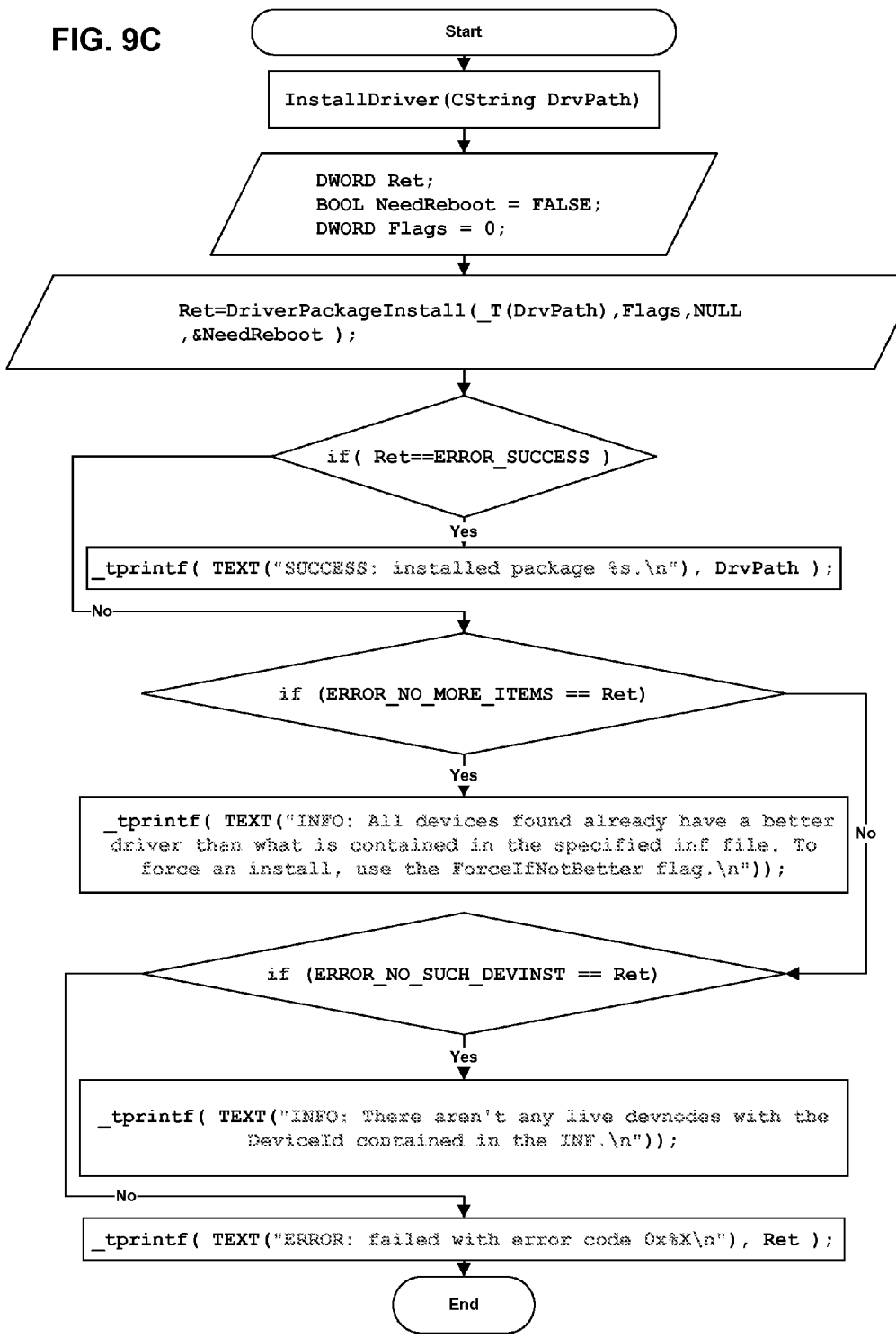
Figure 9D:
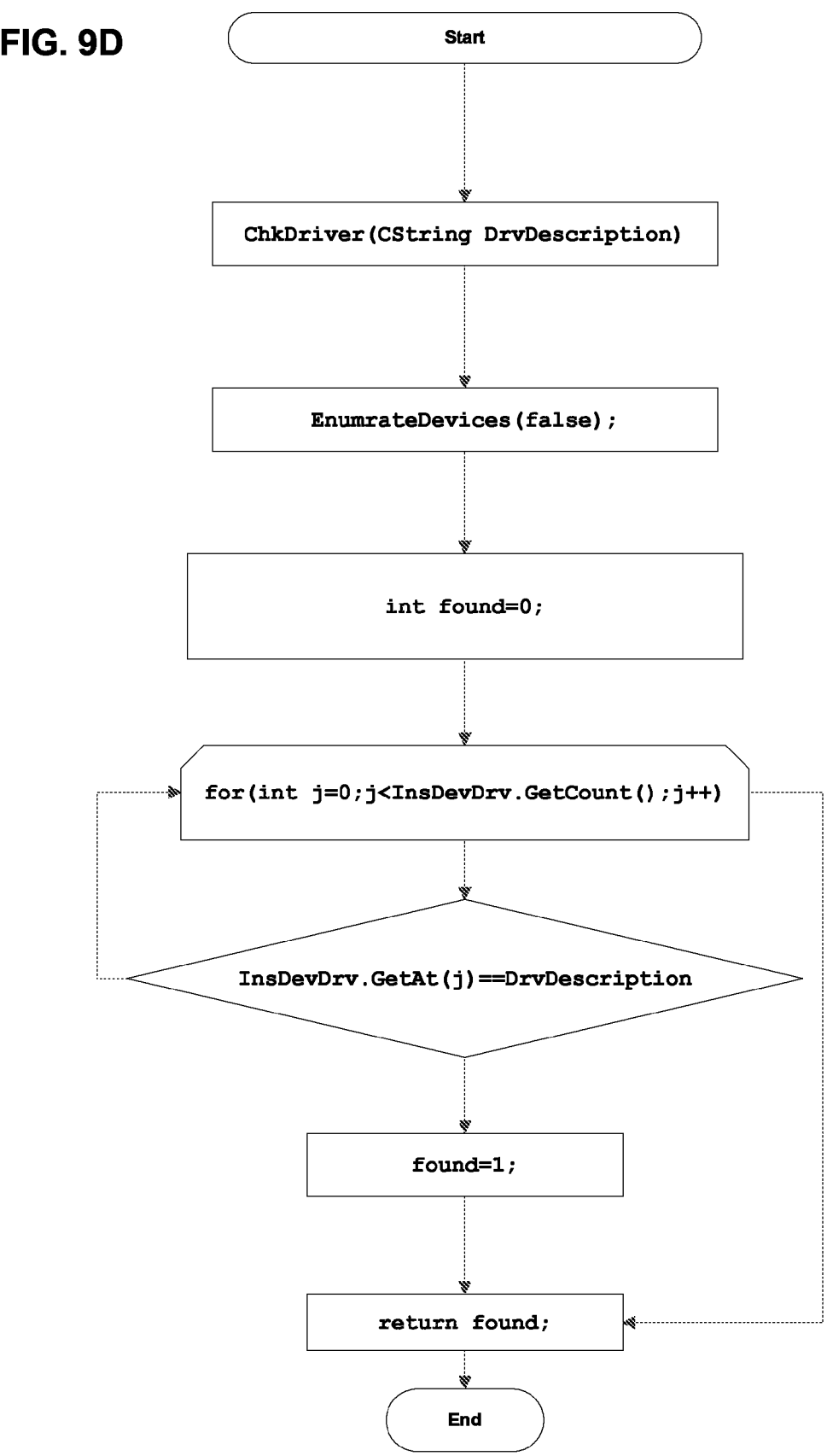
Figure 9E:
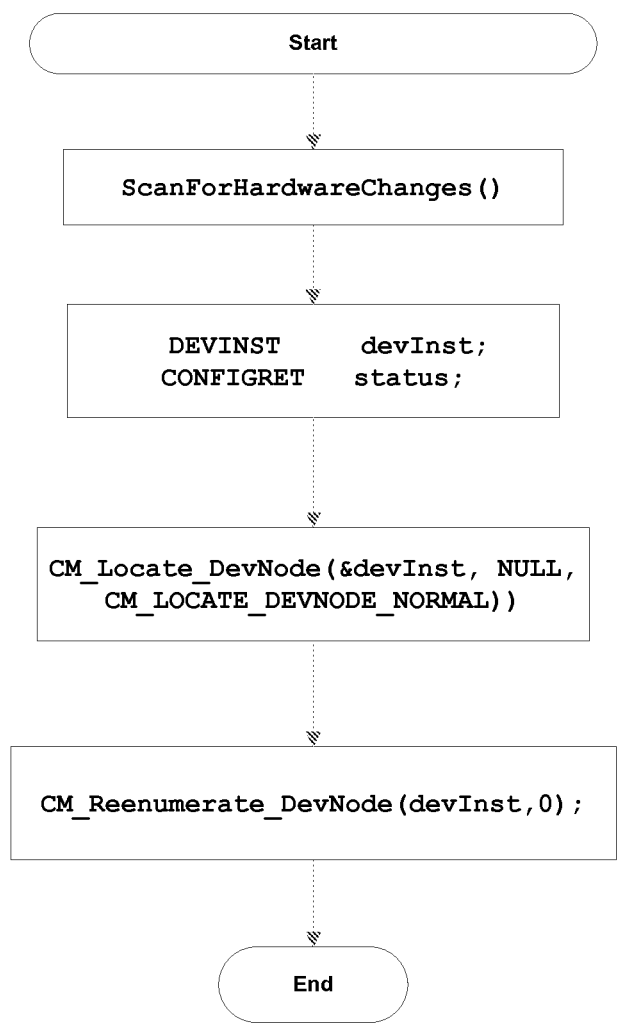
Figure 9F:
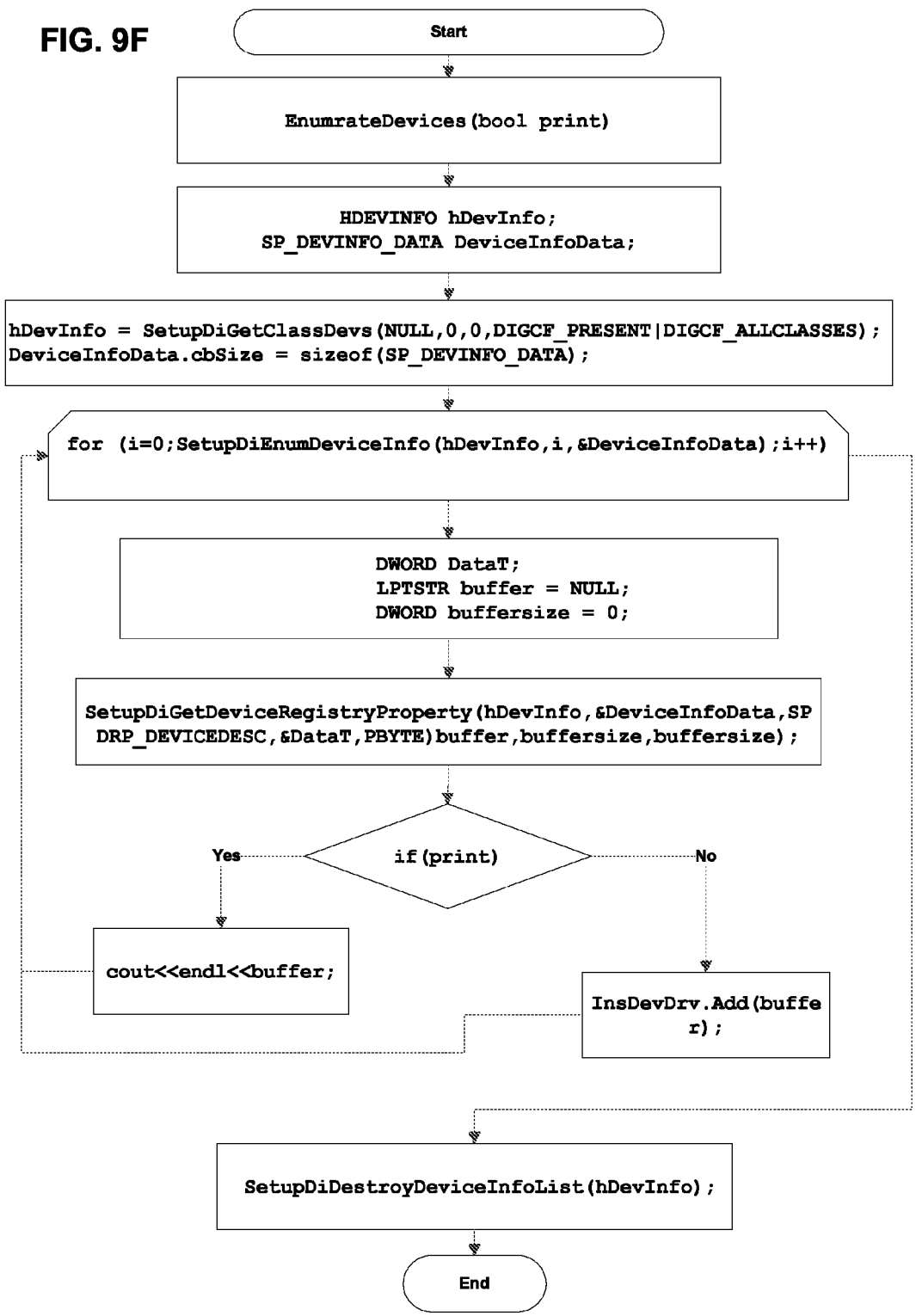
Figure 9G:
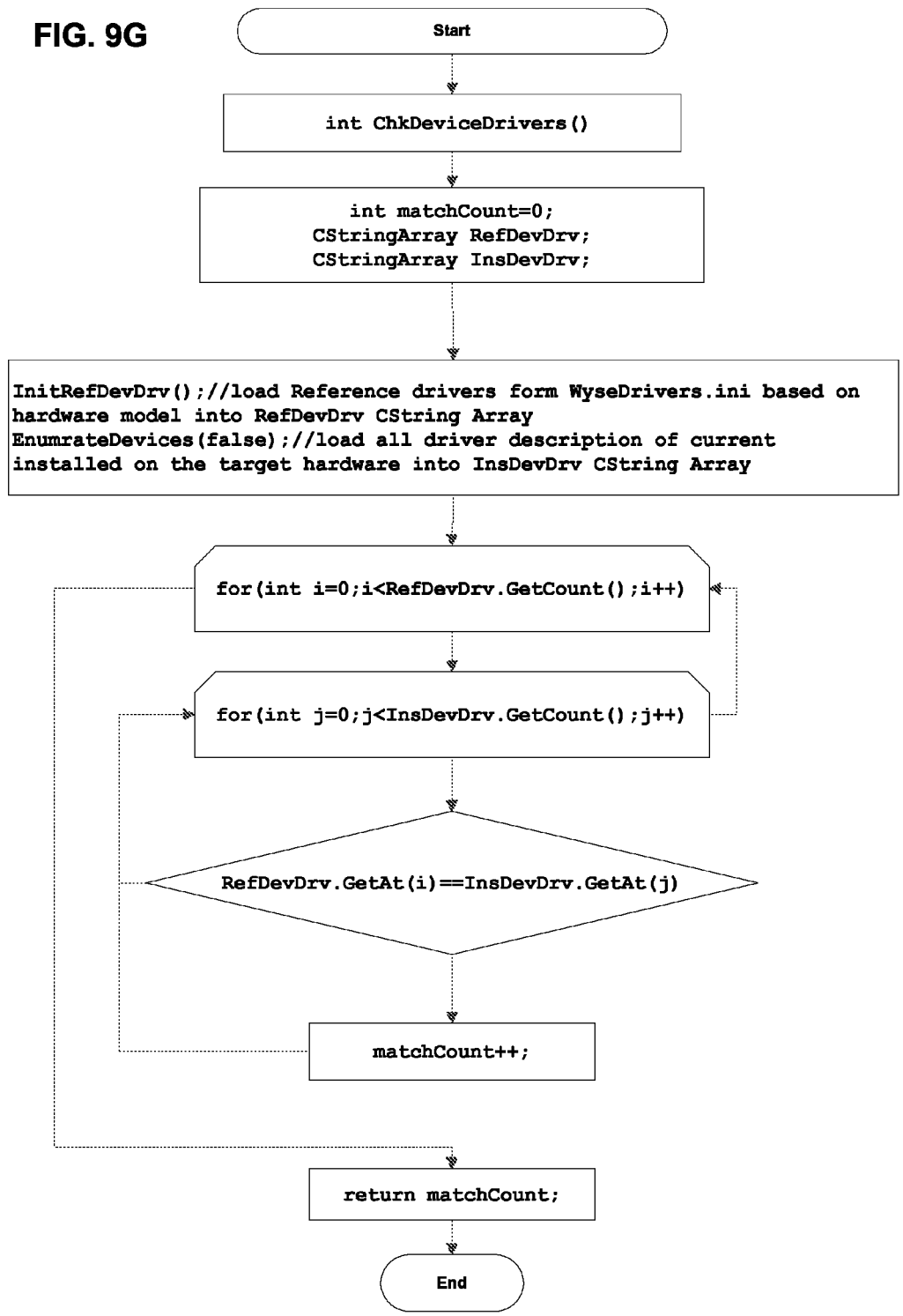
Figure 9H:
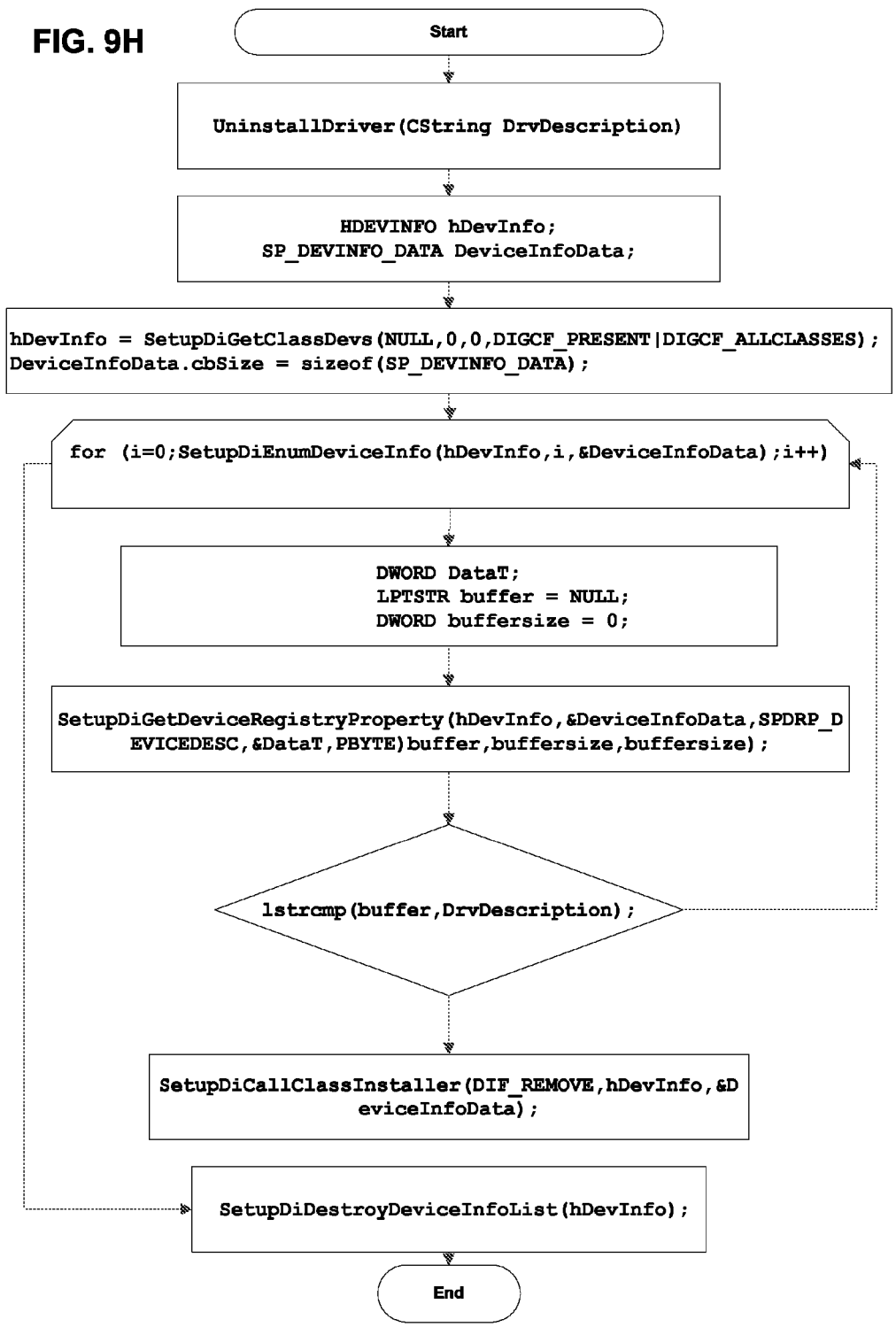
Figure 9I:
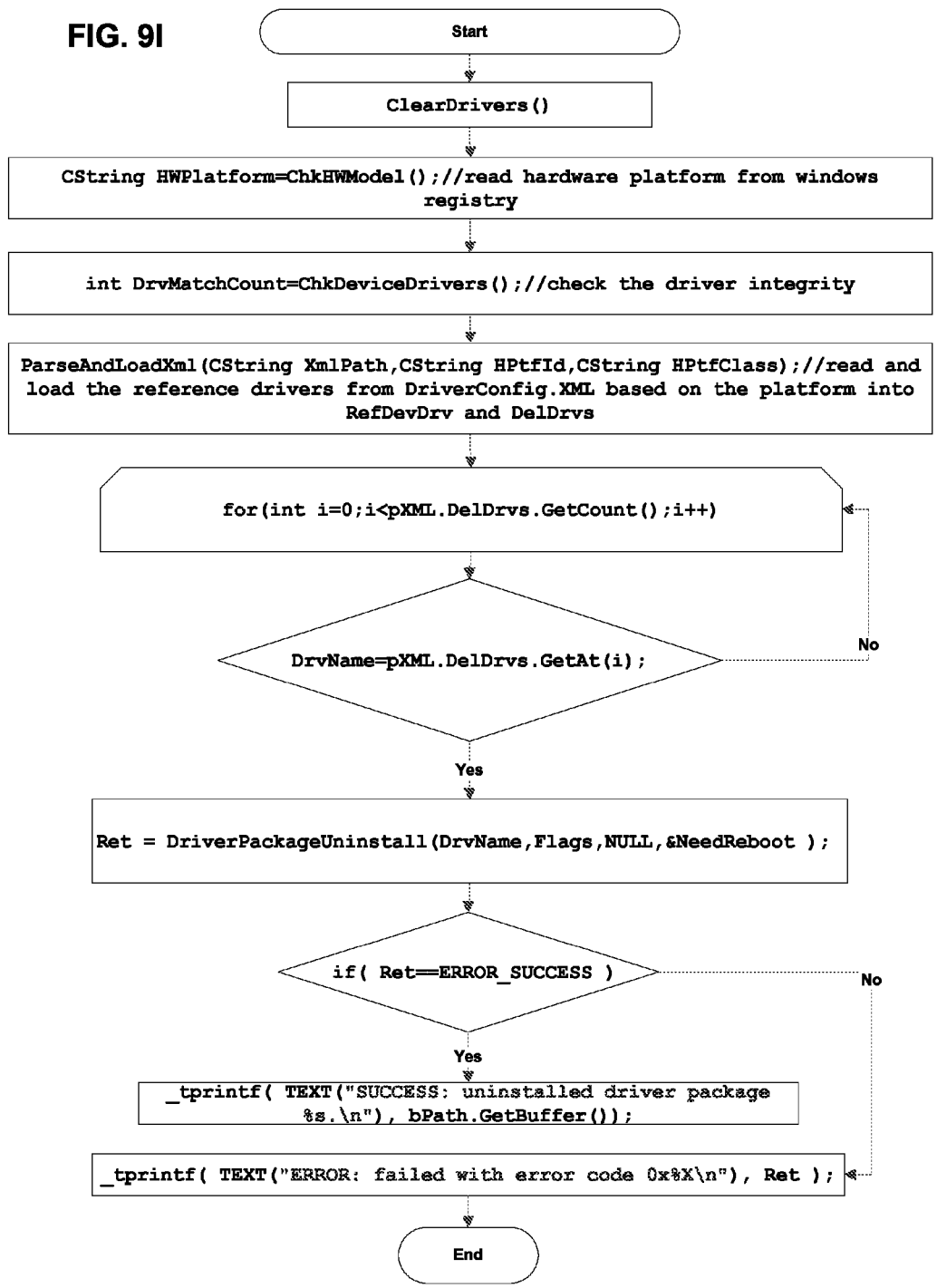
Figure 9J:
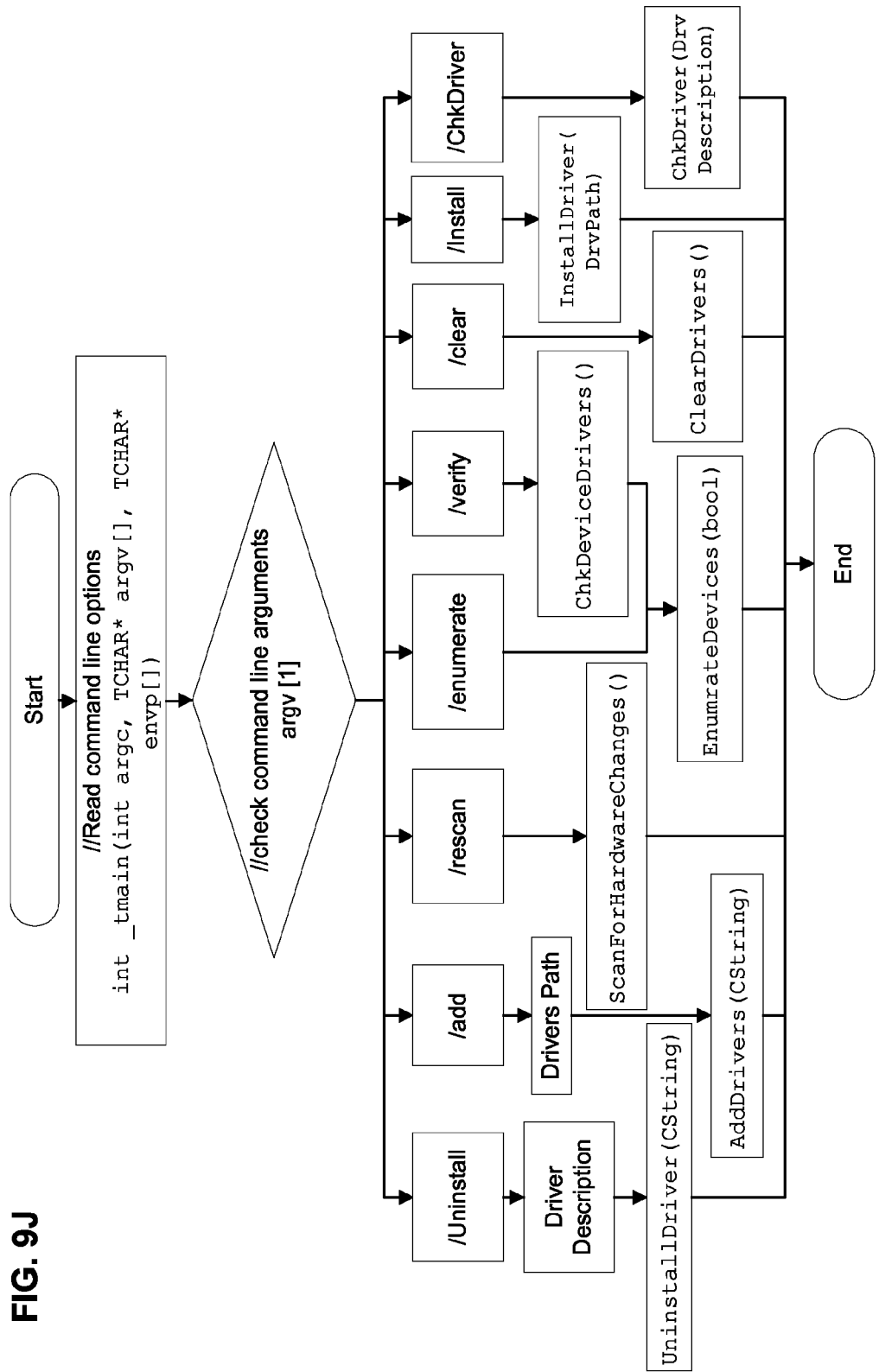

FIG. 9A shows a simplified block diagram of a driver management module used to install, uninstall, and perform other processes and operations on drivers in a client device. The driver management module, referenced herein as Drvmgmt.exe and/or as a driver management application, includes separate modules for performing processes, including modules for adding, installing, checking, rescanning, enumerating, verifying, uninstalling, and clearing drivers from a client device. The driver management module may be resident on or installed on a client device, such as a target client device or an image-build device, or a server, and is used to perform processes on the client device or server the module is resident on.

FIGS. 9B-9J show detailed flow diagrams of processes performed by the various sub-modules of the driver management module (such as, drvmgmt.exe). The driver management module is used, for example, at multiple stages of the image building process shown and described in relation to FIGS. 4A-4B, 5A-5C, and 6A-6B above. In the examples discussed above, the driver management module is used to perform multiple operations involved in creating a Windows Embedded Standard 7 thin client master image.

The driver management module can be implemented as a command line application, which is developed to handle the different device driver management activities on Windows Embedded Standard 7 thin client master image. The module may support different functionalities, like adding one or more device drivers into a driver-store, installation and uninstallation of drivers, clearing of drivers from a driver-store, or the like.

In implementation in which the driver management module is a command line application, usage may be as shown below. The application may be called with a command line such as: Drvmgmt.exe/<function name> [function arguments]

A list of functions supported by driver management module, and associated descriptions of the functions, is included below. Following a function call of the driver management module (corresponding to a process illustratively shown in FIG. 9J), the driver management module retrieves the command line arguments provided to the function, verifies that all command line arguments are present and have the correct syntax, and executes the respective module based on the command line options and arguments provided. For example, an install module (corresponding to a process illustratively shown in FIG. 9C) performs an Install function to install a driver package from a specified path (for example a path storing a ".inf" driver setup information file). An Add module (see, e.g., FIG. 9B) performs an Add function to preload a driver package for a Plug and Play (PnP) function driver in the driver-store and installs the INF file for the driver package in the system INF file directory using DIFXAPI functions. A CheckDriver module (see, e.g., FIG. 9D) performs a Check-Driver function for verifying whether the requested driver is installed or not, and returns the status to the main program. A Rescan module (see, e.g., FIG. 9E) performs a Rescan function for reconfiguring the device drivers from Driver-store. An Enumerate module (see, e.g., FIG. 9F) performs an Enumerate function for fetching the device driver information (Device driver description) from the installed target platform. The Enumerate module can thus be used to obtain a list of drivers installed on a client device. The Verify module (see, e.g., FIG. 9G) performs a Verify function for checking the list of drivers that are currently installed on the target hardware, with a reference drivers list given in a device driver configuration file or deployment configuration file (such as a file named "DriverConfig.Xml" or "DeviceDeploymentConfig.xml") based on the hardware model of a client device. The Uninstall module (see, e.g., FIG. 9H) performs an Uninstall function for removing drivers that are currently configured for the devices based on the driver descriptions. The Clear module (see, e.g., FIG. 9I) performs a Clear function for verifying the Drivers integrity and, clearing the drivers of other hardware model specified in a device driver configuration file or deployment configuration file (such as a file named "DriverConfig.xml" or "DeviceDeploymentConfig.xml") from a driver-store. The processes illustratively shown in each of FIGS. 9B-9J may be performed automatically, without the intervention of a user.

Each of the modules, and associated processes, of the driver management module can be invoked using a full command line usage such as:

| Module | Command line usage |
| --- | --- |
| Install | drvmgmt.exe /install "<Driver inf Path>" |
| Add | drvmgmt.exe /add "<Driver inf path>" |
| Check Driver | drvmgmt.exe /chkdriver "<Driver description>" |
| Rescan | drvmgmt.exe /rescan |
| Enumerate | drvmgmt.exe /enumerate |
| Verify | drvmgmt.exe /verify |
| Uninstall | drvmgmt.exe /uninstall "<Driver description>" |
| Clear | drvmgmt.exe /clear |

Automatic Deployment of Drivers or Applications

To address some of the problems mentioned above, notably the inability to update particular components (drivers and/or applications, including security patches and feature updates) on client devices without deploying a disk-image to each client device, several approaches are proposed. These approaches include managing of device drivers on client devices, e.g. for devices having a WES 7 thin client runtime image, adding deployment configuration file-based deployment support of third-party device drivers and applications (including security patches and feature updates) on client devices, and providing automatic updates of thin client components/applications.

Figure 10:
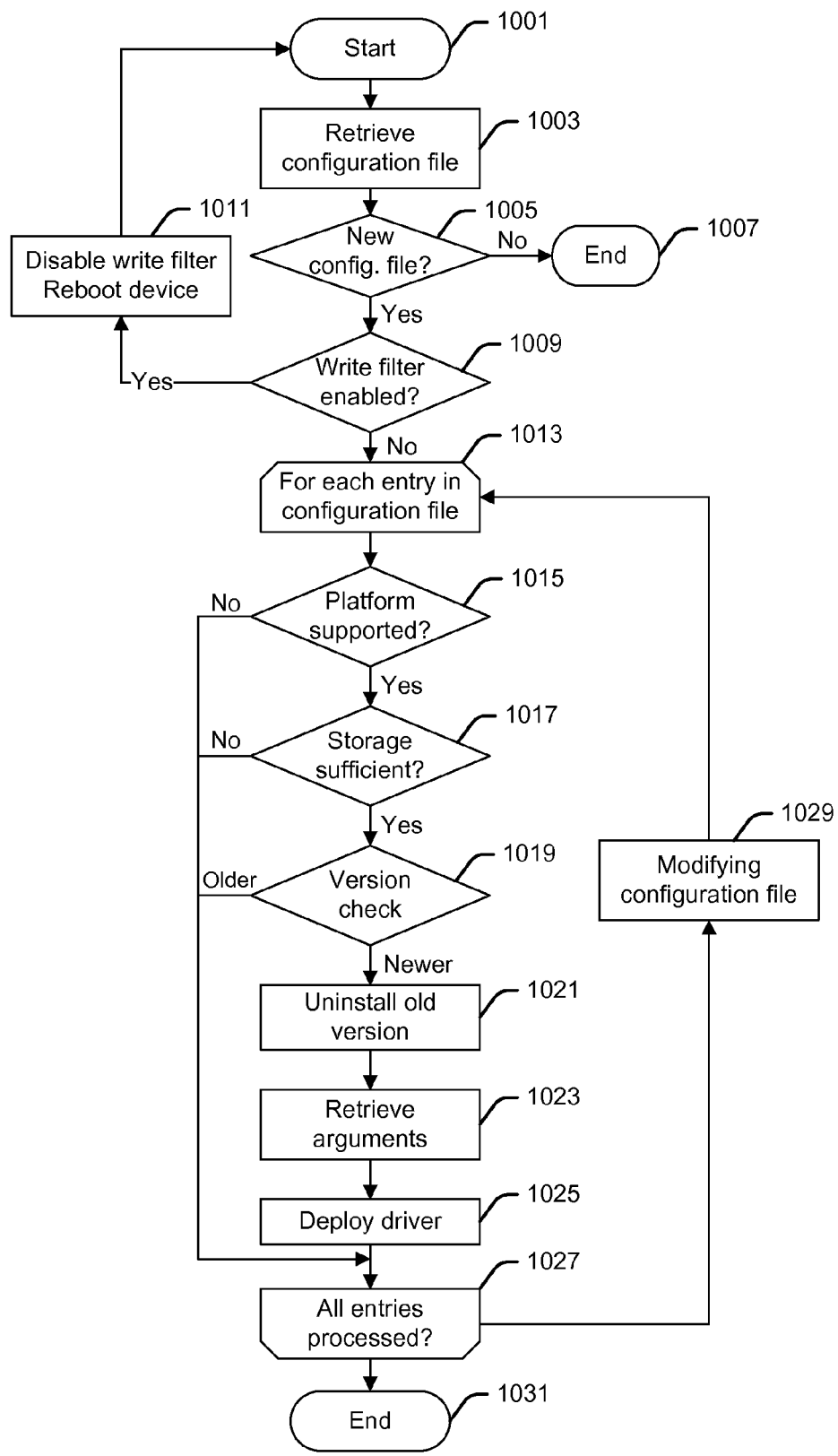
FIG. 10 illustrates an example of a process for automatically deploying one or more drivers on a client device using a deployment configuration file.

FIG. 10 illustrates an example of a process for automatically deploying a driver on a client device using a deployment configuration file. The process shown in FIG. 10 can be performed by an update agent module 812 of a client device, and in particular by a deployment module 816 and/or a driver deployment module 818 of the client device. The deployment configuration file includes deployment entries, and at least one deployment entry includes information for deployment of a driver on the client device. The process of FIG. 10 is generally performed in multiple client devices, as the process is repeated on each client device that a driver should be deployed onto. For example, the process may be repeated on each client device having a hardware platform associated with a driver identified in the deployment configuration file.

The process for automatically deploying a driver on a client starts in operation 1001, and is generally initiated upon boot up of the client device. In operation 1003, a deployment configuration file is retrieved on the client device. Deployment configuration files are described in more detail below in relation to FIGS. 13A and 13B, and generally include one or more deployment entries each providing information relating to the deployment or installation of a driver on the client device. The deployment configuration file can be retrieved in operation 1003 from a memory of the client device, or from a deployment configuration repository (e.g., configuration repository server 104 in FIG. 1). In some examples, the deployment configuration file is retrieved from a location in the memory of the client device that is exempt from the write filter restrictions.

Various types of deployment configuration files can be retrieved from a memory of a client device, including a "CurrentDeploy.xml" file, which can be referred to as a current deployment configuration file or a "DeltaDeploy.xml" file, which can be referred to as a delta deployment configuration file. The "CurrentDeploy.xml" file is a configuration file that was previously stored in the memory of the client device, and that has not yet been processed to deploy drivers mentioned therein. The "DeltaDeploy.xml" file is also a configuration file that was previously stored in the memory of the client device, and that has only been processed in part to deploy some of the drivers mentioned in the "CurrrentDeploy.xml" file. When a particular deployment file includes many deployment entries, for example, and a reboot of the client device is required after only some of the deployment of applications or drivers have been processed, the "DeltaDeploy.xml" file can store the deployment entries that have not yet been processed at the time of the reboot. A "CurrentDeploy.xml" file may be a copy of a deployment configuration file initially retrieved from a configuration repository at the beginning of the deployment process and may identify and describe a plurality of drivers for installation. A "DeltaDeploy.xml" file may be a deployment configuration file generated based on the "CurrentDeploy.xml" file during the deployment process and may identify and describe a portion (or a subset) of the plurality of drivers, which have not yet been deployed on a client device.

In a preferred example, if a "DeltaDeploy.xml" file is present in the memory of the client device, the "DeltaDeploy.xml" is retrieved in operation 1003 and execution proceeds directly to operation 1013. If no "DeltaDeploy.xml" file is present, the client device verifies whether a "CurrentDeploy.xml" file is present and, if present, execution proceeds to operation 1005. Finally, if neither "DeltaDeploy.xml" nor "CurrentDeploy.xml" files are present, the client device attempts to retrieve a deployment configuration file from a remote location, such as from a configuration repository (e.g., configuration repository server 104). In embodiments in which the configuration repository is a server, the client device may check to determine whether a deployment configuration file (such as "DeviceDeploymentConfiguration.xml") is stored on to the configuration repository (e.g., server 104), and retrieve the deployment configuration file if one is determined to be stored in the repository. Alternatively, the configuration repository server 104 may push the deployment configuration file onto the client device, such that the client device retrieves the deployment configuration file on its next reboot. The deployment configuration file is generally stored in a location of the memory of the client device that is exempt from the write-filter restrictions.

Once a deployment configuration file is retrieved, the client device determines whether the retrieved deployment configuration file corresponds to a new deployment in operation 1005. The determination can be performed, for example, by comparing the retrieved deployment configuration file to a stored file storing a previously-processed deployment configuration file (e.g., which can be referred to as a "LastSuccessDeploy.xml" file). The comparison may be performed on individual entries of the deployment configuration file, to determine whether any or all of the deployment entries in the retrieved deployment configuration file have previously been processed and deployed. If the deployment configuration file is determined not to correspond to a new deployment (or if all deployment entries in the deployment configuration file are determined to have previously been processed and deployed on the client device), the process ends in operation 1007. However, if the deployment configuration file is determined to correspond to a new deployment (or if at least one deployment entry is determined not to have previously been deployed on the client device), the process proceeds to operation 1009.

In operation 1009, the status of a write filter on the client device is determined, in order to ensure that the write file is disabled. The write filter either blocks changes from being made to a client device or a configuration of the client device, or blocks any changes made to the client device or its configuration from persisting through a reboot of the device. In order to ensure that the deployment of a driver or application persists across a reboot, the status of the write filter is determined. If the write filter is enabled, the write filter is disabled and the client device is rebooted in operation 1011, and execution proceeds to operation 1001 upon reboot of the device. However, if the write filter is determined to be disabled, execution proceeds to operation 1013 for deployment of the driver.

Operations 1013-1029 form a loop that is repeated for each deployment entry included in the deployment configuration file (which is initially, e.g., the "CurrentDeploy.xml" file retrieved at operation 1003 and then the "DeltaDeploy.xml" file). In operation 1013, the deployment configuration file is parsed, and a first deployment entry is retrieved. Upon determining that the first deployment entry corresponds to the deployment of a driver, execution proceeds to operation 1015.

In operations 1015-1021, various parameters of the driver under deployment and of the client device are verified to ensure proper deployment and installation of the driver on the client device. In operation 1015, identifiers for hardware platforms supported by the driver/deployment are retrieved from the deployment entry, and are compared to an identifier for the hardware platform of the client device. If the device's platform is determined to match one of the platforms identified in the deployment entry, operation proceeds to operation 1017; in the alternative, execution proceeds to operation 1027. In operation 1017, an indicator for an amount of storage space for the deployment of the driver is retrieved from the deployment entry, and an amount of storage space available in a memory of the client device is determined. If sufficient space is determined to be available for the deployment, execution proceeds to operation 1019; in the alternative, execution proceeds to operation 1027. In operation 1019, an indicator for a version of the driver is retrieved from the deployment entry. If no version of the driver is installed on the client device, execution proceeds to operation 1023. However, if a version of the driver is already installed on the client device, execution proceeds to operation 1021 only if the version of the driver identified in the deployment entry is newer (or has a higher version number) than the version installed on the client device. In operation 1021, the version of the driver installed on the client device (and having a lower number version than the driver version identified in the configuration file) is uninstalled.

In operation 1023, any argument values included in the deployment entry are retrieved, and in operation 1025, the deployment of the driver is performed using any argument values retrieved from the deployment entry. The deployment of the driver may include installing the driver on the client device using, for example, a setup information file identified in the deployment entry. The setup information file (or other deployment/installation file) may be retrieved from a driver-store of the client device, retrieved from a configuration repository (e.g., a configuration repository server) or other server, or retrieved from another storage medium accessible by the client device. In some examples, the deployment entry includes an indicator for a reboot, in which case a reboot of the client device is facilitated following the deployment of the driver.

Following deployment of the driver, it is determined whether the current deployment configuration file includes any further deployment entries in operation 1027. If all deployment entries have been processed, execution ends in operation 1031. However, if at least one deployment entry remains to be processed, execution passes to (optional) operation 1029 and then to operation 1013 to performing a deployment according to a next deployment entry. In operation 1029, the deployment configuration file is modified to remove from the deployment configuration file the deployment entry for the driver which was deployed in operation 1025.

In an alternative method of deployment, the deployment configuration file may be modified to remove, from the deployment configuration file, the deployment entry or entries being retrieved for deployment of a driver (i.e., modifying the deployment configuration file prior to executing the deployment operations 1015-1027). For example, operation 1029 may be performed after operation 1013 or at any point between operations 1013 and 1027.

All operations shown in FIG. 10 may be performed automatically without the intervention of a user. While the deployment of a driver on a client device was described in the context of FIG. 10, a very similar process can be used to deploy an application on a client device.

Figure 11:
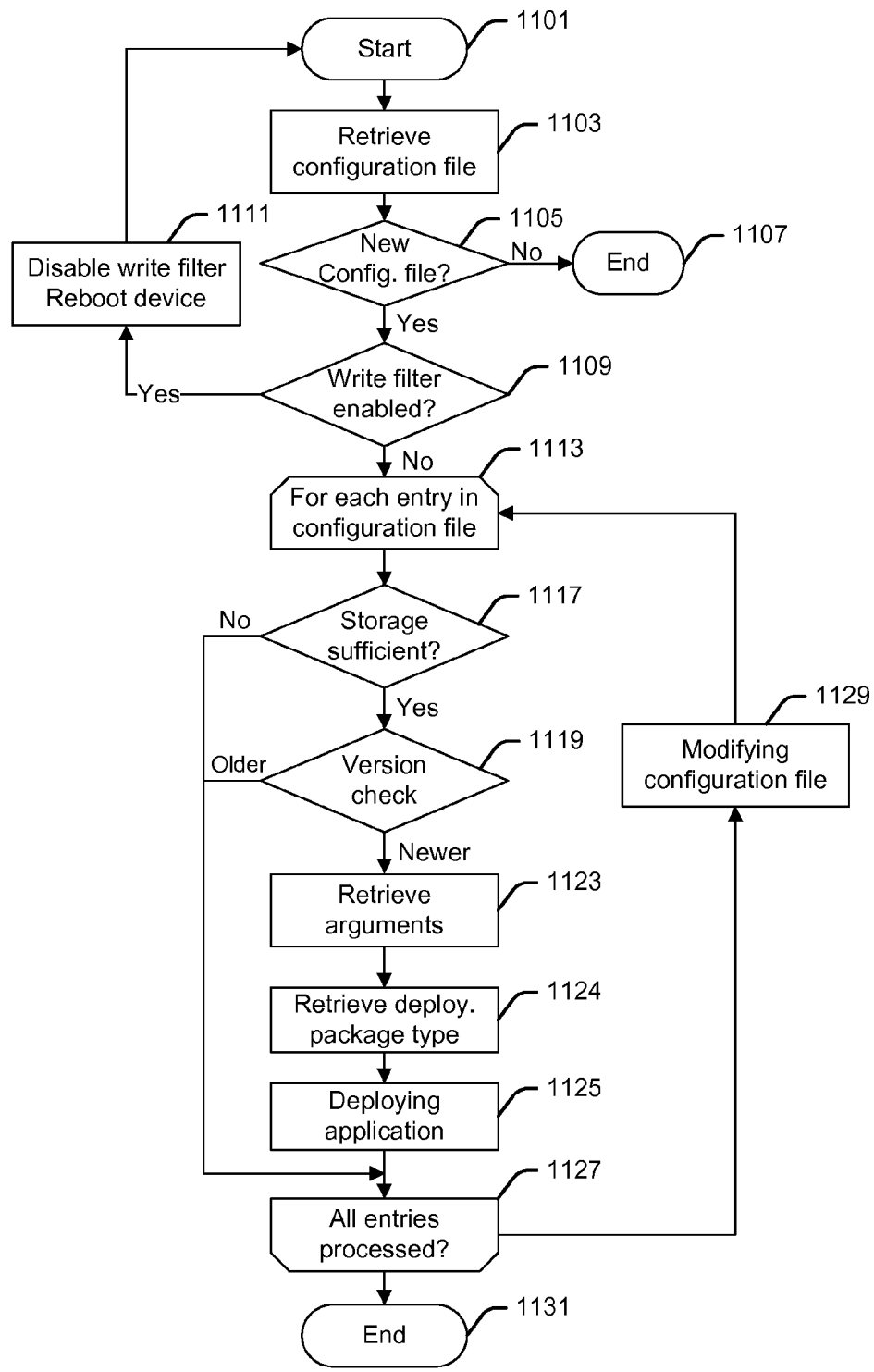
FIG. 11 illustrates an example of a process for automatically deploying one or more applications on a client device using a deployment configuration file.
Figure 12A:
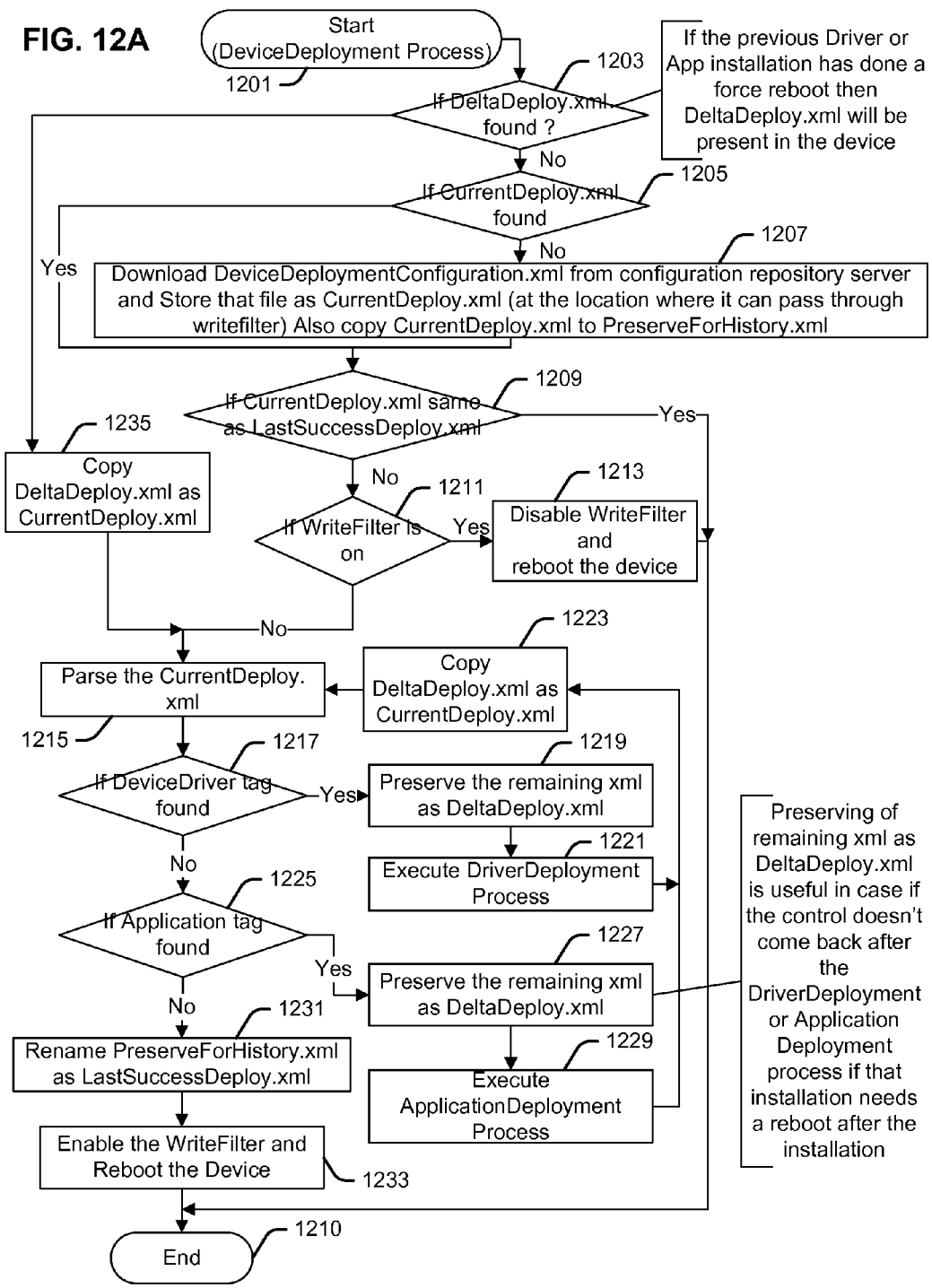

FIG. 11 illustrates an example of a process for automatically deploying an application on a client device using a deployment configuration file. The deployment configuration file includes application deployment entries, and in the example shown in FIG. 11, at least one deployment entry includes information for deployment of an application on the client device. While a deployment may be referred to herein as relating to an application, it is understood that the deployment can more generally relate to an application, an application upgrade, a feature update, a security patch, or the like. The process shown in FIG. 11 includes operations that are substantially similar to the operations shown and described in relation to FIG. 10. In interpreting FIG. 11, reference should therefore be made to the description of similar operations in FIG. 10, substituting instances of "driver" with "application." The process shown in FIG. 11 can be performed by an update agent module 812 of a client device, and in particular by a deployment module 816 and/or an application deployment module 820 of the client device.

In FIG. 11, however, an older version of an application may not need to be uninstalled from the client device prior to deployment of a newer version of the application. Instead of uninstalling the older version of the application prior to installing the newer version of the application, the deployment may simply upgrade the application to the newer version based on a deployment entry. As a result, a step of uninstalling an older version of the application may not be included prior to performing operations 1123-1125 to deploy the application as an application upgrade on the client device. Furthermore, in FIG. 11, an additional operation 1124 is included which does not have an equivalent operation in FIG. 10. Operation 1124 is performed following operation 1123 in which any argument values included in the deployment entry are retrieved, and before operation 1125 in which the deployment of the application is performed using any argument values retrieved from the deployment entry. A deployment entry for an application generally includes an identifier for an application installation package, such as an executable or archive file (e.g., ".exe", ".msi", ".msu", or ".cab" file) for performing the application installation and deployment. In operation 1124, the type of application installation package is determined based on an identifier or other indicator retrieved from the deployment entry. The deployment of the application in operation 1125 is then performed based on the retrieved type of the installation package. The application installation/deployment package (or other deployment/installation file) may be retrieved from a memory of the client device, from a configuration repository, or from another other server or storage medium accessible by the client device. All operations shown in FIG. 11 may be performed automatically without the intervention of a user.

In an alternative method, the operations described in FIGS. 10 and 11 may be combined or modified in such a way that a driver(s), an application(s), a feature update(s), and/or a security patch(es) may be deployed, and a deployment configuration file may identify a driver(s), an application(s), a feature update(s), and/or a security patch(es). In FIG. 10, the term "driver" may be substituted with a term "driver(s), application(s), feature update(s), and/or security patch(es)," and in FIG. 11, the term "application" may be substituted with a term "driver(s), application(s), feature update(s), and/or security patch(es)."

Figure 12B:
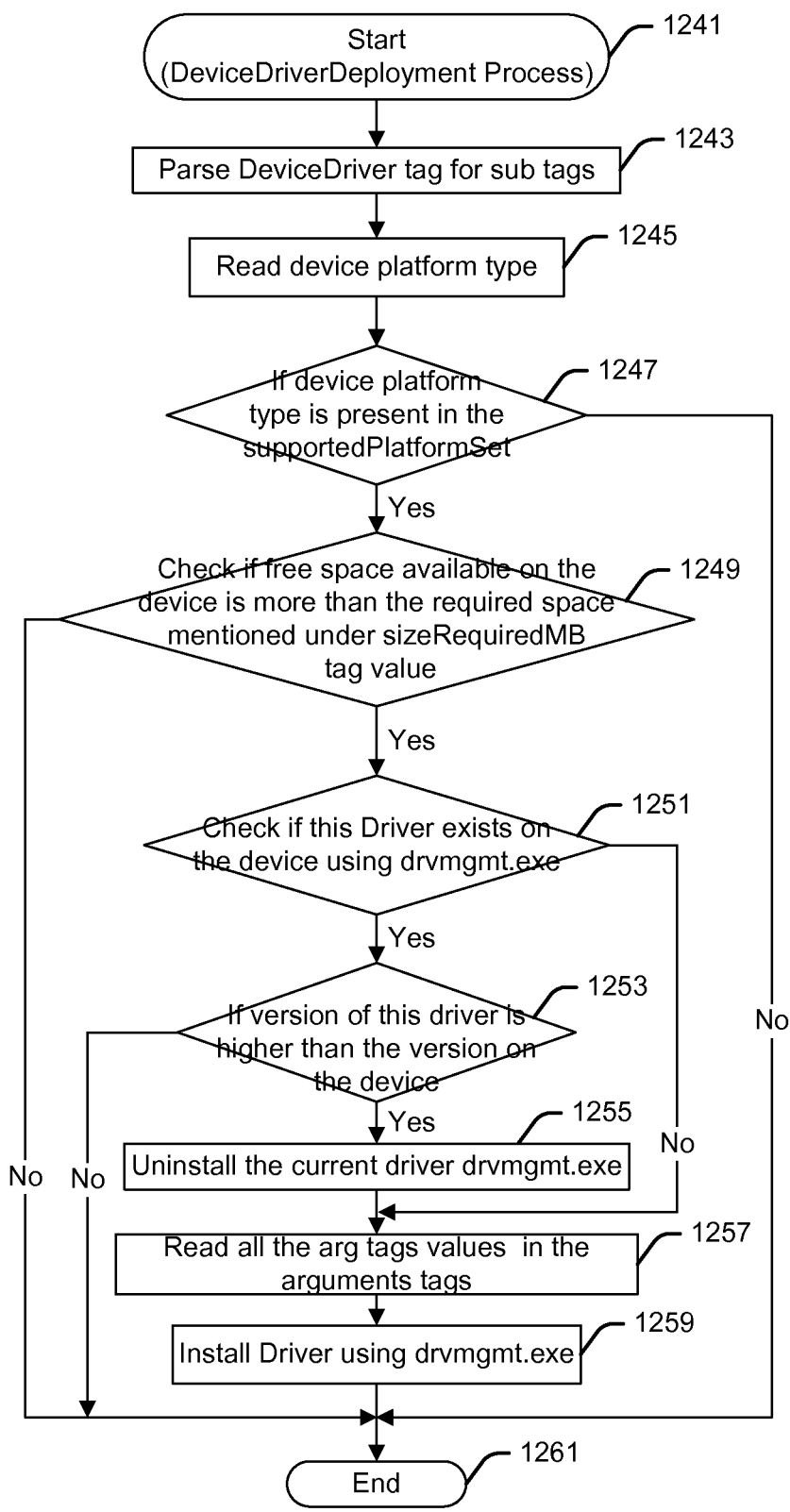

FIGS. 12A, 12B, and 12C show particular examples of the processes described in relation to FIGS. 10 and 11. In the example shown in FIGS. 12A-12C, a single deployment configuration file may include deployment entries for deployment of driver(s) and deployment entries for deployment of application(s), feature update(s), security patch(es), and/or the like. The processes of FIGS. 12A-12C can be performed by an update agent module 812 of a client device, and in particular by a deployment module 816, a driver deployment module 818, and/or an application deployment module 820 of the client device. In the process flow diagram of FIG. 12A, both driver and application deployments are sequentially performed depending on whether a "DeviceDriver" or an "Application" tag (e.g., a device driver tag or an application tag) is identified in a deployment entry. All operations shown in FIGS. 12A-12C may be performed automatically without the intervention of a user.

The processes of flow diagrams of FIGS. 12A-12C can be used to manage device drivers on Windows Embedded Standard 7 Thin client Runtime Images, by automatically deploying drivers on the images. The processes can further be used to add XML-based deployment support to third-party device drivers and applications. During the boot of a client device, the process may begin in operation 1201 with a background service call of an update agent (e.g., such as an update agent module 812). The update agent may check whether a delta deployment (e.g., "DeltaDeploy.xml") configuration file or a current deployment (e.g., "CurrentDeploy.xml") configuration file can be located in a memory of the client device (operations 1203 and 1205). If neither delta nor current deployment configuration files are found, the background service call to the update agent results in the update agent discovering a configuration server repository, for example on configuration repository server 104. The update agent checks whether a deployment configuration file (such as "DeviceDeploymentConfig.xml" file) is present in the repository. If the deployment configuration file does exist, then the update agent downloads the deployment configuration file and stores the file as a current deployment configuration file (e.g., as "CurrentDeploy.xml") at a location in the memory of the client device that is exempt from the write-filter (operation 1207). The update agent may also copy the current deployment configuration file to an archive file (e.g., "PreserveForHistory.xml"). The update agent then checks whether the deployment configuration file is already applied on to the device (operation 1209). The checking can be performed, for example, by determining whether a "LastSuccessDeploy.xml" (which can be referred to as a last successful deployment file or a last successful deployment configuration file) corresponding to the last deployment configuration file processed on the client device, is the same as the current deployment configuration file (e.g., "CurrentDeploy.xml") retrieved from the repository. If the files are found to be the same, the process ends in operation 1210. If the files are found to be different, then the update agent proceeds to operation 1211, where the update agent disables a write filter if one is enabled on the client device and facilitates a reboot of the client device (operation 1213).

In one alternate example, the update agent may store the current deployment configuration file at a location in the memory of the client device that is not exempt from the write-filter in operation 1207. The update agent may then, upon determining that the last successful deployment file and the current deployment configuration files are different in operation 1209, preserve or store the current deployment configuration file locally in a location in the memory of the client device that is exempt from the write-filter.

On the next boot of the client device, the same device deployment process is initiated (operation 1201). However, now the current deployment configuration file (e.g., "DeviceDeploymentConfig.xml") is stored locally and the write filter state is disabled. Upon locating the current deployment configuration file in operation 1205, the update agent will proceed through operations 1209 and 1211. After determining that the write-filter is now disabled, the update agent proceeds to operation 1215. At this point, the update agent can start executing the deployment jobs mentioned in the deployment configuration file.

An exemplary deployment configuration file can include two different deployment jobs, one application deployment job and one device driver deployment job. After parsing the current deployment configuration file (operation 1215), the update agent retrieves a deployment entry from the current deployment configuration file having a device driver tag (operation 1217). The update agent removes the retrieved deployment entry from the current deployment configuration file, and preserves the remaining deployment entries of the current deployment configuration file in a delta deployment configuration file (operation 1219). The process then proceeds to operation 1221 for execution of the driver deployment process. Similarly, if a deployment entry having an application tag is retrieved (operation 1225), the update agent removes the retrieved deployment entry from the current deployment configuration file, preserves the remaining deployment entries of the current deployment configuration file in a delta deployment configuration file (operation 1227), and proceeds to operation 1229 for execution of the application deployment process.

In case any of the deployment jobs performed in operations 1221 or 1229 needs a reboot before completion (and before moving on to a next deployment process), the following process is completed. Once a specific deployment job is read from the deployment configuration file (operations 1215, 1217, 1225), the remaining deployment configuration file is stored as a delta deployment configuration file "DeltaDeploy.xml" (which can be referred to as a delta deployment file or intermediary deployment configuration file) (operations 1219, 1227). If the specific deployment job triggers a reboot, the update agent process checks in operation 1203 whether a delta deployment configuration file (e.g., "DeltaDeploy.xml") exists on the next boot of the device, before it checks in operation 1205 for the full deployment configuration file (e.g., "CurrentDeploy.xml"). If a delta deployment configuration file exists, the update agent copies the delta deployment configuration file as the current deployment configuration file (operation 1235), and deployment proceeds with operation 1215 based on the delta file. Otherwise, deployment proceeds based on the full deployment configuration file in operation 1205.

If the deployment job in operations 1221 or 1229 does not require a reboot, upon completion of the deployment job, the update agent copies the delta deployment configuration file as the current deployment configuration file (operation 1223), and deployment proceeds with operation 1215 based on the delta file. Once all deployment entries have been processed, no device driver or application tags will be found (operations 1217, 1225), and update agent proceeds to operation 1231. In operation 1231, the update agent renames the archive file (e.g., "PreserveForHistory.xml") to be the last successful deployment file (e.g., "LastSuccessDeploy.xml"). The write-filter is enabled prior to rebooting the client device (operation 1233).

FIG. 12B illustratively shows the driver deployment process performed in operation 1221 in greater detail. Upon initiating the driver deployment process (operation 1241), the deployment entry corresponding to the driver deployment job is parsed in operation 1243, and various indicators are retrieved from the deployment entry. The hardware platform type (and/or hardware platform class) of the client device is determined in operation 1245. In operation 1247, the update agent determines whether the client device's hardware platform (or class) is included among the supported platforms included in the deployment entry. Before executing each deployment job, the availability of disk free space on the device is checked to see whether the deployment activity can be executed or not (operation 1249). If enough disk space is available to install the specific application or device driver mentioned in the deployment configuration file, execution of the deployment activity will continue. Otherwise, the update agent will move on the next deployment job. In operation 1251, the update agent checks whether the driver corresponding to the deployment entry is already present or installed on the client device. If present, the version of the installed driver is checked to determine whether the driver of the deployment entry is newer (or is of a higher numbered version) than the installed driver (operation 1253). If found to be necessary, the installed driver is uninstalled (operation 1255). The argument tag values are then retrieved from the deployment entry (operation 1257), and the driver is installed (operation 1259). In general, the driver may be installed using an install module of a driver management application such as that describe in relation to FIGS. 9A-9I. The driver deployment process ends in operation 1261.

FIG. 12C illustratively shows the application deployment process performed in operation 1229 in greater detail. Upon initiating the application deployment process (operation 1265), the deployment entry corresponding to the application deployment job is parsed in operation 1267, and various sub-tags, indicators, identifiers, or the like are retrieved from the deployment entry. In operation 1269, the update agent checks whether the application corresponding to the deployment entry is already present or installed on the client device. If present, the version of the installed application is checked to determine whether the application of the deployment entry is newer (or is of a higher numbered version) than the installed application (operation 1271). If the application is not installed on the device, or if the deployment entry corresponds to a higher version of an application installed on the device, the update agent proceeds to operation 1273 to determine whether sufficient storage space is available on the client device. If sufficient storage is available, the update agent determines whether the deployment entry identifies a type of installation package used for the deployment of the application (operation 1275). The deployment process execute each specific deployment job based on the type of deployment package indicated in the deployment configuration file. The deployment package can be of different types, such as ".cab" (e.g., for feature updates), ".msi", ".msu" (e.g., for security patches), "setup.exe", or the like. Each type of package may need a different method of installation process. If a cab (operation 1277), msi (operation 1279), or msu (operation 1281) package is identified, argument tag values are read from the deployment entry (operation 1283) and a respective installation package deployment application is called with the argument tag values (operations 1285, 1287, 1289). For example, msi packages can be installed using msiexec.exe. For each of these processes, the command line arguments will be read from an arguments tag corresponding to the deployment job and the arguments are passed to the installation process. If no known installation package type is specified in the deployment entry, the argument tag values are read from the deployment entry (operation 1291), and a process is executed to install the application package with the argument tag values in operation 1293. The application deployment process ends in operation 1295.

Figure 13A:
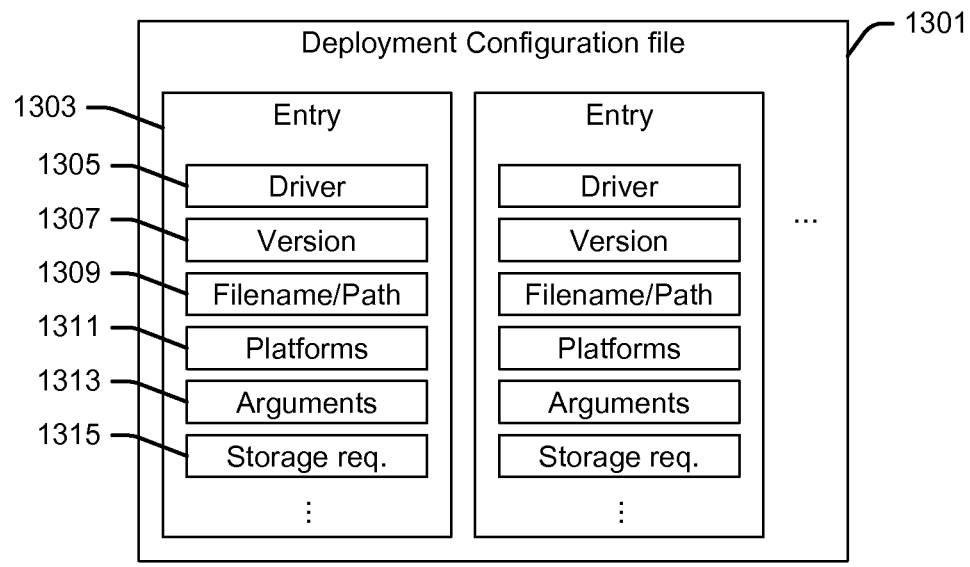
FIGS. 13A and 13B show examples of data structures for storing deployment configuration files and associated data.
Figure 13B:
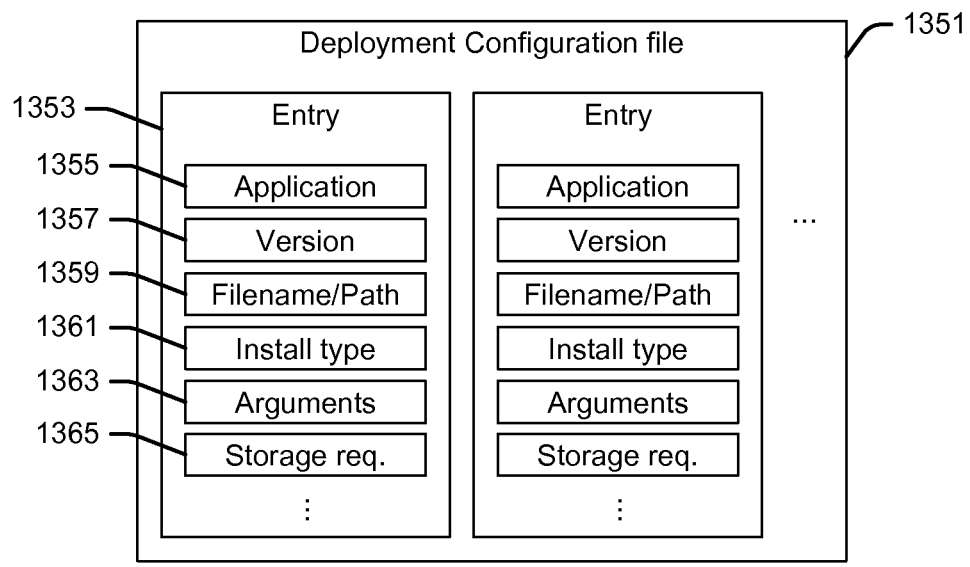

FIGS. 13A and 13B illustratively show data structures 1300, 1350 for storing deployment configuration files 1301, 1351 such as the deployment configuration files used in the processes of FIGS. 10, 11, and 12A-12C. Each deployment configuration file 1301, 1351, includes one or more deployment entries 1303, 1353. Deployment configuration file 1301 is a configuration file including entries 1303 corresponding to driver deployments only, while configuration file 1351 is a configuration file including entries 1353 corresponding to application deployments only. More generally, however, a configuration file can include deployment entries corresponding to driver and to application deployments. Each deployment entry 1303 corresponding to a driver deployment includes identifiers for the driver 1305 (e.g., driver name, driver type, driver description, and/or the like), driver version 1307 (e.g., a numerical identifier), filename or path for a setup information file for installing/deploying the driver 1309, supported platform(s) or class(es) 1311, arguments 1313, storage requirements 1315, or the like. Arguments 1313 may include identifiers for indicating that a reboot should be facilitated following installation of the driver, for a type of a setup information file, and for a path of a storage location at which to install the driver. Each deployment entry 1353 corresponding to an application deployment includes identifiers for the application 1355 (e.g., application name, application description, or the like), application version 1357 (e.g., a numerical identifier), filename and/or path for an application installation package or file 1359, a type of the installation package or file 1361 (such as an identifier for a feature update, a security patch, or another type), supported platform(s) or class(es), arguments 1363, storage requirements 1365, or the like. Arguments 1363 may include identifiers for indicating that a reboot should be facilitated following installation of the application, and for a path of a storage location at which to install the application.

Automatic Updating of Applications and Drivers

Figure 14A:
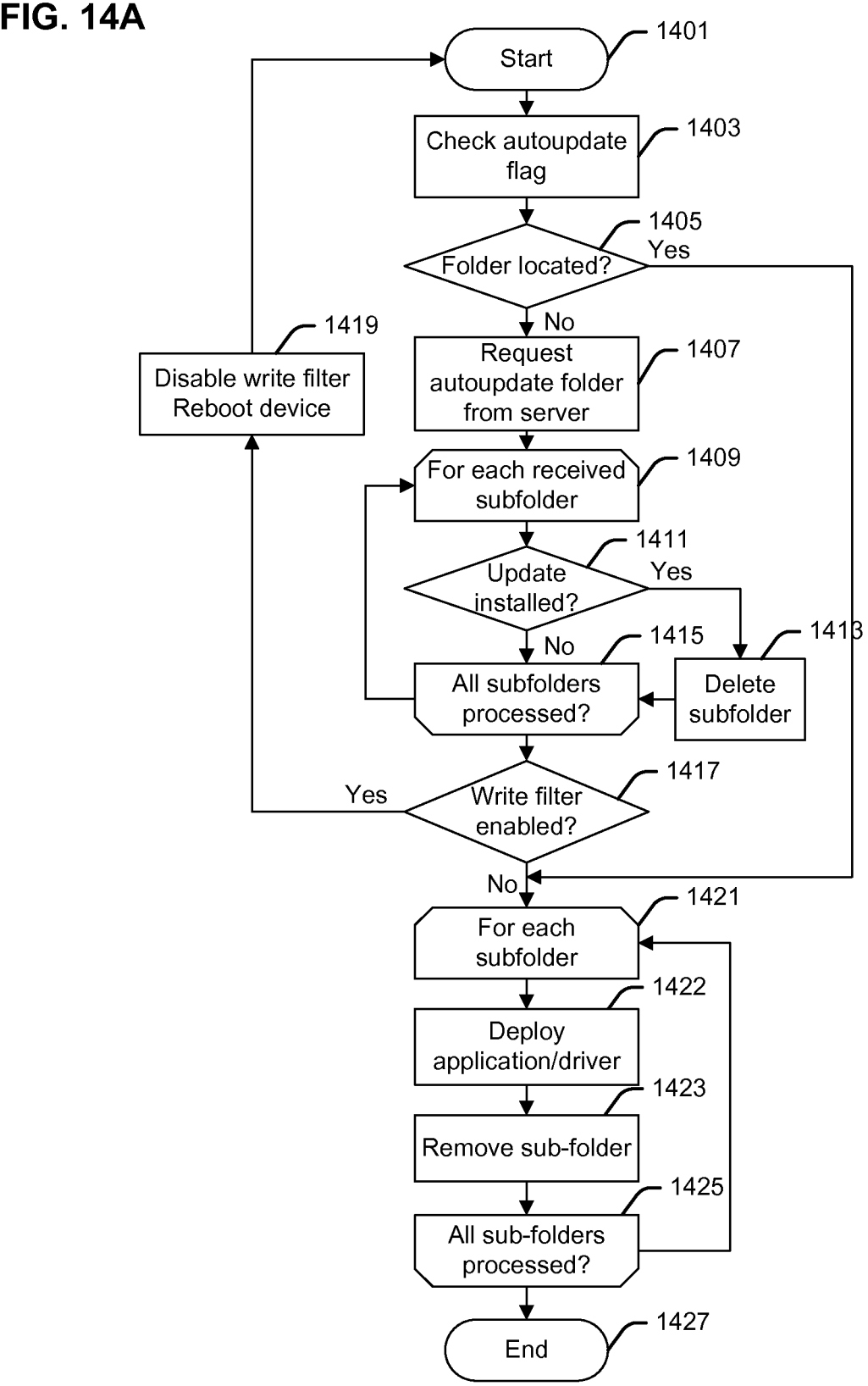
FIGS. 14A, 14B, and 14C illustrate examples of processes for automatically updating one or more drivers and/or applications on a client device using an autoupdate folder.
Figure 14B:
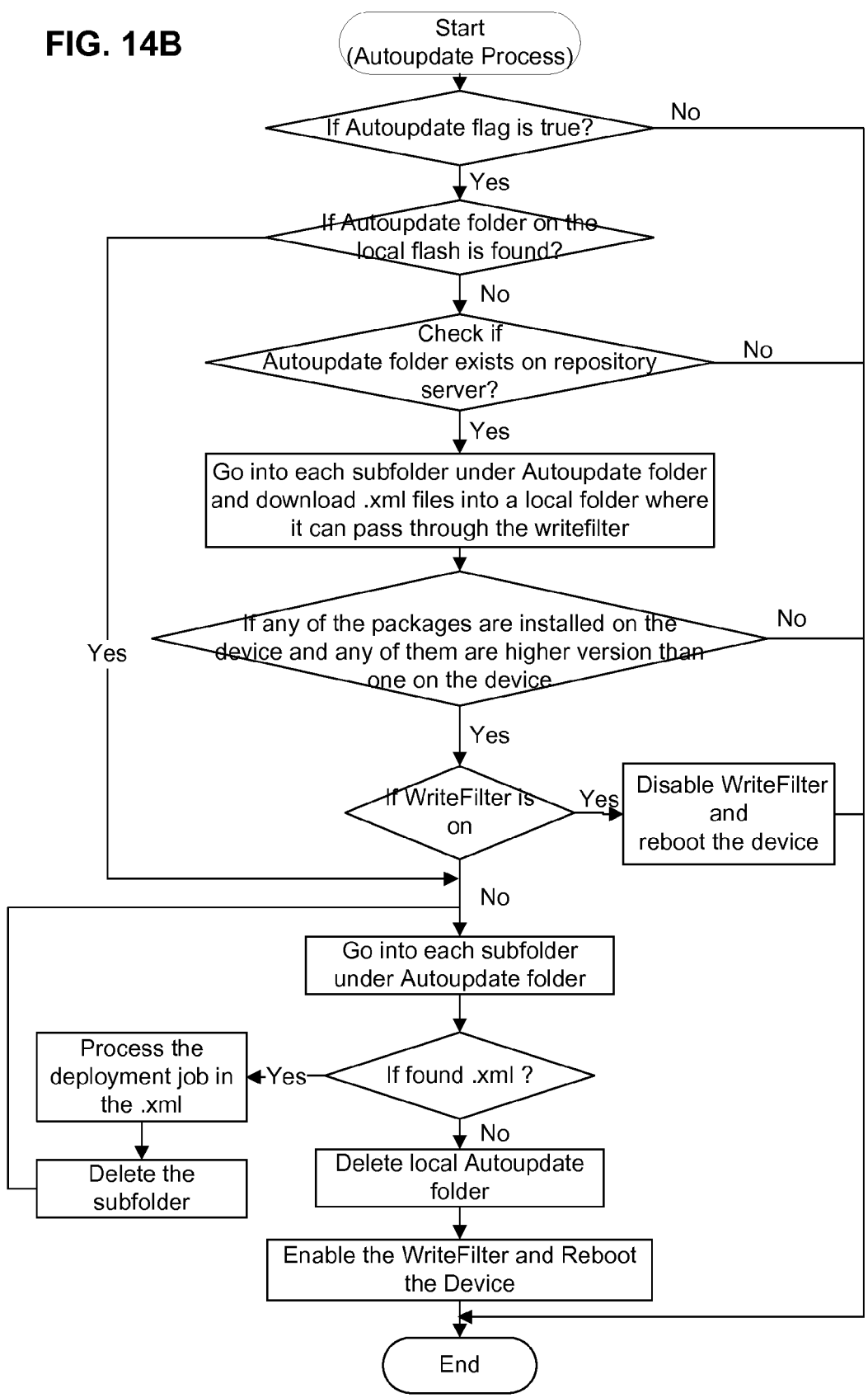
Figure 14C:
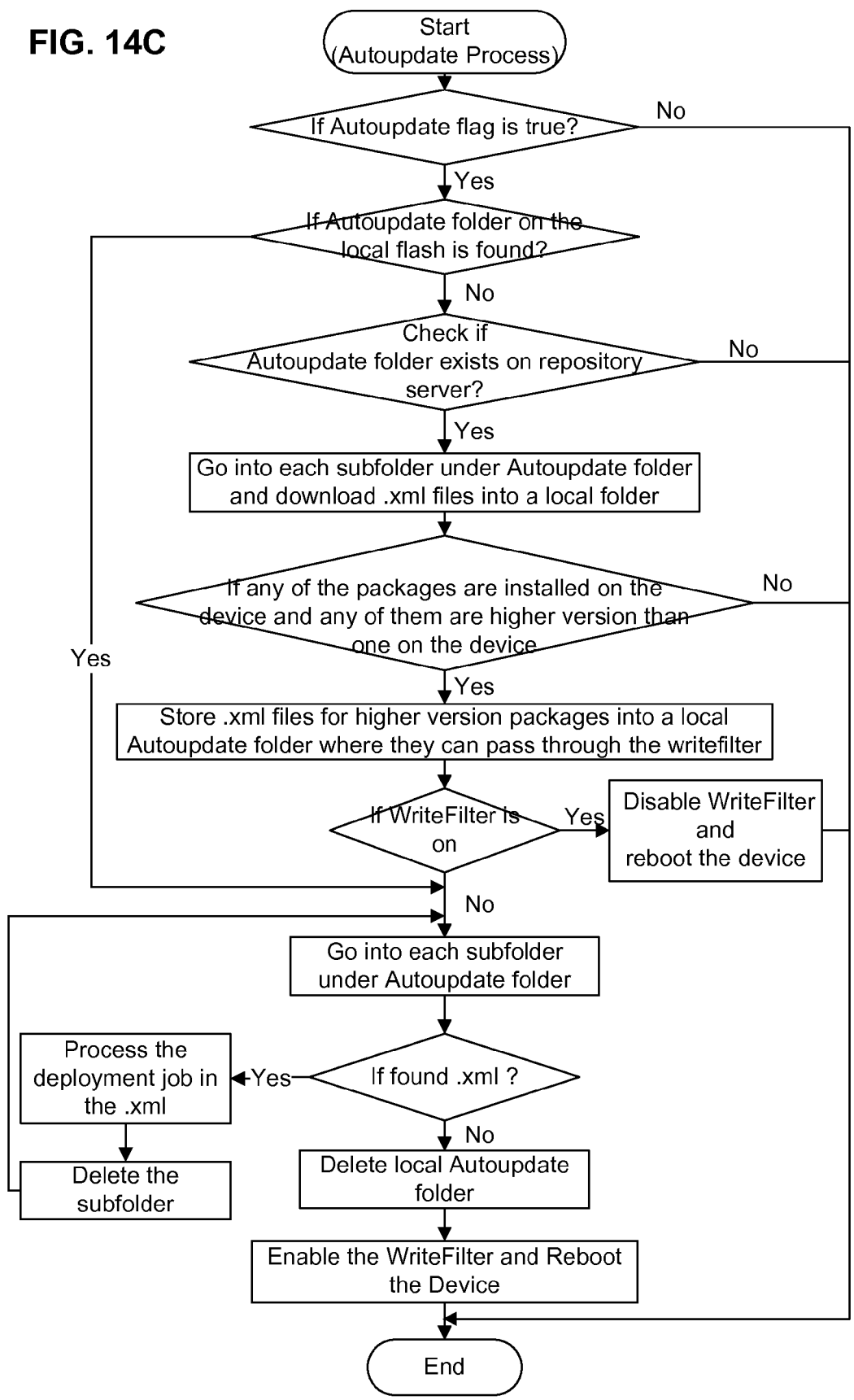

In one aspect, an approach for automatically updating applications or drivers on a client device is described in relation to FIGS. 14A, 14B, and 14C. The processes shown in FIGS. 14A-14C can be performed by an update agent module 812 of a client device, and in particular by a autoupdate module 814. Additional modules, such as a deployment module 816, a driver deployment module 818, and/or an application deployment module 820 can additionally be used. FIG. 14A shows a example of a flow diagram corresponding to a process for automatically updating an application or driver on a client device.

The process starts in operation 1401, and is generally initiated upon boot up of the client device. In operation 1403, the status of an autoupdate flag is checked on the client device, to determine whether the autoupdate flag is set for allowing automatic updates. If the automatic update flag is set, operation proceeds to operation 1405. In operation 1405, a determination is made as to whether an autoupdate folder exists on a memory of the client device. In general, the local autoupdate folder is a folder on the client device having a plurality of subfolders, each subfolder containing a deployment configuration file having information for installing or deploying a driver, an application, or an update for a driver or application on the client device. In general, an application may also refer to a feature update and a security patch, as used herein. In one aspect, the deployment configuration file includes a deployment entry corresponding to a package for updating an application or a driver, and the deployment entry includes identifiers for the package and for a version of the package. If a local autoupdate folder is located, operation proceeds to operation 1421. Otherwise, operation proceeds to operation 1407, in which it is determined whether a configuration repository, such as configuration repository server 104, has an autoupdate folder or other autoupdate data thereon. In operation 1407, the client device checks to determine whether an autoupdate folder or other autoupdate data exists on a server (e.g., server 104). In one aspect, the checking involves using an ftp or other transfer protocol to establish a connection to the server in order to verify whether an autoupdate folder or other autoupdate data is stored on the server (e.g., server 104), and receiving on the client device and storing in a local memory an autoupdate folder and files contained therein, and/or other autoupdate data. The autoupdate folder may include one or more subfolders. In general, a different subfolder is provided for each different update. As such, a different subfolder can be provided for each different driver or application requiring an update, and each subfolder can include a deployment configuration file corresponding to the update. In some aspects, each subfolder additionally includes a package or other setup or installation file corresponding to the update. If one driver or application requires multiple updates, multiple subfolder corresponding to each of the updates can be provided. Each of the subfolders of the autoupdate folder on the server is transmitted to the client device, and the client device receives each of the deployment configuration files in the subfolders and stores the deployment configuration files in an autoupdate folder in a memory of the client device. In general, the autoupdate folder is not subject to write-filter restrictions. If no update folder or subfolders are available on the server, the client device may receive a response from the server indicating that no autoupdate data or folder is available. If a folder or data is received, operation proceeds to operation 1409.

Operations 1409-1415 form a loop which is repeated for each subfolder identified in the received autoupdate folder. For each subfolder of the autoupdate folder, a verification is performed in operation 1411 to determine whether the particular update corresponding to the subfolder has already been deployed or installed on the client device. The determination can be performed by retrieving the deployment configuration file stored in the subfolder, and determining whether the retrieved file corresponds to an update that has already been deployed or installed. In general, a deployment configuration file from an autoupdate includes a single deployment entry for performing an update of a single driver or application. If the update is determined to already be installed, or if the update has a lower version number than a corresponding driver or application installed on the client device, the subfolder containing the update is deleted in operation 1413 and a next subfolder is considered. If the update is not installed, operation proceeds to operation 1415. From operation 1415, if any subfolders still require processing, operation proceeds back to operation 1409. Once all subfolders have been processed, operation proceeds to operation 1417.

In operation 1417, the operational status of a write filter on the client device is determined. If the write filter is enabled and active, operation 1419 is performed to disable the write filter, reboot the client device, and restart the process. However, if the write filter is not enabled, the autoupdating operation proceeds to operation 1421.

Operations 1421-1425 form a second loop that is performed for each subfolder in the local autoupdate folder. For each subfolder in the local update folder, an application, driver, or update for an application or driver is deployed or installed in operation 1422. The deployment is generally performed based on one or more files stored in the subfolder, such as a deployment configuration file stored in and retrieved from the subfolder. The deployment can be performed substantially as described in operations 1013-1029 of FIG. 10 or operations 1113-1129 of FIG. 11, for example. In general, the deployment is performed based on a deployment configuration file stored in the subfolder. The deployment may involve retrieving one or more setup information file(s) and/or installation packages or files identified in the deployment configuration file from a local or a remote storage. In one example, an installation file is retrieved from a remote server (e.g., server 112). In another example, an installation file is retrieved from local storage, e.g. from the subfolder on the client device storing the deployment configuration file corresponding to the installation file. Once the deployment is complete, the subfolder and its contents (including any deployment configuration file(s), setup information file(s), and/or installation package(s)) are removed and/or deleted from memory in operation 1423. The loop finishes in operation 1425, where operation either returns operation 1421 if any further subfolders are present, or ends in operation 1427 is all subfolders have been processed.

FIG. 14B shows a flow diagram of an exemplary autoupdate process in accordance with the principles of the process described in relation to FIG. 14A. The flow diagram of FIG. 14B shows a process for automatic updates of thin client components (applications or drivers).

During the booting process of a client device, a service call to an update agent service is initiated. If an autoupdate flag is set in the registry, the update agent connects to or discovers a configuration repository (e.g., a configuration repository server), and checks if an autoupdate folder exists in the repository. If an autoupdate folder exists, a deployment configuration file is retrieved from each subfolder (or each package folder), downloaded to the client device, and stored or preserved in an autoupdate folder and/or subfolder on the client device. The autoupdate folder and its sub-folders are generally not subject to write-filter restrictions, such that folders and files stored therein can pass through the write filter.

Once the deployment configuration files are stored on the client device, the client device checks if any of the packages identified in the deployment configuration files (i.e., updates, setup information files, installation packages or files) are already installed on the client device, or if any of the packages have higher version numbers or are newer than corresponding applications, drivers, or updates installed on the client device. The client device further checks the write filter state of the device, and if the write filter is in an enabled state, the client device disables the write filter and facilitates a reboot of the client device.

If a reboot is facilitated, on the next boot of the device, the same process comes up. However, now that the deployment configuration files are stored locally and that the write filter state is disabled, the client device will start executing the deployment process according to the information mentioned in each of the deployment configuration files, and will delete each deployment configuration file after executing the specific deployment job associated with the deployment configuration file.

Once all the deployment jobs are executed, the client device will enable the write filter and facilitate a reboot of the client device.

This update agent service can keep checking either or both of the local autoupdate folder and the configuration repository's autoupdate folders for any updates of any components (applications and/or drivers) every 10 minutes, for example, or any other configured time delay, time period, or time interval.

FIG. 14C shows a flow diagram of an exemplary autoupdate process in accordance with the principles of the process described in relation to FIGS. 14A and 14B. The flow diagram of FIG. 14C shows a process for automatic updates of thin client components (applications or drivers) substantially similar to that shown in FIG. 14B. However, in the process of FIG. 14C, ".xml" files (such as deployment configuration files) are downloaded from the autoupdate folder of a configuration repository (e.g., a configuration repository server), and stored on the client device. The client device then verifies whether the downloaded deployment configuration files correspond to packages installed on the client device and, if so, determines whether the downloaded deployment configuration files correspond to higher version of the packages than those installed on the device. If any of the deployment configuration files are determined to correspond to packages already installed on the device and having a higher version than the one installed on the device, the deployment configuration files for the determined packages are stored into an autoupdate folder on the client device, where the autoupdate folder and the files and sub-folders stored therein are configured to pass through the write filter. As a result, on the next reboot of the client device, the client device can retrieve the deployment configuration file from the autoupdate folder and process the deployment job associated with the deployment configuration file. The processes and operations shown in FIGS. 14A-14C may be performed automatically without the intervention of a user.

Figure 15:
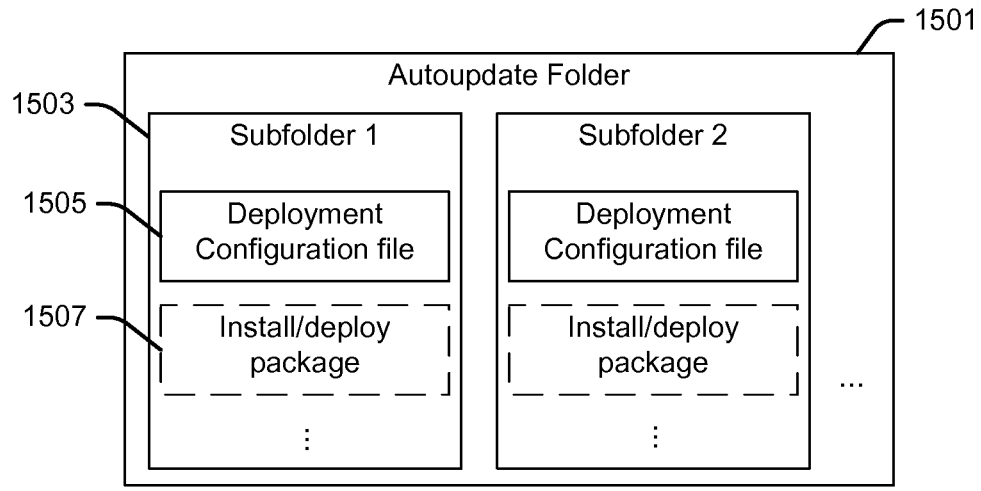
FIG. 15 shows an example of a data structure for storing an autoupdate folder and associated data.

FIG. 15 is a schematic diagram 1500 showing exemplary contents of an autoupdate folder data structure 1501. An autoupdate folder 1501, such as an autoupdate folder stored in a configuration repository (e.g., server 104), other server, or locally in a memory of a client device, includes one or more subfolders 1503. Each subfolder 1503 itself stores a deployment configuration file 1505, such as the deployment configuration files 1301 and/or 1351 of FIGS. 13A and 13B. In some examples, a single deployment configuration file is stored in each subfolder, the deployment configuration file 1503 is associated with a single driver or application, and the deployment configuration file 1503 therefore includes only a single deployment entry. In other examples, however, multiple deployment configuration files may be stored in a subfolder, and each deployment configuration file 1503 may include multiple deployment entries. Each subfolder 1503 can also, optionally, store one or more installation or deployment files or packages 1507, such as a setup information file for installing or deploying a driver, or an installation package for installing or deploying an application. In general, an autoupdate folder (or subfolder) on a client device does not store installation or deployment files or packages 1507, in order to use less storage space on the client device, while an autoupdate folder (or subfolder) on a server does store the installation or deployment files or packages 1507. When the autoupdate folder (or subfolder) of the client device does not store the installation or deployment files or packages 1507, the installation or deployment files or packages 1507 are retrieved from a remote storage location (e.g., a configuration repository) at the time of deployment (e.g., during operation 1422 of FIG. 14A).

In one aspect, the AutoUpdate folder may exist in a configuration server repository. The AutoUpdate folder may contain multiple folders based on the number of updates available for the devices. In one example, there may be three updates available, namely for applications such as ATIDriver, Mozilla and VMview. Each of the folders may include a set of files which include the installer components and an xml file (i.e., a deployment configuration file). In the example, a Mozilla folder may contain a "Firefox-4.0.1.2-en-US.msi" application installer, and "Firefox4.0.1.2.xml" xml file containing the application update details about the Firefox application. Similarly, a VMview folder may contain a "VMware-view-client-5.0.0-459783.exe" installer setup executable and a "VMviewclient-5.0.0-459783.xml" application update xml containing the update details of a VMView Client application.

In general, the Autoupdate xmls (i.e., deployment configuration files for autoupdates, such as those described in relation to FIGS. 14A-14C) may contain either only one Application tag or only one DeviceDriver tag based on the type of the component in that folder. However, in the case of deployment configuration files used for deployments that are not part of updates (e.g., such as those used in relation to the flow diagrams of FIGS. 10-12C), the "DeviceDeploymentConfig.xml" may contain multiple Application tags and/or DeviceDriver tags based on the number of different types of component deployment one may want to have for the thin clients.

In case of Autoupdate packages, the packages may be released in the folder format described in the previous paragraph (including a folder which contains installer files and a corresponding xml file for that component). An enterprise user having a configuration server may simply copy the entire folder onto the AutoUpdate folder of the user's configuration repository in order for the update associated with the folder to be installed on the enterprise user's thin client devices. When an UpdateAgent service executes the Autoupdate process on a thin client, the new update package which has been copied to the repository will get deployed onto the thin client. The "DeviceDeploymentConfig.xml" configuration file may either be provided by a vendor, or can be prepared by a system administrator based on the components that the system administrator wants to deploy/update on thin clients.

The approaches presented in relation to FIGS. 10, 11, 12A-12C, and 14A-B can be combined into a single process for updating and deploying drivers and application on client devices. FIG. 16A shows an exemplary flow diagram for this purpose.

The process begins in operation 1601, and is generally initiated upon boot up of the client device. In particular, the process can be initiated by the automatic execution of an update agent upon boot up of the client device. In operation 1603, a configuration repository is located or identified, for example based on a server address stored in a memory location associated with the update agent. If the repository, such as configuration repository server 104 or another appropriate repository, is located, an autoupdate process is performed in operation 1605, such as the autoupdate process described in relation to FIGS. 14A and 14B. Following completion of the autoupdate process, a deployment process is performed in operation 1607 to deploy drivers and/or applications on the client device. The deployment process can be performed in accordance with the deployment processes described in relation to FIGS. 10, 11, and 12A-12C. Following completion of the deployment process, the autoupdate process can be periodically performed (e.g., every 10 minutes) to verify whether any new updates are available on the configuration repository and, if so, perform the automatic updating in operations 1609 and 1611. The autoupdate loop (operations 1609 and 1611) may continue indefinitely, or the process may end at some time (operation 1613). The process shown in FIG. 16A may be performed automatically without the intervention of a user.

FIG. 16B shows another example of the process described in relation to FIG. 16A. The process of FIG. 16B can be implemented using an update agent running, for example, on a client device. The update agent can be a windows service which is started-up soon after network services are up, e.g., in Windows Embedded Standard 7 based thin clients. The update agent looks for a configuration repository (e.g., server 104) and checks if there are any updates in the configuration repository for any of the components (drivers and/or applications) on the client device. If updates are found, the update agent downloads the components and installs the components. After the completion of auto update process, the update agent looks for a deployment configuration file (e.g., "DeviceDeploymentConfig.xml") in the configuration repository. If the deployment configuration file is found, then the update agent will execute the device driver deployment or application deployment activity based on the kind of deployment mentioned in the deployment configuration file.

At least portions of the processes described in relation to FIG. 16B can be performed using an update agent application running on a client device. The update agent application may be a windows service which is started up soon after network services are up in WES 7 based thin client. The update agent looks for a configuration manager repository (e.g., such as a repository of configuration repository server 104) and, after checking that an autoupdate flag is enabled, checks if there are any updates available for any of the drivers, applications, or other components of a client device. If any updates are found, the update agent application downloads the update components, and installs the components. After the completion of auto update process, it will look for a deployment configuration file (such as "DeviceDeploymentConfig.xml") in the same repository. If the deployment configuration file is found, the update agent executes the device driver deployment or application deployment activity based on the kind of deployment mentioned in the deployment configuration file. Once the update agent finishes with all the deployments jobs mentioned in deployment configuration file, the update agent keeps running the auto update flow for every 10 minutes or with the predefined and configurable interval.

The flow diagram of FIGS. 16A and 16B can ensure that thin clients remain updated on a configurable time-period (e.g., 10 minutes). In general, the DeviceDeployment process may be executed only once for every boot during the booting up process of the device (see, e.g., FIGS. 12A-12C). As a result, if there are any updates in the repository that are related to a DeviceDeployment package or file, the updates may only be installed in a following boot cycle of the device. In the case of Autoupdate (see, e.g., FIGS. 16A and 16B), however, the autoupdate process may be repeated every few minutes. As a result, updates of components may be installed more promptly in the autoupdate flow diagram of FIGS. 16A and 16B.

For all the device drive deployment jobs, the update agent can utilize the driver management application (described in relation to FIGS. 9A-9I above) with appropriate function. For the application deployment, the update agent can use a standard mechanism of calling and causing execution of a deployment package type (e.g., msiexec.exe or msus.exe), or the update agent can use an executable mentioned in the deployment configuration file itself (for example, in the case of setup installer, the update agent may call a setup.exe or an other appropriate ".exe" file which is the part of the installer package itself).

Illustration of Subject Technology as Clauses

Illustration of Apparatus/Method/Machine Readable Storage Medium for Installing a Disk Image onto a Client Device Having a Hardware Platform of a Particular Class, Wherein the Disk Image Includes a Plurality of Drivers for a Plurality of Hardware Platforms (Described as Clauses)

The subject technology is illustrated, for example, according to various aspects described below. Various examples of aspects of the subject technology are described as numbered clauses (1, 10, 19, etc.) for convenience. These are provided as examples, and do not limit the subject technology.

Figure 17A:
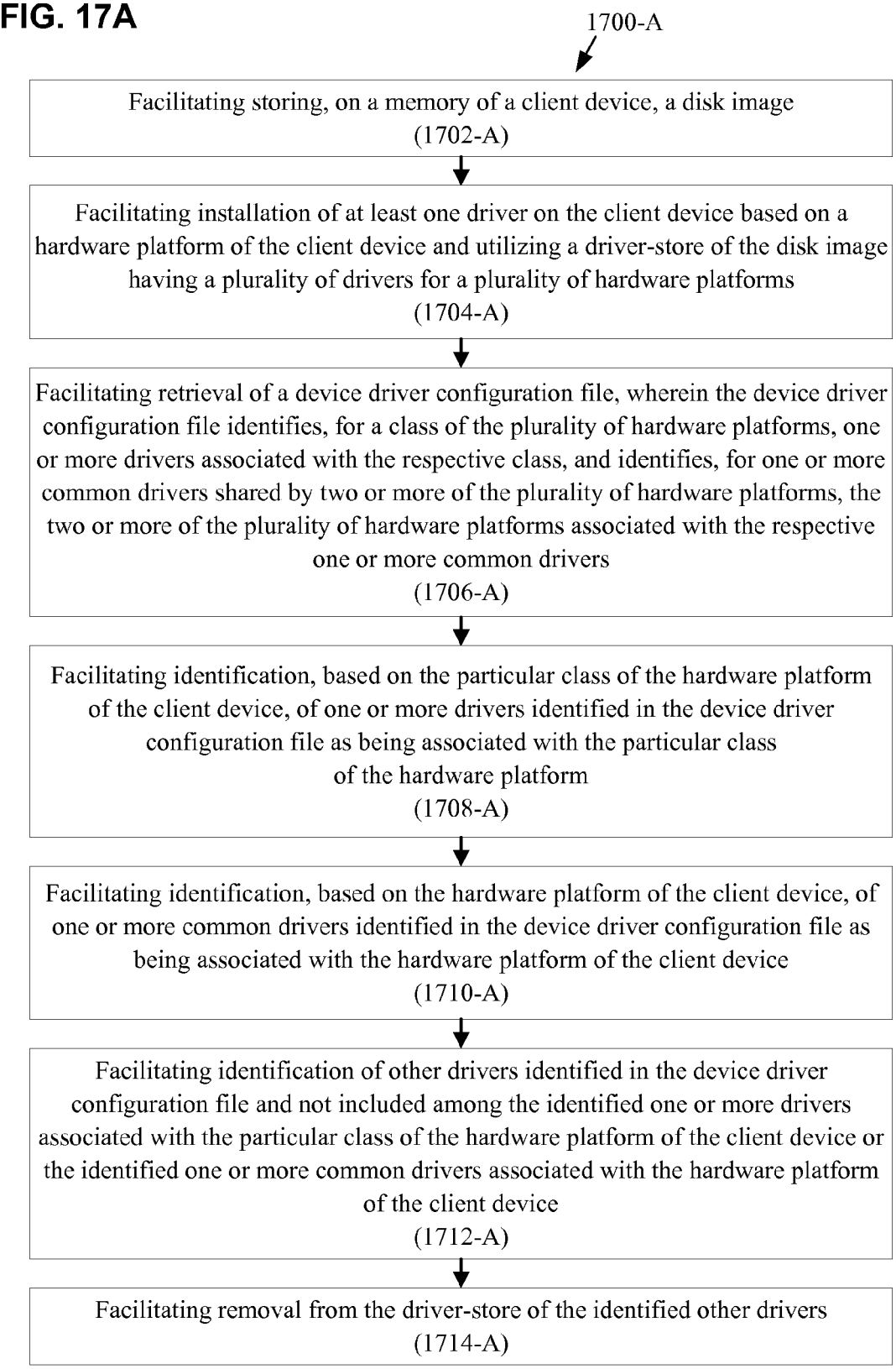
FIGS. 17A, 17B, and 17C are block diagrams representing examples of a method, a machine-readable storage medium encoded with instructions, and an apparatus for installing a disk image onto a client device having a hardware platform of a particular class, in accordance with one aspect of the disclosure.

1. A method (see, e.g., 1700-A in FIG. 17A) for installing a disk image onto a client device having a hardware platform of a particular class, wherein the disk image includes a plurality of drivers for a plurality of hardware platforms, the method comprising:

facilitating storing, on a memory of the client device, the disk image (see, e.g., 1702-A in FIG. 17A);

facilitating installation of at least one driver on the client device based on the hardware platform of the client device and utilizing a driver-store of the disk image having the plurality of drivers for the plurality of hardware platforms (see, e.g., 1704-A in FIG. 17A);

facilitating retrieval of a device driver configuration file, wherein the device driver configuration file identifies, for a class of the plurality of hardware platforms, one or more drivers associated with the respective class, and identifies, for one or more common drivers shared by two or more of the plurality of hardware platforms, the two or more of the plurality of hardware platforms associated with the respective one or more common drivers (see, e.g., 1706-A in FIG. 17A);

facilitating identification, based on the particular class of the hardware platform of the client device, of one or more drivers identified in the device driver configuration file as being associated with the particular class of the hardware platform (see, e.g., 1708-A in FIG. 17A);

facilitating identification, based on the hardware platform of the client device, of one or more common drivers identified in the device driver configuration file as being associated with the hardware platform of the client device (see, e.g., 1710-A in FIG. 17A);

facilitating identification of other drivers identified in the device driver configuration file and not included among the identified one or more drivers associated with the particular class of the hardware platform of the client device or the identified one or more common drivers associated with the hardware platform of the client device (see, e.g., 1712-A in FIG. 17A); and facilitating removal from the driver-store of the identified other drivers (see, e.g., 1714-A in FIG. 17A).

2. The method of clause 1, further comprising:

facilitating verification that the identified one or more drivers associated with the particular class of the hardware platform of the client device and the identified one or more common drivers associated with the hardware platform of the client device are installed on the client device.

3. The method of clause 1, further comprising:

following the installation of the at least one driver on the client device, facilitating verification of the installation status of the at least one driver on the client device;

facilitating determination, based on the verification of the installation status, that installation of a particular driver on the client device failed;

facilitating re-installation of the particular driver on the client device;

following the re-installation of the particular driver, facilitating verification of the re-installation status of the particular driver;

facilitating determination, based on the verification of the re-installation status, that re-installation of the particular driver on the client device failed; and facilitating reporting of a driver installation failure.

4. The method of clause 1, further comprising:

facilitating the application of a customization to the client device, based on user-specific customization information; and facilitating installation on the client device of one or more driver applications based on the hardware platform of the client device.

5. The method of clause 1, further comprising:

prior to facilitating identification of one or more drivers and facilitating identification of one or more common drivers, facilitating identification of the hardware platform of the client device and identification of the class of the hardware platform of the client device.

6. The method of clause 1, wherein the device driver configuration file is an extensible markup language (XML) file.

7. The method of clause 1, wherein the device driver configuration file is retrieved from the stored disk image.

8. The method of clause 1, wherein the disk image further includes a plurality of applications, and wherein prior to the facilitating storing the disk image, the method comprises:

facilitating installation of the plurality of applications on a memory of an image-build device, wherein the image-build device includes pre-existing drivers;

facilitating un-installation of the pre-existing drivers from the image-build device;

facilitating importation of the plurality of drivers for the plurality of hardware platforms onto a driver-store of the memory of the image-build device; and following the installation of the plurality of applications, the un-installation of the pre-existing drivers, and the importation of the plurality of drivers, facilitating creation of the disk image based on the memory of the image-build device having the plurality of installed applications and the plurality of imported drivers.

9. The method of clause 8, wherein the installation of the plurality of applications comprises installation of at least one third party application and installation of at least one original equipment manufacturer (OEM) application.

Figure 17B:
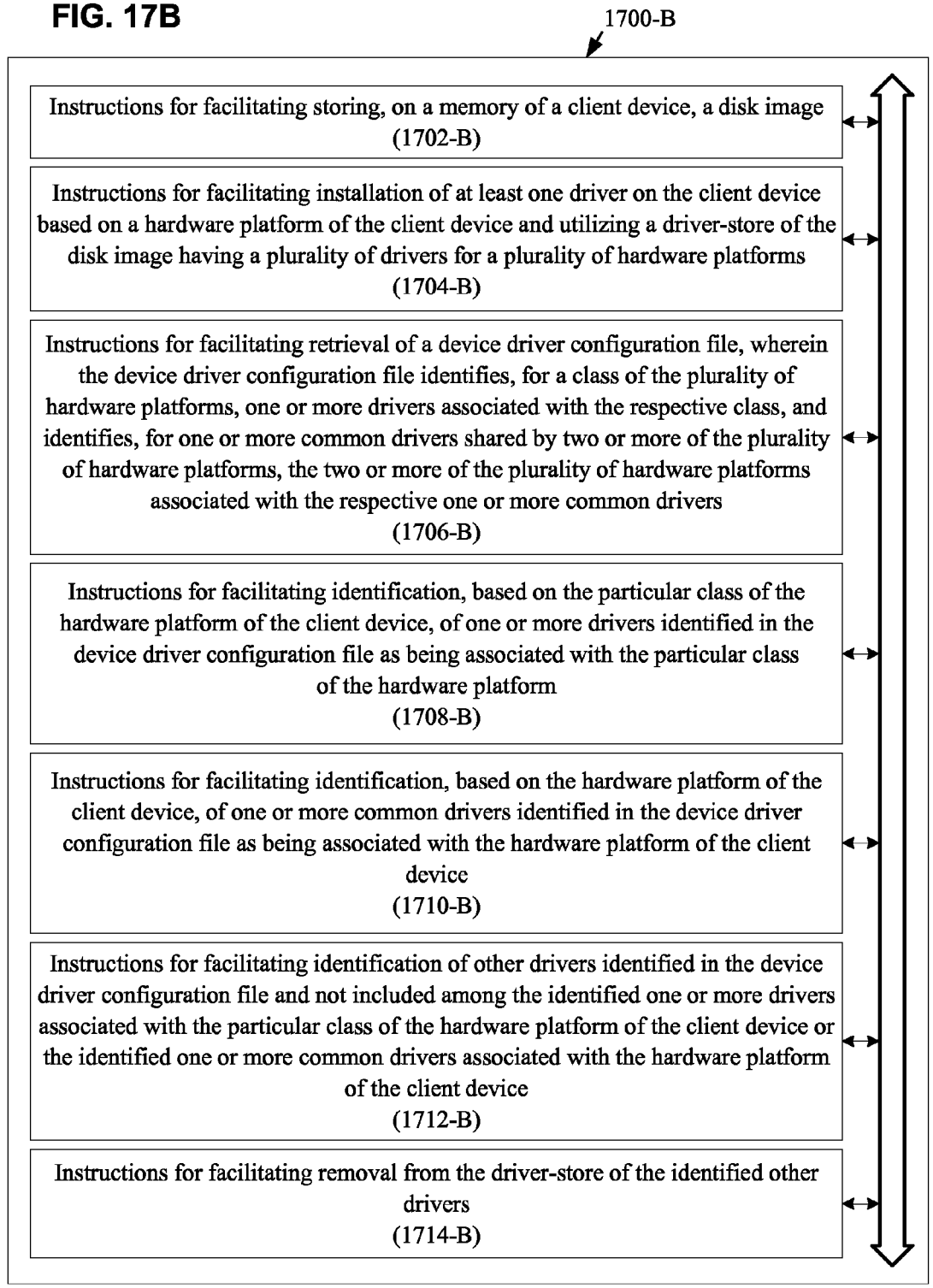

10. A machine-readable storage medium (see, e.g., 1700-B in FIG. 17B) encoded with instructions executable by one or more processors to perform one or more operations for installing a disk image onto a client device having a hardware platform of a particular class, wherein the disk image includes a plurality of drivers for a plurality of hardware platforms, the one or more operations comprising:

facilitating storing, on a memory of the client device, the disk image (see, e.g., 1702-B in FIG. 17B);

facilitating installation of at least one driver on the client device based on the hardware platform of the client device and utilizing a driver-store of the disk image having the plurality of drivers for the plurality of hardware platforms (see, e.g., 1704-B in FIG. 17B);

facilitating retrieval of a device driver configuration file, wherein the device driver configuration file identifies, for a class of the plurality of hardware platforms, one or more drivers associated with the respective class, and identifies, for one or more common drivers shared by two or more of the plurality of hardware platforms, the two or more of the plurality of hardware platforms associated with the respective one or more common drivers (see, e.g., 1706-B in FIG. 17B);

facilitating identification, based on the particular class of the hardware platform of the client device, of one or more drivers identified in the device driver configuration file as being associated with the particular class of the hardware platform (see, e.g., 1708-B in FIG. 17B);

facilitating identification, based on the hardware platform of the client device, of one or more common drivers identified in the device driver configuration file as being associated with the hardware platform of the client device (see, e.g., 1710-B in FIG. 17B);

facilitating identification of other drivers identified in the device driver configuration file and not included among the identified one or more drivers associated with the particular class of the hardware platform of the client device or the identified one or more common drivers associated with the hardware platform of the client device (see, e.g., 1712-B in FIG. 17B); and facilitating removal from the driver-store of the identified other drivers (see, e.g., 1714-B in FIG. 17B).

11. The machine-readable storage medium of clause 10, wherein the one or more operations further comprise:

facilitating verification that the identified one or more drivers associated with the particular class of the hardware platform of the client device and the identified one or more common drivers associated with the hardware platform of the client device are installed on the client device.

12. The machine-readable storage medium of clause 10, wherein the one or more operations further comprise:

following the installation of the at least one driver on the client device, facilitating verification of the installation status of the at least one driver on the client device;

facilitating determination, based on the verification of the installation status, that installation of a particular driver on the client device failed;

facilitating re-installation of the particular driver on the client device;

following the re-installation of the particular driver, facilitating verification of the re-installation status of the particular driver;

facilitating determination, based on the verification of the re-installation status, that re-installation of the particular driver on the client device failed; and facilitating reporting of a driver installation failure.

13. The machine-readable storage medium of clause 10, wherein the one or more operations further comprise:

facilitating the application of a customization to the client device, based on user-specific customization information; and facilitating installation on the client device of one or more driver applications based on the hardware platform of the client device.

14. The machine-readable storage medium of clause 10, wherein the one or more operations further comprise:

prior to facilitating identification of one or more drivers and facilitating identification of one or more common drivers, facilitating identification of the hardware platform of the client device and identification of the class of the hardware platform of the client device.

15. The machine-readable storage medium of clause 10, wherein the device driver configuration file is an extensible markup language (XML) file.

16. The machine-readable storage medium of clause 10, wherein the device driver configuration file is retrieved from the stored disk image.

17. The machine-readable storage medium of clause 10, wherein the disk image further includes a plurality of applications, and wherein prior to the facilitating storing the disk image, the one or more operations further comprise:

facilitating installation of the plurality of applications on a memory of an image-build device, wherein the image-build device includes pre-existing drivers;

facilitating un-installation of the pre-existing drivers from the image-build device;

facilitating importation of the plurality of drivers for the plurality of hardware platforms onto a driver-store of the memory of the image-build device; and following the installation of the plurality of applications, the un-installation of the pre-existing drivers, and the importation of the plurality of drivers, facilitating creation of the disk image based on the memory of the image-build device having the plurality of installed applications and the plurality of imported drivers.

18. The machine-readable storage medium of clause 17, wherein the installation of the plurality of applications comprises installation of at least one third party application and installation of at least one original equipment manufacturer (OEM) application.

Figure 17C:
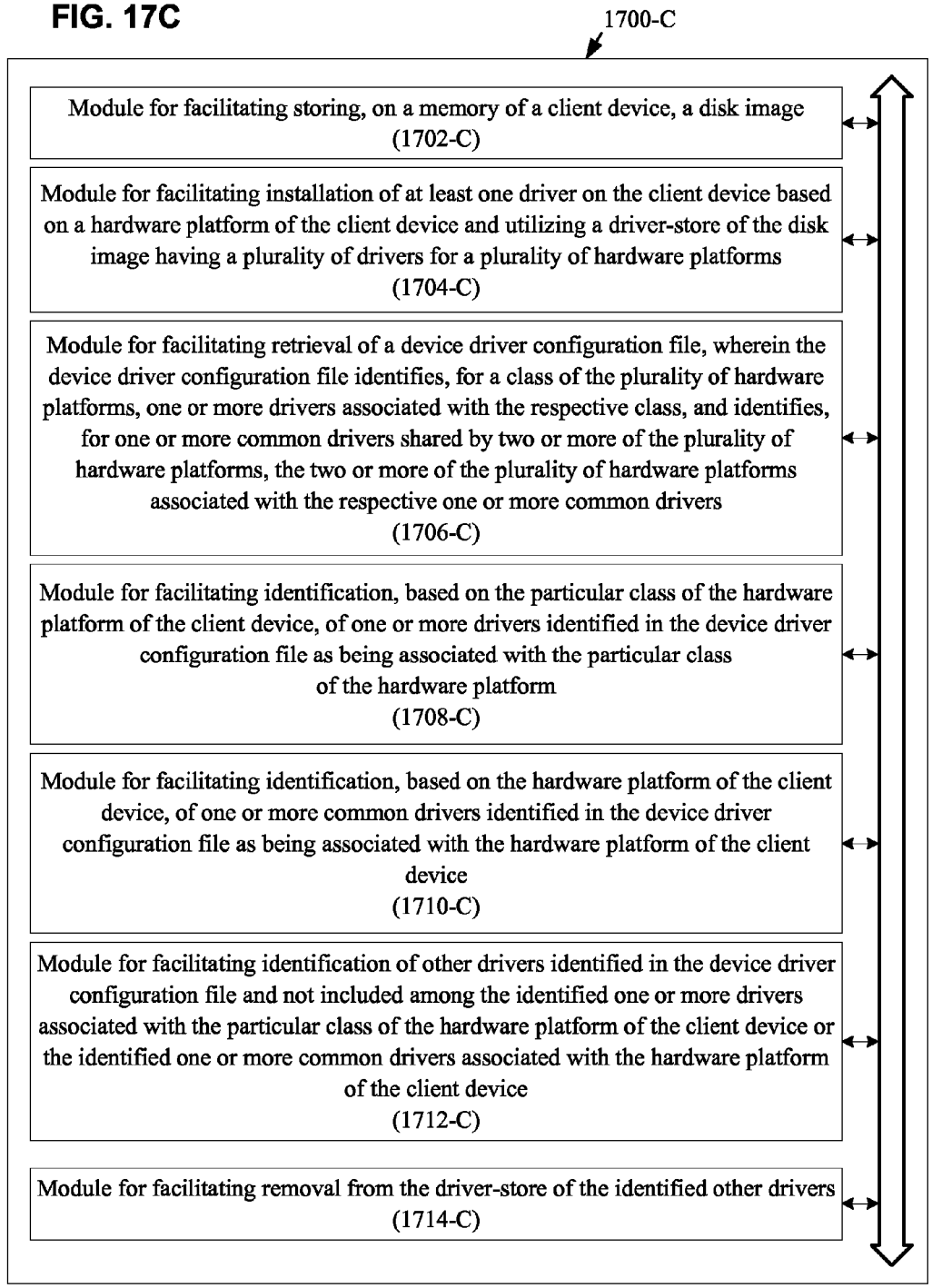

19. A hardware apparatus (see, e.g., 1700-C in FIG. 17C) for installing a disk image onto a client device having a hardware platform of a particular class, wherein the disk image includes a plurality of drivers for a plurality of hardware platforms, the apparatus comprising:

one or more modules configured to perform one or more operations comprising:

facilitating storing, on a memory of the client device, the disk image (see, e.g., 1702-C in FIG. 17C);

facilitating installation of at least one driver on the client device based on the hardware platform of the client device and utilizing a driver-store of the disk image having the plurality of drivers for the plurality of hardware platforms (see, e.g., 1704-C in FIG. 17C);

facilitating retrieval of a device driver configuration file, wherein the device driver configuration file identifies, for a class of the plurality of hardware platforms, one or more drivers associated with the respective class, and identifies, for one or more common drivers shared by two or more of the plurality of hardware platforms, the two or more of the plurality of hardware platforms associated with the respective one or more common drivers (see, e.g., 1706-C in FIG. 17C);

facilitating identification, based on the particular class of the hardware platform of the client device, of one or more drivers identified in the device driver configuration file as being associated with the particular class of the hardware platform (see, e.g., 1708-C in FIG. 17C);

facilitating identification, based on the hardware platform of the client device, of one or more common drivers identified in the device driver configuration file as being associated with the hardware platform of the client device (see, e.g., 1710-C in FIG. 17C);

facilitating identification of other drivers identified in the device driver configuration file and not included among the identified one or more drivers associated with the particular class of the hardware platform of the client device or the identified one or more common drivers associated with the hardware platform of the client device (see, e.g., 1712-C in FIG. 17C); and facilitating removal from the driver-store of the identified other drivers (see, e.g., 1714-C in FIG. 17C).

20. The hardware apparatus of clause 19, wherein the one or more operations further comprise:

facilitating verification that the identified one or more drivers associated with the particular class of the hardware platform of the client device and the identified one or more common drivers associated with the hardware platform of the client device are installed on the client device.

21. The hardware apparatus of clause 19, wherein the one or more operations further comprise:

following the installation of the at least one driver on the client device, facilitating verification of the installation status of the at least one driver on the client device;

facilitating determination, based on the verification of the installation status, that installation of a particular driver on the client device failed;

facilitating re-installation of the particular driver on the client device;

following the re-installation of the particular driver, facilitating verification of the re-installation status of the particular driver;

facilitating determination, based on the verification of the re-installation status, that re-installation of the particular driver on the client device failed; and facilitating reporting of a driver installation failure.

22. The hardware apparatus of clause 19, wherein the one or more operations further comprise:
facilitating the application of a customization to the client device, based on user-specific customization information; and
facilitating installation on the client device of one or more driver applications based on the hardware platform of the client device.

23. The hardware apparatus of clause 19, wherein the one or more operations further comprise:
prior to facilitating identification of one or more drivers and facilitating identification of one or more common drivers, facilitating identification of the hardware platform of the client device and identification of the class of the hardware platform of the client device.

24. The hardware apparatus of clause 19, wherein the device driver configuration file is an extensible markup language (XML) file.

25. The hardware apparatus of clause 19, wherein the device driver configuration file is retrieved from the stored disk image.

26. The hardware apparatus of clause 19, wherein the disk image further includes a plurality of applications, and wherein prior to the facilitating storing the disk image, the one or more operations further comprise:
facilitating installation of the plurality of applications on a memory of an image-build device, wherein the image-build device includes pre-existing drivers;
facilitating un-installation of the pre-existing drivers from the image-build device;
facilitating importation of the plurality of drivers for the plurality of hardware platforms onto a driver-store of the memory of the image-build device; and
following the installation of the plurality of applications, the un-installation of the pre-existing drivers, and the importation of the plurality of drivers, facilitating creation of the disk image based on the memory of the image-build device having the plurality of installed applications and the plurality of imported drivers.

27. The hardware apparatus of clause 26, wherein the installation of the plurality of applications comprises installation of at least one third party application and installation of at least one original equipment manufacturer (OEM) application.

28. An apparatus (see, e.g., 1700-C in FIG. 17C) for installing a disk image onto a client device having a hardware platform of a particular class, wherein the disk image includes a plurality of drivers for a plurality of hardware platforms, the apparatus comprising:
means for facilitating storing, on a memory of the client device, the disk image (see, e.g., 1702-C in FIG. 17C);
means for facilitating installation of at least one driver on the client device based on the hardware platform of the client device and utilizing a driver-store of the disk image having the plurality of drivers for the plurality of hardware platforms (see, e.g., 1704-C in FIG. 17C);
means for facilitating retrieval of a device driver configuration file, wherein the device driver configuration file identifies, for a class of the plurality of hardware platforms, one or more drivers associated with the respective class, and identifies, for one or more common drivers shared by two or more of the plurality of hardware platforms, the two or more of the plurality of hardware platforms associated with the respective one or more common drivers (see, e.g., 1706-C in FIG. 17C);
means for facilitating identification, based on the particular class of the hardware platform of the client device, of one or more drivers identified in the device driver configuration file as being associated with the particular class of the hardware platform (see, e.g., 1708-C in FIG. 17C);
means for facilitating identification, based on the hardware platform of the client device, of one or more common drivers identified in the device driver configuration file as being associated with the hardware platform of the client device (see, e.g., 1710-C in FIG. 17C);
means for facilitating identification of other drivers identified in the device driver configuration file and not included among the identified one or more drivers associated with the particular class of the hardware platform of the client device or the identified one or more common drivers associated with the hardware platform of the client device (see, e.g., 1712-C in FIG. 17C); and
means for facilitating removal from the driver-store of the identified other drivers (see, e.g., 1714-C in FIG. 17C).

29. The apparatus of clause 28, further comprising:
means for facilitating verification that the identified one or more drivers associated with the particular class of the hardware platform of the client device and the identified one or more common drivers associated with the hardware platform of the client device are installed on the client device.

30. The apparatus of clause 28, further comprising:
means for, following the installation of the at least one driver on the client device, facilitating verification of the installation status of the at least one driver on the client device;
means for facilitating determination, based on the verification of the installation status, that installation of a particular driver on the client device failed;
means for facilitating re-installation of the particular driver on the client device;
means for, following the re-installation of the particular driver, facilitating verification of the re-installation status of the particular driver;
means for facilitating determination, based on the verification of the re-installation status, that re-installation of the particular driver on the client device failed; and
means for facilitating reporting of a driver installation failure.

31. The apparatus of clause 28, further comprising:
means for facilitating the application of a customization to the client device, based on user-specific customization information; and
means for facilitating installation on the client device of one or more driver applications based on the hardware platform of the client device.

32. The apparatus of clause 28, further comprising:
means for, prior to facilitating identification of one or more drivers and facilitating identification of one or more common drivers, facilitating identification of the hardware platform of the client device and identification of the class of the hardware platform of the client device.

33. The apparatus of clause 28, wherein the device driver configuration file is an extensible markup language (XML) file.

34. The apparatus of clause 28, wherein the device driver configuration file is retrieved from the stored disk image.

35. The apparatus of clause 28, wherein the disk image further includes a plurality of applications, and wherein the apparatus further comprises:
means for, prior to the facilitating storing the disk image, facilitating installation of the plurality of applications on a memory of an image-build device, wherein the image-build device includes pre-existing drivers;
means for facilitating un-installation of the pre-existing drivers from the image-build device;

means for facilitating importation of the plurality of drivers for the plurality of hardware platforms onto a driver-store of the memory of the image-build device; and means for, following the installation of the plurality of applications, the un-installation of the pre-existing drivers, and the importation of the plurality of drivers, facilitating creation of the disk image based on the memory of the image-build device having the plurality of installed applications and the plurality of imported drivers.

36. The apparatus of clause 35, wherein the installation of the plurality of applications comprises installation of at least one third party application and installation of at least one original equipment manufacturer (OEM) application.

Illustration of Apparatus/Method/Machine Readable Storage Medium for Deploying a Driver or an Application on a Client Device Having a Write-Filter (Described as Clauses)

The subject technology is illustrated, for example, according to various aspects described below. Various examples of aspects of the subject technology are described as numbered clauses (37, 48, 59, etc.) for convenience. These are provided as examples, and do not limit the subject technology.

37. A method (see, e.g., 1800-A in FIG. 18A) for deploying a driver or an application on a client device having a write-filter, the method comprising:

facilitating obtaining a deployment configuration file, wherein the deployment configuration file includes a plurality of deployment entries each having information for deployment of one of a driver and an application (see, e.g., 1802-A in FIG. 18A);

retrieving a first deployment entry from the deployment configuration file (see, e.g., 1804-A in FIG. 18A);

modifying the deployment configuration file to remove the first deployment entry from the deployment configuration file (see, e.g., 1806-A in FIG. 18A);

facilitating storing of the modified deployment configuration file in a location of a memory of the client device that is exempt from a write-filter restriction, wherein the write-filter restriction prohibits a file stored on the client device with the write-filter enabled from persisting across a reboot of the client device (see, e.g., 1808-A in FIG. 18A); and facilitating deploying on the client device the one of the driver and the application of the first deployment entry while the write-filter is disabled (see, e.g., 1810-A in FIG. 18A).

38. The method of clause 37, wherein prior to facilitating storing the modified deployment configuration file, the method comprises:

facilitating storing of the deployment configuration file in the location of the memory of the client device that is exempt from the write-filter restriction;

facilitating disabling of the write-filter on the client device; and following the disabling of the write-filter, facilitating a reboot of the client device.

39. The method of clause 38, wherein following the reboot of the client device, the method comprises:

facilitating determining whether a modified deployment configuration file is stored in the memory of the client device;

upon determining that no modified deployment configuration file is stored in a memory of the client device, facilitating determining whether a deployment configuration file is stored in the memory of the client device; and upon determining that the deployment configuration file is stored in a memory of the client device, facilitating retrieving the deployment configuration file from the memory of the client device.

40. The method of clause 38, wherein following the deploying on the client device of the one of the driver and the application of the first deployment entry, the method comprises:

facilitating enabling of the write-filter on the client device; and following the enabling of the write-filter, facilitating a reboot of the client device.

41. The method of clause 37, wherein following the deploying on the client device of the one of the driver and the application, the method comprises:

facilitating storing of the modified deployment configuration file as the deployment configuration file in the memory of the client device, such that the stored deployment configuration file includes all deployment entries of the plurality of deployment entries except for the first deployment entry;

following the storing of the modified deployment configuration file as the deployment configuration file, facilitating storing as the modified deployment configuration file in the memory of the client device a configuration file including all deployment entries of the plurality of deployment entries except for the first and a second deployment entries; and facilitating deploying on the client device the one of the driver and the application of the second deployment entry while the write-filter is disabled.

42. The method of clause 37, wherein the facilitating deploying on the client device the one of the driver and the application of the first deployment entry comprises:

determining one or more supported platforms identified in the first deployment entry;

determining whether a hardware platform associated with the client device is included among the one or more supported platforms identified in the first deployment entry;

determining an amount of storage space identified in the first deployment entry;

determining whether an amount of storage space available in the memory of the client device is larger than the amount of storage space identified in the first deployment entry;

determining a version of the one of the driver and the application identified in the first deployment entry;

determining whether a version of the one of the driver and the application is installed on the client device;

if the first deployment entry has information for deployment of a driver, uninstalling the version of the driver installed on the client device if a version installed on the client device is lower than the version identified in the first deployment entry;

retrieving a list of argument values included in the first deployment entry; and facilitating deploying the one of the driver and the application of the first deployment entry on the client device using the list of argument values retrieved from the first deployment entry.

43. The method of clause 42, wherein the one of the driver and the application of the first deployment entry is an application, the method further comprising:

facilitating determination of whether the deployment configuration file corresponds to a new deployment; and retrieving an identifier for a type of installation package used for the deployment of the application from the first deployment entry, wherein the facilitating deploying the one of the driver and the application comprises facilitating deploying the application on the client device using the list of argument values and the identifier for the type of installation package retrieved from the first deployment entry.

44. The method of clause 37, wherein the facilitating obtaining a deployment configuration file comprises:

facilitating determination of whether a deployment configuration file exists in a configuration repository server;

retrieving the deployment configuration file from the configuration repository server, upon determining that the deployment configuration file exists in the configuration repository server; and storing the retrieved deployment configuration file in the memory of the client device.

45. The method of clause 44, further comprising:

upon storing the received deployment configuration file in the memory of the client device, facilitating copying the received deployment configuration file to an archive file in the memory of the client device;

following the deploying on the client device of the one of the driver and the application of the first deployment entry, renaming the archive file to a last successful deployment file in the memory of the client device.

46. The method of clause 37, further comprising:

facilitating determination of whether the deployment configuration file corresponds to a new deployment; and facilitating storing of the deployment configuration file in a location of the memory of the client device that is exempt from the write-filter restriction if the deployment configuration file is determined to correspond to a new deployment.

47. The method of clause 37, wherein the deployment configuration file is an extensible markup language (XML) configuration file.

Figure 18B:
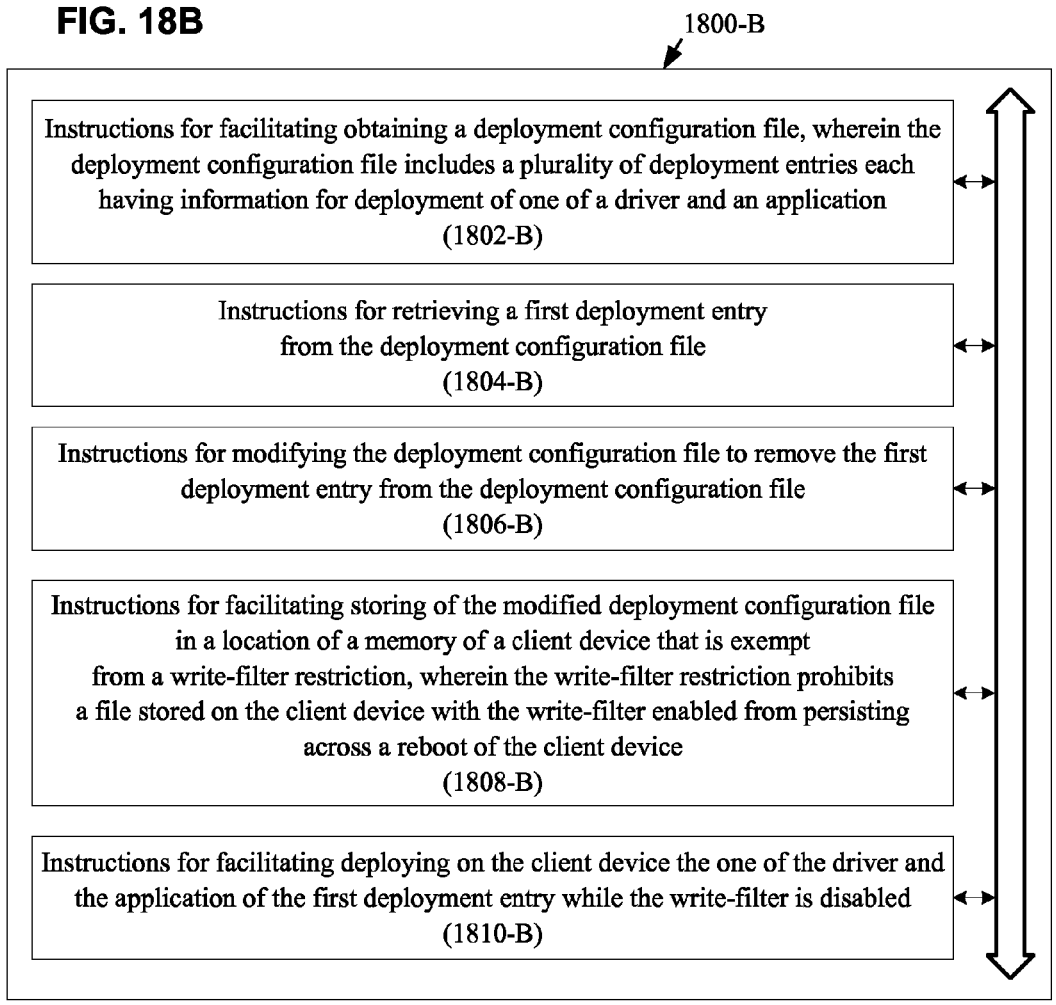

48. A machine-readable storage medium (see, e.g., 1800-B in FIG. 18B) encoded with instructions executable by one or more processors to perform one or more operations for deploying a driver or an application on a client device having a write-filter, the one or more operations comprising:

facilitating obtaining a deployment configuration file, wherein the deployment configuration file includes a plurality of deployment entries each having information for deployment of one of a driver and an application (see, e.g., 1802-B in FIG. 18B);

retrieving a first deployment entry from the deployment configuration file (see, e.g., 1804-B in FIG. 18B);

modifying the deployment configuration file to remove the first deployment entry from the deployment configuration file (see, e.g., 1806-B in FIG. 18B);

facilitating storing of the modified deployment configuration file in a location of a memory of the client device that is exempt from a write-filter restriction, wherein the write-filter restriction prohibits a file stored on the client device with the write-filter enabled from persisting across a reboot of the client device (see, e.g., 1808-B in FIG. 18B); and facilitating deploying on the client device the one of the driver and the application of the first deployment entry while the write-filter is disabled (see, e.g., 1810-B in FIG. 18B).

49. The machine-readable storage medium of clause 48, wherein prior to facilitating storing the modified deployment configuration file, the one or more operations further comprise:

facilitating storing of the deployment configuration file in the location of the memory of the client device that is exempt from the write-filter restriction;

facilitating disabling of the write-filter on the client device; and following the disabling of the write-filter, facilitating a reboot of the client device.

50. The machine-readable storage medium of clause 49, wherein following the reboot of the client device, the one or more operations further comprise:

facilitating determining whether a modified deployment configuration file is stored in the memory of the client device;

upon determining that no modified deployment configuration file is stored in a memory of the client device, facilitating determining whether a deployment configuration file is stored in the memory of the client device; and upon determining that the deployment configuration file is stored in a memory of the client device, facilitating retrieving the deployment configuration file from the memory of the client device.

51. The machine-readable storage medium of clause 49, wherein following the deploying on the client device of the one of the driver and the application of the first deployment entry, the one or more operations further comprise:

facilitating enabling of the write-filter on the client device; and following the enabling of the write-filter, facilitating a reboot of the client device.

52. The machine-readable storage medium of clause 48, wherein following the deploying on the client device of the one of the driver and the application, the one or more operations further comprise:

facilitating storing of the modified deployment configuration file as the deployment configuration file in the memory of the client device, such that the stored deployment configuration file includes all deployment entries of the plurality of deployment entries except for the first deployment entry;

following the storing of the modified deployment configuration file as the deployment configuration file, facilitating storing as the modified deployment configuration file in the memory of the client device a configuration file including all deployment entries of the plurality of deployment entries except for the first and a second deployment entries; and facilitating deploying on the client device the one of the driver and the application of the second deployment entry while the write-filter is disabled.

53. The machine-readable storage medium of clause 48, wherein the operation of facilitating deploying on the client device the one of the driver and the application of the first deployment entry comprises:

determining one or more supported platforms identified in the first deployment entry;

determining whether a hardware platform associated with the client device is included among the one or more supported platforms identified in the first deployment entry;

determining an amount of storage space identified in the first deployment entry;

determining whether an amount of storage space available in the memory of the client device is larger than the amount of storage space identified in the first deployment entry;

determining a version of the one of the driver and the application identified in the first deployment entry;

determining whether a version of the one of the driver and the application is installed on the client device;

if the first deployment entry has information for deployment of a driver, uninstalling the version of the driver installed on the client device if a version installed on the client device is lower than the version identified in the first deployment entry;

retrieving a list of argument values included in the first deployment entry; and facilitating deploying the one of the driver and the application of the first deployment entry on the client device using the list of argument values retrieved from the first deployment entry.

54. The machine-readable storage medium of clause 53, wherein the one of the driver and the application of the first deployment entry is an application, and wherein the one or more operations further comprise:

facilitating determination of whether the deployment configuration file corresponds to a new deployment; and retrieving an identifier for a type of installation package used for the deployment of the application from the first deployment entry, wherein the operation of facilitating deploying the one of the driver and the application comprises facilitating deploying the application on the client device using the list of argument values and the identifier for the type of installation package retrieved from the first deployment entry.

55. The machine-readable storage medium of clause 48, wherein the operation of facilitating obtaining a deployment configuration file comprises:

facilitating determination of whether a deployment configuration file exists in a configuration repository server;

retrieving the deployment configuration file from the configuration repository server, upon determining that the deployment configuration file exists in the configuration repository server; and storing the retrieved deployment configuration file in the memory of the client device.

56. The machine-readable storage medium of clause 55, wherein the one or more operations further comprise:

upon storing the received deployment configuration file in the memory of the client device, facilitating copying the received deployment configuration file to an archive file in the memory of the client device; and following the deploying on the client device of the one of the driver and the application of the first deployment entry, renaming the archive file to a last successful deployment file in the memory of the client device.

57. The machine-readable storage medium of clause 48, wherein the one or more operations further comprise:

facilitating determination of whether the deployment configuration file corresponds to a new deployment; and facilitating storing of the deployment configuration file in a location of the memory of the client device that is exempt from the write-filter restriction if the deployment configuration file is determined to correspond to a new deployment.

58. The machine-readable storage medium of clause 48, wherein the deployment configuration file is an extensible markup language (XML) configuration file.

Figure 18C:
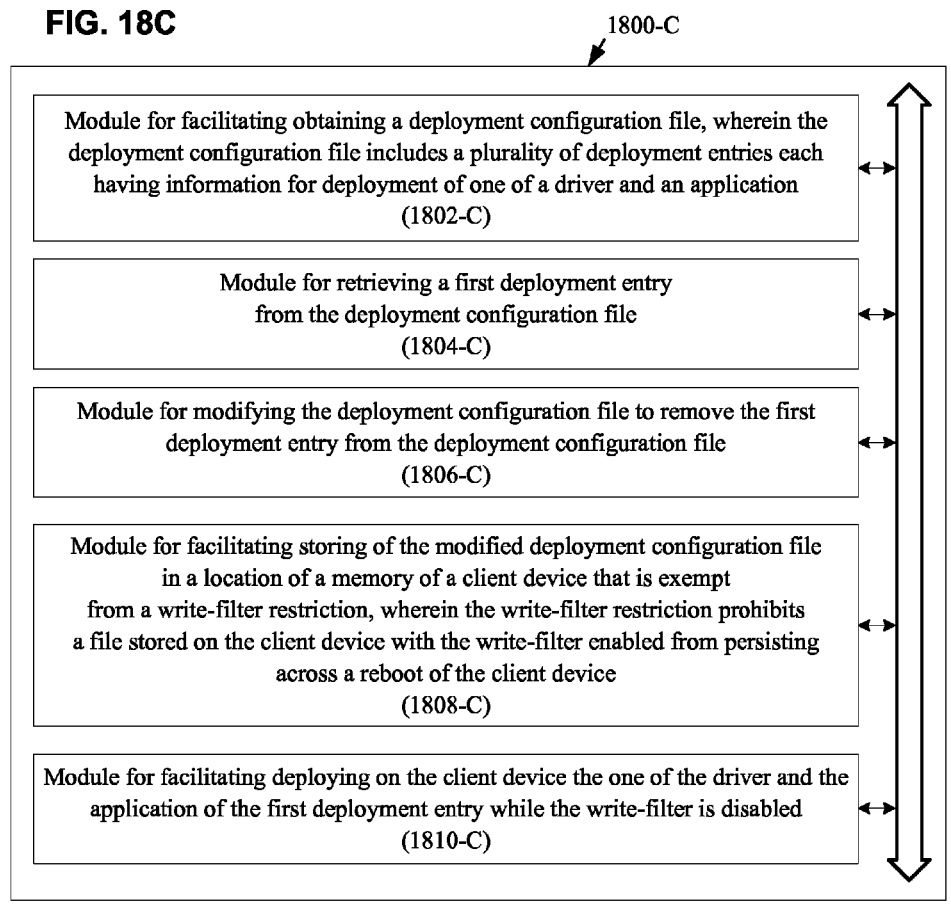

59. A hardware apparatus (see, e.g., 1800-C in FIG. 18C) for deploying a driver or an application on a client device having a write-filter, the hardware apparatus comprising:

one or more modules configured to perform one or more operations comprising:

facilitating obtaining a deployment configuration file, wherein the deployment configuration file includes a plurality of deployment entries each having information for deployment of one of a driver and an application (see, e.g., 1802-C in FIG. 18C);

retrieving a first deployment entry from the deployment configuration file (see, e.g., 1804-C in FIG. 18C);

modifying the deployment configuration file to remove the first deployment entry from the deployment configuration file (see, e.g., 1806-C in FIG. 18C);

facilitating storing of the modified deployment configuration file in a location of a memory of the client device that is exempt from a write-filter restriction, wherein the write-filter restriction prohibits a file stored on the client device with the write-filter enabled from persisting across a reboot of the client device (see, e.g., 1808-C in FIG. 18C); and facilitating deploying on the client device the one of the driver and the application of the first deployment entry while the write-filter is disabled (see, e.g., 1810-C in FIG. 18C).

60. The hardware apparatus of clause 59, wherein prior to facilitating storing the modified deployment configuration file, the one or more operations further comprise:

facilitating storing of the deployment configuration file in the location of the memory of the client device that is exempt from the write-filter restriction;

facilitating disabling of the write-filter on the client device; and following the disabling of the write-filter, facilitating a reboot of the client device.

61. The hardware apparatus of clause 60, wherein following the reboot of the client device the one or more operations further comprise:

facilitating determining whether a modified deployment configuration file is stored in the memory of the client device;

upon determining that no modified deployment configuration file is stored in a memory of the client device, facilitating determining whether a deployment configuration file is stored in the memory of the client device; and upon determining that the deployment configuration file is stored in a memory of the client device, facilitating retrieving the deployment configuration file from the memory of the client device.

62. The hardware apparatus of clause 60, wherein following the deploying on the client device of the one of the driver and the application of the first deployment entry, the one or more operations further comprise:

facilitating enabling of the write-filter on the client device; and following the enabling of the write-filter, facilitating a reboot of the client device.

63. The hardware apparatus of clause 59, wherein following the deploying on the client device of the one of the driver and the application, the one or more operations further comprise:

facilitating storing of the modified deployment configuration file as the deployment configuration file in the memory of the client device, such that the stored deployment configuration file includes all deployment entries of the plurality of deployment entries except for the first deployment entry;

following the storing of the modified deployment configuration file as the deployment configuration file, facilitating storing as the modified deployment configuration file in the memory of the client device a configuration file including all deployment entries of the plurality of deployment entries except for the first and a second deployment entries; and facilitating deploying on the client device the one of the driver and the application of the second deployment entry while the write-filter is disabled.

64. The hardware apparatus of clause 59, wherein the operation of facilitating deploying on the client device the one of the driver and the application of the first deployment entry comprises:

determining one or more supported platforms identified in the first deployment entry;

determining whether a hardware platform associated with the client device is included among the one or more supported platforms identified in the first deployment entry;

determining an amount of storage space identified in the first deployment entry;

determining whether an amount of storage space available in the memory of the client device is larger than the amount of storage space identified in the first deployment entry;

determining a version of the one of the driver and the application identified in the first deployment entry;

determining whether a version of the one of the driver and the application is installed on the client device;

if the first deployment entry has information for deployment of a driver, uninstalling the version of the driver installed on the client device if a version installed on the client device is lower than the version identified in the first deployment entry;

retrieving a list of argument values included in the first deployment entry; and facilitating deploying the one of the driver and the application of the first deployment entry on the client device using the list of argument values retrieved from the first deployment entry.

65. The hardware apparatus of clause 64, wherein the one of the driver and the application of the first deployment entry is an application, and wherein the one or more operations further comprise:

facilitating determination of whether the deployment configuration file corresponds to a new deployment; and retrieving an identifier for a type of installation package used for the deployment of the application from the first deployment entry, wherein the facilitating deploying the one of the driver and the application comprises facilitating deploying the application on the client device using the list of argument values and the identifier for the type of installation package retrieved from the first deployment entry.

66. The hardware apparatus of clause 59, wherein the operation of facilitating obtaining a deployment configuration file comprises:

facilitating determination of whether a deployment configuration file exists in a configuration repository server;

retrieving the deployment configuration file from the configuration repository server, upon determining that the deployment configuration file exists in the configuration repository server; and storing the retrieved deployment configuration file in the memory of the client device.

67. The hardware apparatus of clause 66, wherein the one or more operations further comprise:

upon storing the received deployment configuration file in the memory of the client device, facilitating copying the received deployment configuration file to an archive file in the memory of the client device; and following the deploying on the client device of the one of the driver and the application of the first deployment entry, renaming the archive file to a last successful deployment file in the memory of the client device.

68. The hardware apparatus of clause 59, wherein the one or more operations further comprise:

facilitating determination of whether the deployment configuration file corresponds to a new deployment; and facilitating storing of the deployment configuration file in a location of the memory of the client device that is exempt from the write-filter restriction if the deployment configuration file is determined to correspond to a new deployment.

69. The hardware apparatus of clause 59, wherein the deployment configuration file is an extensible markup language (XML) configuration file.

70. An apparatus (see, e.g., 1800-C in FIG. 18C) for deploying a driver or an application on a client device having a write-filter, the apparatus comprising:

means for facilitating obtaining a deployment configuration file, wherein the deployment configuration file includes a plurality of deployment entries each having information for deployment of one of a driver and an application (see, e.g., 1802-C in FIG. 18C);

means for retrieving a first deployment entry from the deployment configuration on file (see, e.g., 1804-C in FIG. 18C);

means for modifying the deployment configuration file to remove the first deployment entry from the deployment configuration file (see, e.g., 1806-C in FIG. 18C);

means for facilitating storing of the modified deployment configuration file in a location of a memory of the client device that is exempt from a write-filter restriction, wherein the write-filter restriction prohibits a file stored on the client device with the write-filter enabled from persisting across a reboot of the client device (see, e.g., 1808-C in FIG. 18C); and means for facilitating deploying on the client device the one of the driver and the application of the first deployment entry while the write-filter is disabled (see, e.g., 1810-C in FIG. 18C).

71. The apparatus of clause 70, further comprising:

means for, prior to facilitating storing the modified deployment configuration file, facilitating storing of the deployment configuration file in the location of the memory of the client device that is exempt from the write-filter restriction;

means for facilitating disabling of the write-filter on the client device; and means for, following the disabling of the write-filter, facilitating a reboot of the client device.

72. The apparatus of clause 71, further comprising:

means for, following the reboot of the client device, facilitating determining whether a modified deployment configuration file is stored in the memory of the client device;

means for, upon determining that no modified deployment configuration file is stored in a memory of the client device, facilitating determining whether a deployment configuration file is stored in the memory of the client device; and means for, upon determining that the deployment configuration file is stored in a memory of the client device, facilitating retrieving the deployment configuration file from the memory of the client device.

73. The apparatus of clause 71, further comprising:

means for, following the deploying on the client device of the one of the driver and the application of the first deployment entry, facilitating enabling of the write-filter on the client device; and means for, following the enabling of the write-filter, facilitating a reboot of the client device.

74. The apparatus of clause 70, further comprising:

means for, following the deploying on the client device of the one of the driver and the application, facilitating storing of the modified deployment configuration file as the deployment configuration file in the memory of the client device, such that the stored deployment configuration file includes all deployment entries of the plurality of deployment entries except for the first deployment entry;

means for following the storing of the modified deployment configuration file as the deployment configuration file, facilitating storing as the modified deployment configuration file in the memory of the client device a configuration file including all deployment entries of the plurality of deployment entries except for the first and a second deployment entries; and means for facilitating deploying on the client device the one of the driver and the application of the second deployment entry while the write-filter is disabled.

75. The apparatus of clause 70, wherein the means for facilitating deploying on the client device the one of the driver and the application of the first deployment entry comprise:

means for determining one or more supported platforms identified in the first deployment entry;

means for determining whether a hardware platform associated with the client device is included among the one or more supported platforms identified in the first deployment entry;

means for determining an amount of storage space identified in the first deployment entry;

means for determining whether an amount of storage space available in the memory of the client device is larger than the amount of storage space identified in the first deployment entry;

means for determining a version of the one of the driver and the application identified in the first deployment entry;

means for determining whether a version of the one of the driver and the application is installed on the client device;

means for, if the first deployment entry has information for deployment of a driver, uninstalling the version of the driver installed on the client device if a version installed on the client device is lower than the version identified in the first deployment entry;

means for retrieving a list of argument values included in the first deployment entry; and means for facilitating deploying the one of the driver and the application of the first deployment entry on the client device using the list of argument values retrieved from the first deployment entry.

76. The apparatus of clause 75, wherein the one of the driver and the application of the first deployment entry is an application, the apparatus further comprising:

means for facilitating determination of whether the deployment configuration file corresponds to a new deployment; and means for retrieving an identifier for a type of installation package used for the deployment of the application from the first deployment entry, wherein the means for facilitating deploying the one of the driver and the application comprise means for facilitating deploying the application on the client device using the list of argument values and the identifier for the type of installation package retrieved from the first deployment entry.

77. The apparatus of clause 70, wherein the means for facilitating obtaining a deployment configuration file comprise:

means for facilitating determination of whether a deployment configuration file exists in a configuration repository server;

means for retrieving the deployment configuration file from the configuration repository server, upon determining that the deployment configuration file exists in the configuration repository server; and means for storing the retrieved deployment configuration file in the memory of the client device.

78. The apparatus of clause 77, further comprising:

means for, upon storing the received deployment configuration file in the memory of the client device, facilitating copying the received deployment configuration file to an archive file in the memory of the client device; and means for, following the deploying on the client device of the one of the driver and the application of the first deployment entry, renaming the archive file to a last successful deployment file in the memory of the client device.

79. The apparatus of clause 70, further comprising:

means for facilitating determination of whether the deployment configuration file corresponds to a new deployment; and means for facilitating storing of the deployment configuration file in a location of the memory of the client device that is exempt from the write-filter restriction if the deployment configuration file is determined to correspond to a new deployment.

80. The apparatus of clause 70, wherein the deployment configuration file is an extensible markup language (XML) configuration file.

Illustration of Apparatus/Method/Machine Readable Storage Medium for Deploying and Updating Applications and Drivers on a Client Device Using XML Configuration File (Described as Clauses)

The subject technology is illustrated, for example, according to various aspects described below. Various examples of aspects of the subject technology are described as numbered clauses (81, 87, 93, etc.) for convenience. These are provided as examples, and do not limit the subject technology.

Figure 19A:
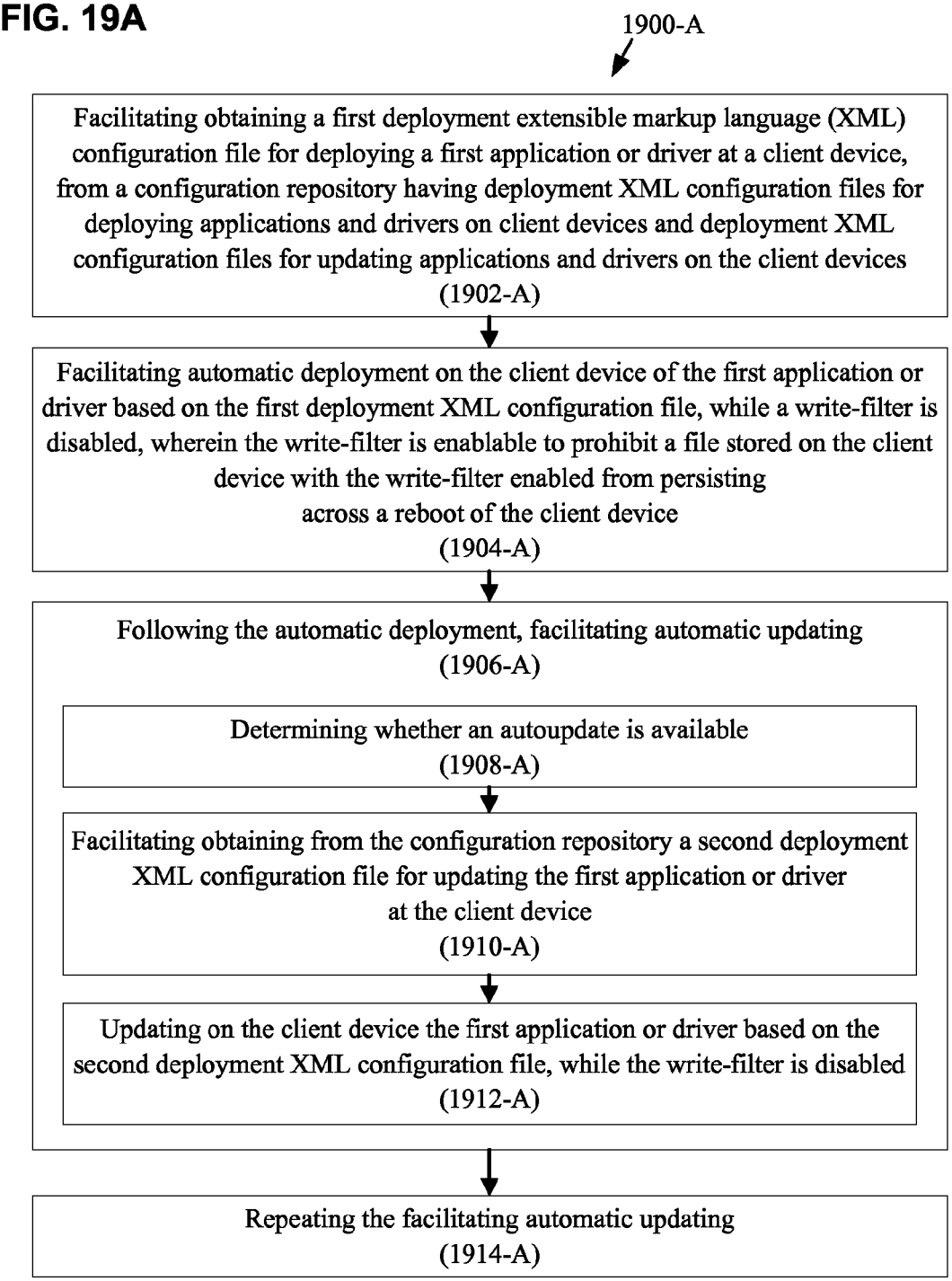
FIGS. 19A, 19B, and 19C are block diagrams representing examples of a method, a machine-readable storage medium encoded with instructions, and an apparatus for deploying and updating applications and drivers on a client device having a write-filter, in accordance with one aspect of the disclosure.

81. A method (see, e.g., 1900-A in FIG. 19A) for deploying and updating applications and drivers on a client device having a write-filter, the method comprising:

facilitating obtaining a first deployment extensible markup language (XML) configuration file for deploying a first application or driver at the client device, from a configuration repository having deployment XML configuration files for deploying applications and drivers on client devices and deployment XML configuration files for updating applications and drivers on the client devices (see, e.g., 1902-A in FIG. 19A);

facilitating automatic deployment on the client device of the first application or driver based on the first deployment XML configuration file, while the write-filter is disabled, wherein the write-filter is enablable to prohibit a file stored on the client device with the write-filter enabled from persisting across a reboot of the client device (see, e.g., 1904-A in FIG. 19A);

following the automatic deployment, facilitating automatic updating (see, e.g., 1906-A in FIG. 19A), comprising:
  determining whether an autoupdate is available (see, e.g., 1908-A in FIG. 19A);
  facilitating obtaining from the configuration repository a second deployment XML configuration file for updating the first application or driver at the client device (see, e.g., 1910-A in FIG. 19A); and
  updating on the client device the first application or driver based on the second deployment XML configuration file, while the write-filter is disabled (see, e.g., 1912-A in FIG. 19A); and repeating the facilitating automatic updating (see, e.g., 1914-A in FIG. 19A).

82. The method of clause 81, wherein prior to obtaining the first deployment XML configuration file and automatically deploying on the client device of the first application or driver, the method comprises:

facilitating obtaining from the configuration repository a third deployment XML configuration file for updating a third application or driver at the client device; and updating on the client device the third application or driver based on the third deployment XML configuration file, while the write-filter is disabled.

83. The method of clause 81, wherein the determining whether an autoupdate is available comprises:

facilitating establishing a connection to the configuration repository to determine whether the configuration repository stores a deployment XML configuration file for updating applications or drivers; and upon determining that the configuration server stores a deployment XML configuration file, facilitating receiving the deployment XML configuration file from the configuration repository.

84. The method of clause 81, wherein the repeating the facilitating automatic updating comprises:

determining whether an autoupdate is available;

facilitating obtaining from the configuration repository a third deployment XML configuration file for updating of an application or driver at the client device; and updating on the client device the application or driver based on the third deployment XML configuration file, while the write-filter is disabled.

85. The method of clause 81, further comprising:

facilitating storing of the first deployment XML configuration file in a location of a memory of the client device that is exempt from a write-filter restriction, wherein the write-filter restriction prohibits a file stored on the client device with the write-filter enabled from persisting across a reboot of the client device.

86. The method of clause 81, further comprising:

following the updating on the client device the first application or driver based on the second deployment XML configuration file, deleting from a memory of the client device the second deployment XML configuration file.

Figure 19B:
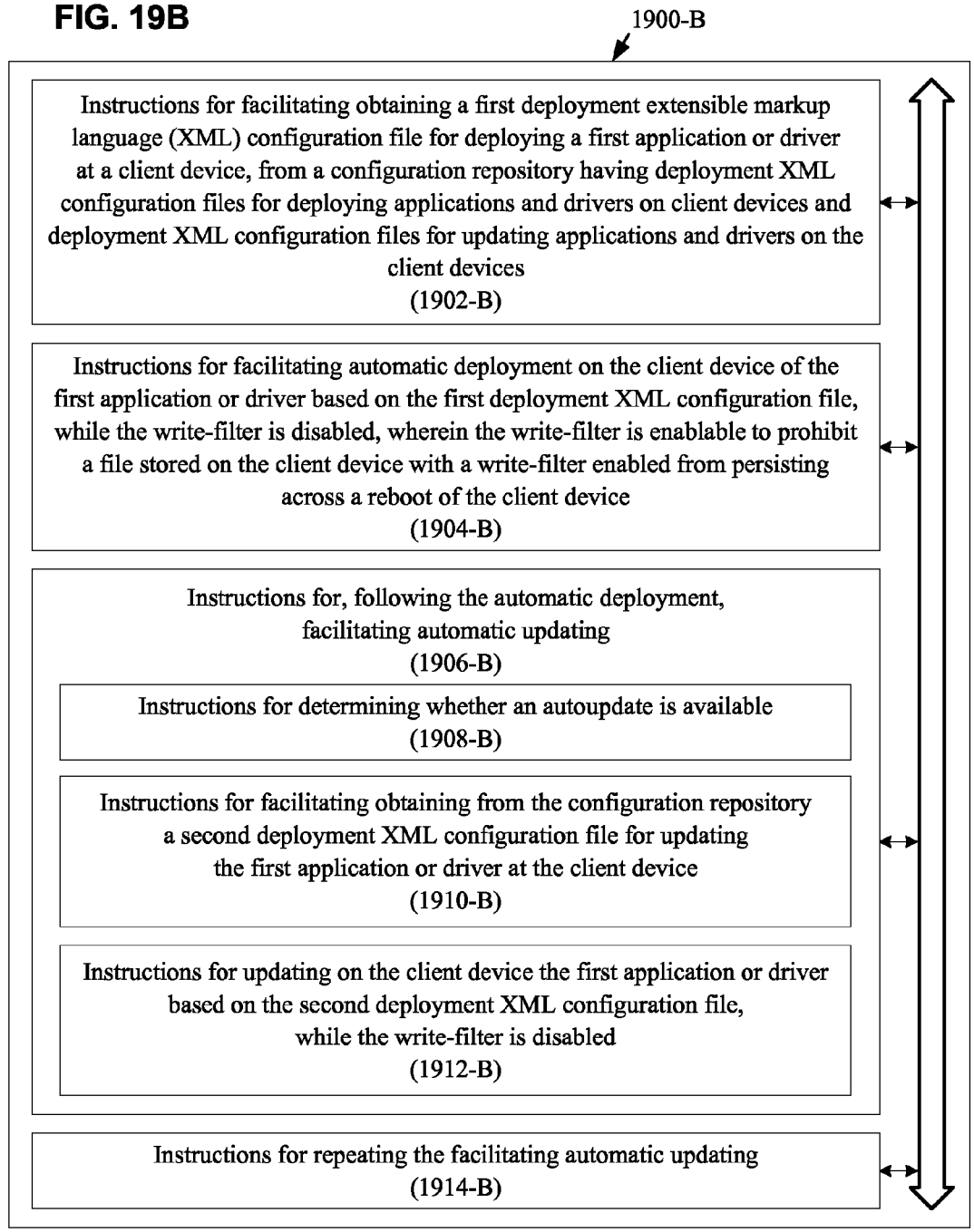

87. A machine-readable storage medium (see, e.g., 1900-B in FIG. 19B) encoded with instructions executable by one or more processors to perform one or more operations for deploying and updating applications and drivers on a client device having a write-filter, the one or more operations comprising:

facilitating obtaining a first deployment extensible markup language (XML) configuration file for deploying a first application or driver at the client device, from a configuration repository having deployment XML configuration files for deploying applications and drivers on client devices and deployment XML configuration files for updating applications and drivers on the client devices (see, e.g., 1902-B in FIG. 19B);

facilitating automatic deployment on the client device of the first application or driver based on the first deployment XML configuration file, while the write-filter is disabled, wherein the write-filter is enablable to prohibit a file stored on the client device with the write-filter enabled from persisting across a reboot of the client device (see, e.g., 1904-B in FIG. 19B);

following the automatic deployment, facilitating automatic updating (see, e.g., 1906-B in FIG. 19B), comprising:

determining whether an autoupdate is available (see, e.g., 1908-B in FIG. 19B);

facilitating obtaining from the configuration repository a second deployment XML configuration file for updating the first application or driver at the client device (see, e.g., 1910-B in FIG. 19B); and updating on the client device the first application or driver based on the second deployment XML configuration file, while the write-filter is disabled (see, e.g., 1912-B in FIG. 19B); and repeating the facilitating automatic updating (see, e.g., 1914-B in FIG. 19B).

88. The machine-readable storage medium of clause 87, wherein prior to obtaining the first deployment XML configuration file and automatically deploying on the client device of the first application or driver, the one or more operations further comprise:

facilitating obtaining from the configuration repository a third deployment XML configuration file for updating a third application or driver at the client device; and updating on the client device the third application or driver based on the third deployment XML configuration file, while the write-filter is disabled.

89. The machine-readable storage medium of clause 87, wherein the determining whether an autoupdate is available comprises:

facilitating establishing a connection to the configuration repository to determine whether the configuration repository stores a deployment XML configuration file for updating applications or drivers; and upon determining that the configuration server stores a deployment XML configuration file, facilitating receiving the deployment XML configuration file from the configuration repository.

90. The machine-readable storage medium of clause 87, wherein the repeating the facilitating automatic updating comprises:

determining whether an autoupdate is available;

facilitating obtaining from the configuration repository a third deployment XML configuration file for updating of an application or driver at the client device; and updating on the client device the application or driver based on the third deployment XML configuration file, while the write-filter is disabled.

91. The machine-readable storage medium of clause 87, wherein the one or more operations further comprise:

facilitating storing of the first deployment XML configuration file in a location of a memory of the client device that is exempt from a write-filter restriction, wherein the write-filter restriction prohibits a file stored on the client device with the write-filter enabled from persisting across a reboot of the client device.

92. The machine-readable storage medium of clause 87, wherein the one or more operations further comprise:

following the updating on the client device the first application or driver based on the second deployment XML configuration file, deleting from a memory of the client device the second deployment XML configuration file.

Figure 19C:
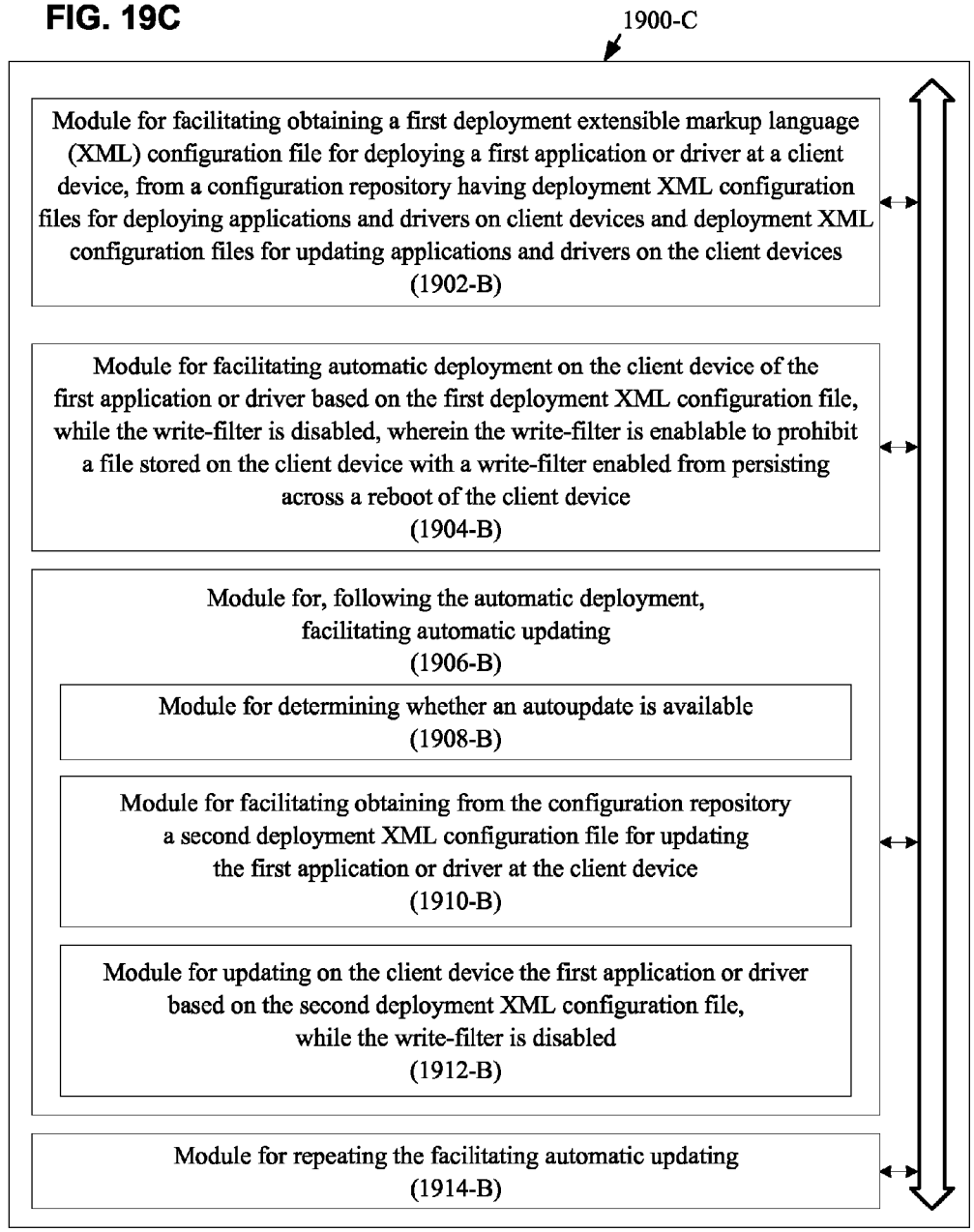

93. A hardware apparatus (see, e.g., 1900-C in FIG. 19C) for deploying and updating applications and drivers on a client device having a write-filter, the hardware apparatus comprising:

one or more modules configured to perform one or more operations comprising:

facilitating obtaining a first deployment extensible markup language (XML) configuration file for deploying a first application or driver at the client device, from a configuration repository having deployment XML configuration files for deploying applications and drivers on client devices and deployment XML configuration files for updating applications and drivers on the client devices (see, e.g., 1902-C in FIG. 19C);

facilitating automatic deployment on the client device of the first application or driver based on the first deployment XML configuration file, while the write-filter is disabled, wherein the write-filter is enablable to prohibit a file stored on the client device with the write-filter enabled from persisting across a reboot of the client device (see, e.g., 1904-C in FIG. 19C);

following the automatic deployment, facilitating automatic updating (see, e.g., 1906-C in FIG. 19C), comprising:

determining whether an autoupdate is available (see, e.g., 1908-C in FIG. 19C);

facilitating obtaining from the configuration repository a second deployment XML configuration file for updating the first application or driver at the client device (see, e.g., 1910-C in FIG. 19C); and updating on the client device the first application or driver based on the second deployment XML configuration file, while the write-filter is disabled (see, e.g., 1912-C in FIG. 19C); and repeating the facilitating automatic updating (see, e.g., 1914-C in FIG. 19C).

94. The hardware apparatus of clause 93, wherein prior to obtaining the first deployment XML configuration file and automatically deploying on the client device of the first application or driver, the one or more operations further comprise:

facilitating obtaining from the configuration repository a third deployment XML configuration file for updating a third application or driver at the client device; and updating on the client device the third application or driver based on the third deployment XML configuration file, while the write-filter is disabled.

95. The hardware apparatus of clause 93, wherein the determining whether an autoupdate is available comprises:

facilitating establishing a connection to the configuration repository to determine whether the configuration repository stores a deployment XML configuration file for updating applications or drivers; and upon determining that the configuration server stores a deployment XML configuration file, facilitating receiving the deployment XML configuration file from the configuration repository.

96. The hardware apparatus of clause 93, wherein the repeating the facilitating automatic updating comprises:

determining whether an autoupdate is available;

facilitating obtaining from the configuration repository a third deployment XML configuration file for updating of an application or driver at the client device; and updating on the client device the application or driver based on the third deployment XML configuration file, while the write-filter is disabled.

97. The hardware apparatus of clause 93, wherein the one or more operations further comprise:

facilitating storing of the first deployment XML configuration file in a location of a memory of the client device that is exempt from a write-filter restriction, wherein the write-filter restriction prohibits a file stored on the client device with the write-filter enabled from persisting across a reboot of the client device.

98. The hardware apparatus of clause 93, wherein the one or more operations further comprise:

following the updating on the client device the first application or driver based on the second deployment XML configuration file, deleting from a memory of the client device the second deployment XML configuration file.

99. An apparatus (see, e.g., 1900-C in FIG. 19C) for deploying and updating applications and drivers on a client device having a write-filter, the apparatus comprising:

means for facilitating obtaining a first deployment extensible markup language (XML) configuration file for deploying a first application or driver at the client device, from a configuration repository having deployment XML configuration files for deploying applications and drivers on client devices and deployment XML configuration files for updating applications and drivers on the client devices (see, e.g., 1902-C in FIG. 19C);

means for facilitating automatic deployment on the client device of the first application or driver based on the first deployment XML configuration file, while the write-filter is disabled, wherein the write-filter is enablable to prohibit a file stored on the client device with the write-filter enabled from persisting across a reboot of the client device (see, e.g., 1904-C in FIG. 19C);

means for, following the automatic deployment, facilitating automatic updating (see, e.g., 1906-C in FIG. 19C), comprising:

means for determining whether an autoupdate is available (see, e.g., 1908-C in FIG. 19C);

means for facilitating obtaining from the configuration repository a second deployment XML configuration file for updating the first application or driver at the client device (see, e.g., 1910-C in FIG. 19C); and means for updating on the client device the first application or driver based on the second deployment XML configuration file, while the write-filter is disabled (see, e.g., 1912-C in FIG. 19C); and means for repeating the facilitating automatic updating (see, e.g., 1914-C in FIG. 19C).

100. The apparatus of clause 99, further comprising:

means for, prior to obtaining the first deployment XML configuration file and automatically deploying on the client device of the first application or driver, facilitating obtaining from the configuration repository a third deployment XML configuration file for updating a third application or driver at the client device; and means for updating on the client device the third application or driver based on the third deployment XML configuration file, while the write-filter is disabled.

101. The apparatus of clause 99, wherein the means for determining whether an autoupdate is available comprise:

means for facilitating establishing a connection to the configuration repository to determine whether the configuration repository stores a deployment XML configuration file for updating applications or drivers; and means for upon determining that the configuration server stores a deployment XML configuration file, facilitating receiving the deployment XML configuration file from the configuration repository.

102. The apparatus of clause 99, wherein the means for repeating the facilitating automatic updating comprise:

means for determining whether an autoupdate is available;

means for facilitating obtaining from the configuration repository a third deployment XML configuration file for updating of an application or driver at the client device; and means for updating on the client device the application or driver based on the third deployment XML configuration file, while the write-filter is disabled.

103. The apparatus of clause 99, further comprising:

means for facilitating storing of the first deployment XML configuration file in a location of a memory of the client device that is exempt from a write-filter restriction, wherein the write-filter restriction prohibits a file stored on the client device with the write-filter enabled from persisting across a reboot of the client device.

104. The apparatus of clause 99, further comprising:

means for, following the updating on the client device the first application or driver based on the second deployment XML configuration file, deleting from a memory of the client device the second deployment XML configuration file.

Illustration of Apparatus/Method/Machine Readable Storage Medium for Automatically Updating an Application or a Driver on a Client Device (Described as Clauses)

The subject technology is illustrated, for example, according to various aspects described below. Various examples of aspects of the subject technology are described as numbered clauses (105, 114, 123, etc.) for convenience. These are provided as examples, and do not limit the subject technology.

105. A method (see, e.g., 2000-A in FIG. 20A) for automatically updating an application or a driver on a client device, the method comprising:

facilitating obtaining at the client device at least one deployment configuration file from a configuration repository (see, e.g., 2002-A in FIG. 20A), wherein the at least one deployment configuration file includes a deployment entry corresponding to a package for updating an application or a driver, and the deployment entry includes identifiers for the package and for a version of the package;

facilitating storing the at least one deployment configuration file in a location of a memory of the client device that is exempt from a write-filter restriction, wherein the write-filter restriction prohibits a file stored on the client device with the write-filter enabled from persisting across a reboot of the client device (see, e.g., 2004-A in FIG. 20A);

for each of the at least one deployment configuration file, facilitating operations of (see, e.g., 2006-A in FIG. 20A):

checking that a deployment entry of the at least one deployment configuration file corresponds to a package for updating an application or a driver that is installed on the client device, and that the deployment entry is identified with a version of the package that is higher than a version of the application or the driver that is installed on the client device (see, e.g., 2008-A in FIG. 20A); and updating on the client device the application or the driver corresponding to the deployment entry of the at least one deployment configuration file using the package, while the write-filter is disabled (see, e.g., 2010-A in FIG. 20A).

106. The method of clause 105, wherein prior to updating on the client device the application or the driver, the method comprises:

facilitating a determination that the write-filter is enabled on the client device;

facilitating disabling of the write-filter on the client device; and facilitating a reboot of the client device.

107. The method of clause 106, wherein following the reboot of the client device, the method comprises:

determining whether at least one deployment configuration file is stored in the memory of the client device; and upon determining that at least one deployment configuration file is stored in the memory of the client device, retrieving the at least one deployment configuration file stored in the memory of the client device and facilitating the checking and updating operations using the retrieved at least one deployment configuration file.

108. The method of clause 106, wherein following the updating on the client device the application or the driver, the method comprises:

facilitating enabling of the write-filter on the client device; and facilitating a reboot of the client device.

109. The method of clause 105, wherein the facilitating obtaining at the client device at least one deployment configuration file comprises:

facilitating locating the configuration repository;

facilitating determining that an autoupdate folder exists on the configuration repository; and facilitating receiving at the client device the at least one deployment configuration file from the autoupdate folder of the configuration repository.

110. The method of clause 105, further comprising:

determining that an autoupdate flag is set on the client device, prior to facilitating obtaining the at least one deployment configuration file.

111. The method of clause 105, wherein:

each of the at least one deployment configuration file is stored in a respective subfolder in the memory of the client device; and after updating on the client device the application or the driver corresponding to the deployment entry of the at least one deployment configuration file, the method comprises facilitating deletion of the respective subfolder of the at least one deployment configuration file.

112. The method of clause 105, wherein the updating on the client device the application or the driver corresponding to the deployment entry of the at least one deployment configuration file comprises operations of:

facilitating retrieving an indicator for an amount of storage space required for updating the application or the driver identified in the deployment entry of the at least one deployment configuration file;

facilitating determining whether an amount of storage space available in a memory of the client device is greater than the retrieved indicator for the amount of storage space required for updating the application or the driver;

facilitating retrieving a list of argument values included in the deployment entry of the at least one deployment configuration file; and facilitating updating of the application or the driver using the list of argument values retrieved from the deployment entry of the at least one deployment configuration file.

113. The method of clause 112, the method further comprising operations of:

facilitating determination of whether at least one deployment configuration file exists in the configuration repository;

retrieving from the configuration repository the at least one deployment configuration file, upon determining that at least one deployment configuration file exists in the configuration repository.

114. A machine-readable storage medium (see, e.g., 2000-B in FIG. 20B) encoded with instructions executable by one or more processors to perform one or more operations for automatically updating an application or a driver on a client device, the one or more operations comprising:

facilitating obtaining at the client device at least one deployment configuration file from a configuration repository (see, e.g., 2002-B in FIG. 20B), wherein the at least one deployment configuration file includes a deployment entry corresponding to a package for updating an application or a driver, and the deployment entry includes identifiers for the package and for a version of the package;

facilitating storing the at least one deployment configuration file in a location of a memory of the client device that is exempt from a write-filter restriction, wherein the write-filter restriction prohibits a file stored on the client device with the write-filter enabled from persisting across a reboot of the client device (see, e.g., 2004-B in FIG. 20B);

for each of the at least one deployment configuration file, facilitating operations of (see, e.g., 2006-B in FIG. 20B):

checking that a deployment entry of the at least one deployment configuration file corresponds to a package for updating an application or a driver that is installed on the client device, and that the deployment entry is identified with a version of the package that is higher than a version of the application or the driver that is installed on the client device (see, e.g., 2008-B in FIG. 20B); and updating on the client device the application or the driver corresponding to the deployment entry of the at least one deployment configuration file using the package, while the write-filter is disabled (see, e.g., 2010-B in FIG. 20B).

115. The machine-readable storage medium of clause 114, wherein prior to updating on the client device the application or the driver, the one or more operations comprise:

facilitating a determination that the write-filter is enabled on the client device;

facilitating disabling of the write-filter on the client device; and facilitating a reboot of the client device.

116. The machine-readable storage medium of clause 115, wherein following the reboot of the client device, the one or more operations comprise:

determining whether at least one deployment configuration file is stored in the memory of the client device; and upon determining that at least one deployment configuration file is stored in the memory of the client device, retrieving the at least one deployment configuration file stored in the memory of the client device and facilitating the checking and updating operations using the retrieved at least one deployment configuration file.

117. The machine-readable storage medium of clause 115, wherein following the updating on the client device the application or the driver, the one or more operations comprise:

facilitating enabling of the write-filter on the client device; and facilitating a reboot of the client device.

118. The machine-readable storage medium of clause 114, wherein the facilitating obtaining at the client device at least one deployment configuration file comprises:

facilitating locating the configuration repository;

facilitating determining that an autoupdate folder exists on the configuration repository; and facilitating receiving at the client device the at least one deployment configuration file from the auto update folder of the configuration repository.

119. The machine-readable storage medium of clause 114, wherein the one or more operations comprise:

determining that an autoupdate flag is set on the client device, prior to facilitating obtaining the at least one deployment configuration file.

120. The machine-readable storage medium of clause 114, wherein:

each of the at least one deployment configuration file is stored in a respective subfolder in the memory of the client device; and after updating on the client device the application or the driver corresponding to the deployment entry of the at least one deployment configuration file, the one or more operations comprise facilitating deletion of the respective subfolder of the at least one deployment configuration file.

121. The machine-readable storage medium of clause 114, wherein the updating on the client device the application or the driver corresponding to the deployment entry of the at least one deployment configuration file comprises operations of:

facilitating retrieving an indicator for an amount of storage space required for updating the application or the driver identified in the deployment entry of the at least one deployment configuration file;

facilitating determining whether an amount of storage space available in a memory of the client device is greater than the retrieved indicator for the amount of storage space required for updating the application or the driver;

facilitating retrieving a list of argument values included in the deployment entry of the at least one deployment configuration file; and facilitating updating of the application or the driver using the list of argument values retrieved from the deployment entry of the at least one deployment configuration file.

122. The machine-readable storage medium of clause 121, wherein the one or more operations comprise:

facilitating determination of whether at least one deployment configuration file exists in the configuration repository; and retrieving from the configuration repository the at least one deployment configuration file, upon determining that at least one deployment configuration file exists in the configuration repository.

123. A hardware apparatus (see, e.g., 2000-C in FIG. 20C) for automatically updating an application or a driver on a client device, the hardware apparatus comprising:

one or more modules configured to perform one or more operations comprising:

facilitating obtaining at the client device at least one deployment configuration file from a configuration repository (see, e.g., 2002-C in FIG. 20C), wherein the at least one deployment configuration file includes a deployment entry corresponding to a package for updating an application or a driver, and the deployment entry includes identifiers for the package and for a version of the package;

facilitating storing the at least one deployment configuration file in a location of a memory of the client device that is exempt from a write-filter restriction, wherein the write-filter restriction prohibits a file stored on the client device with the write-filter enabled from persisting across a reboot of the client device (see, e.g., 2004-C in FIG. 20C);

for each of the at least one deployment configuration file, facilitating operations of (see, e.g., 2006-C in FIG. 20C):

checking that a deployment entry of the at least one deployment configuration file corresponds to a package for updating an application or a driver that is installed on the client device, and that the deployment entry is identified with a version of the package that is higher than a version of the application or the driver that is installed on the client device (see, e.g., 2008-C in FIG. 20C); and updating on the client device the application or the driver corresponding to the deployment entry of the at least one deployment configuration file using the package, while the write-filter is disabled (see, e.g., 2010-C in FIG. 20C).

124. The hardware apparatus of clause 123, wherein prior to updating on the client device the application or the driver, the one or more operations further comprise:

facilitating a determination that the write-filter is enabled on the client device;

facilitating disabling of the write-filter on the client device; and facilitating a reboot of the client device.

125. The hardware apparatus of clause 124, wherein following the reboot of the client device, the one or more operations further comprise:

determining whether at least one deployment configuration file is stored in the memory of the client device; and upon determining that at least one deployment configuration file is stored in the memory of the client device, retrieving the at least one deployment configuration file stored in the memory of the client device and facilitating the checking and updating operations using the retrieved at least one deployment configuration file.

126. The hardware apparatus of clause 124 wherein following the updating on the client device the application or the driver, the one or more operations further comprise:
facilitating enabling of the write-filter on the client device; and
facilitating a reboot of the client device.

127. The hardware apparatus of clause 123, wherein the facilitating obtaining at the client device at least one deployment configuration file comprises:
facilitating locating the configuration repository;
facilitating determining that an autoupdate folder exists on the configuration repository; and
facilitating receiving at the client device the at least one deployment configuration file from the autoupdate folder of the configuration repository.

128. The hardware apparatus of clause 123, wherein the one or more operations further comprise:
determining that an autoupdate flag is set on the client device, prior to facilitating obtaining the at least one deployment configuration file.

129. The hardware apparatus of clause 123, wherein:
each of the at least one deployment configuration file is stored in a respective subfolder in the memory of the client device; and
after updating on the client device the application or the driver corresponding to the deployment entry of the at least one deployment configuration file, the one or more operations further comprise facilitating deletion of the respective subfolder of the at least one deployment configuration file.

130. The hardware apparatus of clause 123, wherein the updating on the client device the application or the driver corresponding to the deployment entry of the at least one deployment configuration file comprises operations of:
facilitating retrieving an indicator for an amount of storage space required for updating the application or the driver identified in the deployment entry of the at least one deployment configuration file;
facilitating determining whether an amount of storage space available in a memory of the client device is greater than the retrieved indicator for the amount of storage space required for updating the application or the driver;
facilitating retrieving a list of argument values included in the deployment entry of the at least one deployment configuration file; and
facilitating updating of the application or the driver using the list of argument values retrieved from the deployment entry of the at least one deployment configuration file.

131. The hardware apparatus of clause 130, wherein the one or more operations further comprise:
facilitating determination of whether at least one deployment configuration file exists in the configuration repository; and
retrieving from the configuration repository the at least one deployment configuration file, upon determining that at least one deployment configuration file exists in the configuration repository.

132. An apparatus (see, e.g., 2000-C in FIG. 20C) for automatically updating an application or a driver on a client device, the apparatus comprising:
means for facilitating obtaining at the client device at least one deployment configuration file from a configuration repository (see, e.g., 2002-C in FIG. 20C),
wherein the at least one deployment configuration file includes a deployment entry corresponding to a package for updating an application or a driver, and the deployment entry includes identifiers for the package and for a version of the package;
means for facilitating storing the at least one deployment configuration file in a location of a memory of the client device that is exempt from a write-filter restriction, wherein the write-filter restriction prohibits a file stored on the client device with the write-filter enabled from persisting across a reboot of the client device (see, e.g., 2004-C in FIG. 20C);
means for, for each of the at least one deployment configuration file, facilitating operations of (see, e.g., 2006-C in FIG. 20C):
checking that a deployment entry of the at least one deployment configuration file corresponds to a package for updating an application or a driver that is installed on the client device, and that the deployment entry is identified with a version of the package that is higher than a version of the application or the driver that is installed on the client device (see, e.g., 2008-C in FIG. 20C); and
updating on the client device the application or the driver corresponding to the deployment entry of the at least one deployment configuration file using the package, while the write-filter is disabled (see, e.g., 2010-C in FIG. 20C).

133. The apparatus of clause 132, further comprising:
means for, prior to updating on the client device the application or the driver, facilitating a determination that the write-filter is enabled on the client device;
means for facilitating disabling of the write-filter on the client device; and
means for facilitating a reboot of the client device.

134. The apparatus of clause 133, further comprising:
means for, following the reboot of the client device, determining whether at least one deployment configuration file is stored in the memory of the client device; and
means for, upon determining that at least one deployment configuration file is stored in the memory of the client device, retrieving the at least one deployment configuration file stored in the memory of the client device and facilitating the checking and updating operations using the retrieved at least one deployment configuration file.

135. The apparatus of clause 133, further comprising:
means for, following the updating on the client device the application or the driver, facilitating enabling of the write-filter on the client device; and
means for facilitating a reboot of the client device.

136. The apparatus of clause 132, wherein the means for facilitating obtaining at the client device at least one deployment configuration file further comprise:
means for facilitating locating the configuration repository;
means for facilitating determining that an autoupdate folder exists on the configuration repository; and
means for facilitating receiving at the client device the at least one deployment configuration file from the autoupdate folder of the configuration repository.

137. The apparatus of clause 132, further comprising:
means for determining that an autoupdate flag is set on the client device, prior to facilitating obtaining the at least one deployment configuration file.

138. The apparatus of clause 132, wherein:
each of the at least one deployment configuration file is stored in a respective subfolder in the memory of the client device; and
the apparatus further comprises means for, after updating on the client device the application or the driver corresponding to the deployment entry of the at least one deployment configuration file, facilitating deletion of the respective subfolder of the at least one deployment configuration file.

139. The apparatus of clause 132, wherein the means for updating on the client device the application or the driver corresponding to the deployment entry of the at least one deployment configuration file comprise:

means for facilitating retrieving an indicator for an amount of storage space required for updating the application or the driver identified in the deployment entry of the at least one deployment configuration file;

means for facilitating determining whether an amount of storage space available in a memory of the client device is greater than the retrieved indicator for the amount of storage space required for updating the application or the driver;

means for facilitating retrieving a list of argument values included in the deployment entry of the at least one deployment configuration file; and means for facilitating updating of the application or the driver using the list of argument values retrieved from the deployment entry of the at least one deployment configuration file.

140. The apparatus of clause 139, further comprising:

means for facilitating determination of whether at least one deployment configuration file exists in the configuration repository; and means for retrieving from the configuration repository the at least one deployment configuration file, upon determining that at least one deployment configuration file exists in the configuration repository.

Other Remarks

In one aspect, any of the foregoing clauses may depend from any one of the foregoing independent clauses or any one of the foregoing dependent clauses. In one aspect, any of the clauses (e.g., dependent or independent clauses) may be combined with any other clauses (e.g., dependent or independent clauses). In one aspect, a claim may include only some or all of the elements (e.g., steps, operations, means or components) recited in a clause. In one aspect, a claim may include some or all of the elements recited in one or more clauses, sentences or phrases. In one aspect, some of the elements in each of the clauses, sentences or paragraphs may be removed. In one aspect, additional elements may be added to a clause, sentence or paragraph. In one aspect, any methods, instructions, code, means, logic, components, modules (e.g., software or hardware) described above can be represented in drawings (e.g., flow charts, block diagrams). While only the independent clauses are represented in figures for brevity, any of the dependent clauses can be represented in figures in a similar manner. For example, a flow chart can be drawn for any of the clauses for a method such that each operation is connected to the next operation by an arrow. In another example, a block diagram can be drawn for any of the clauses having means—for elements such that each means—for element can be represented as a module—for element. In one aspect, the subject technology may be implemented without utilizing some of the components, elements, functions or operations described herein. In one aspect, the subject technology may be implemented utilizing additional components, elements, functions or operations. In one aspect, a claim can be written with only some or all of the words in a given sentence herein or with words in various sentences.

Those of skill in the art would appreciate that items such as the various illustrative blocks, modules, elements, components, methods, and algorithms described herein (e.g., a configuration repository server 104, a server 112, client devices 102a-102e, system 201, an operation system (FIG. 8A), driver management processes (FIGS. 9A-9I), and the components therein) may be implemented as electronic hardware, computer software, or a combination of both.

To illustrate the interchangeability of hardware and software, items such as the various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., DSP, ASIC, FPGA, etc.). Those skilled in the art will recognize how to implement the instructions, circuits, and processing systems.

In one aspect of the disclosure, when actions or functions are described as being performed by an item (e.g., receiving, determining, providing, generating, converting, displaying, notifying, accepting, selecting, controlling, issuing, transmitting, reporting, or any other action or function), it is understood that such actions or functions may be performed by the item directly or indirectly. As an example, when a module is described as performing an action, it is understood that the module may perform the action directly or may perform the action indirectly, for example, by facilitating, enabling or causing such an action.

Various items may be arranged differently (e.g., arranged in a different order, or partitioned in a different way) all without departing from the scope of the subject technology. In one example, the configuration repository server 104, or some of the components of the server 104, may be arranged as a standalone server rather than part of server 112. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description, such term is intended to be inclusive in a manner similar to the term "comprise" as "comprise" is interpreted when employed as a transitional word in a claim.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description and following appendices, it can be seen that various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The scope of protection is limited solely by the claims that now follow. The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

APPENDIX A

Exemplary Schema for Device Driver Configuration Files and Deployment Configuration Files The following is an exemplary schema for a device driver configuration file, such as a device driver configuration file referred to as "DriverConfig.xml":

```
<?xml version="1.0" encoding="utf-8"?>
<xs:schema xmlns:xsi="http://www.w3.org/2001/XMLSchema-instance"
attributeFormDefault="unqualified" elementFormDefault="qualified"
xmlns:xs="http://www.w3.org/2001/XMLSchema">
  <xs:element name="DeviceDriverConfigurations">
    <xs:complexType mixed="true">
      <xs:sequence>
        <xs:element name="Drivers">
          <xs:complexType>
            <xs:sequence>
              <xs:element maxOccurs="unbounded" name="Class">
                <xs:complexType>
                  <xs:sequence>
                    <xs:element maxOccurs="unbounded" name="Platform">
                      <xs:complexType>
                        <xs:attribute name="id" type="xs:unsignedByte" use="required" />
                        <xs:attribute name="name" type="xs:string" use="required" />
                        <xs:attribute name="Class" type="xs:string" use="optional" />
                      </xs:complexType>
```

```xml
        </xs:element>
        <xs:element maxOccurs="unbounded" name="Driver">
          <xs:complexType>
            <xs:attribute name="id" type="xs:unsignedByte" use="required" />
            <xs:attribute name="Type" type="xs:string" use="required" />
            <xs:attribute name="Description" type="xs:string" use="required" />
            <xs:attribute name="InfName" type="xs:string" use="required" />
          </xs:complexType>
        </xs:element>
      </xs:sequence>
      <xs:attribute name="name" type="xs:string" use="required" />
    </xs:complexType>
  </xs:element>
  <xs:element name="CommonDriversSet">
    <xs:complexType>
      <xs:sequence>
        <xs:element maxOccurs="unbounded" name="CommonDriver">
          <xs:complexType>
            <xs:sequence>
              <xs:element name="DriverID" type="xs:unsignedByte" />
              <xs:element name="DriverType" type="xs:string" />
              <xs:element name="DriverDescription" type="xs:string" />
              <xs:element name="DriverInfName" type="xs:string" />
              <xs:element name="SupportedPlatforms">
                <xs:complexType>
                  <xs:sequence>
                    <xs:element maxOccurs="unbounded" name="Platform">
                      <xs:complexType>
                        <xs:sequence>
                          <xs:element name="PlatformID" type="xs:unsignedByte" />
                          <xs:element name="PlatformName" type="xs:string" />
                        </xs:sequence>
                      </xs:complexType>
                    </xs:element>
                  </xs:sequence>
                </xs:complexType>
              </xs:element>
            </xs:sequence>
          </xs:complexType>
        </xs:element>
      </xs:sequence>
    </xs:complexType>
  </xs:element>
 </xs:sequence>
 </xs:complexType>
 </xs:element>
</xs:schema>
```

The following is an exemplary schema for a deployment configuration file used, for example, in device deployment configuration and in auto-update package deployments:

```xml
<?xml version="1.0" encoding="utf-8"?>
<xs:schema id="DeviceDeploymentConfigurationSchema"
xmlns:xs="http://www.w3.org/2001/XMLSchema">
  <xs:element name="DeviceDeploymentConfigurations"
type="DeviceDeploymentConfigurationsType"/>
  <xs:complexType name="DeviceDeploymentConfigurationsType">
    <xs:sequence>
      <xs:element name="Application" type="ApplicationType" minOccurs="0" maxOccurs="unbounded"/>
      <xs:element name="DeviceDriver" type="DeviceDriverType" minOccurs="0" maxOccurs="unbounded"/>
    </xs:sequence>
  </xs:complexType>
  <xs:complexType name="ApplicationType">
    <xs:all>
      <xs:element name="Name" type="xs:string" minOccurs="1"/>
      <xs:element name="Description" type="xs:string" minOccurs="1"/>
      <xs:element name="Version" type="xs:string" minOccurs="0"/>
      <xs:element name="Package" type="PackageType" minOccurs="1"/>
    </xs:all>
  </xs:complexType>
```

```xml
<xs:complexType name="PackageType">
   <xs:all>
      <xs:element name="fileName" type="xs:string" minOccurs="1"/>
         <xs:element name="installPackage" type="installPackageType" minOccurs="1"/>
      <xs:element name="sizeRequiredMB" type="xs:integer" minOccurs="1"/>
   </xs:all>
</xs:complexType>
<xs:complexType name="installPackageType">
   <xs:choice>
      <xs:element name="msi" type="msiType" minOccurs="1"/>
      <xs:element name="setup" type="setupType" minOccurs="0"/>
         <xs:element name="msu" type="msiType" minOccurs="1"/>
      <xs:element name="cab" type="setupType" minOccurs="1"/>
      <xs:element name="xml" type="setupType" minOccurs="1"/>
   </xs:choice>
</xs:complexType>
<xs:complexType name="msiType">
   <xs:all>
      <xs:element name="fileName" type="xs:string" minOccurs="1"/>
      <xs:element name="arguments" type="argumentsType" minOccurs="0"/>
      <xs:element name="sizeRequiredMB" type="xs:integer" minOccurs="1"/>
   </xs:all>
</xs:complexType>
<xs:complexType name="argumentsType">
   <xs:sequence>
      <xs:element name="arg" type="xs:string" minOccurs="1" maxOccurs="unbounded"/>
   </xs:sequence>
</xs:complexType>
<xs:complexType name="setupType">
   <xs:all>
      <xs:element name="fileName" type="xs:string" minOccurs="1"/>
      <xs:element name="path" type="xs:string" minOccurs="0"/>
      <xs:element name="arguments" type="argumentsType" minOccurs="0"/>
      <xs:element name="sizeRequiredMB" type="xs:integer" minOccurs="1"/>
   </xs:all>
</xs:complexType>
<xs:complexType name="DeviceDriverType">
   <xs:all>
      <xs:element name="Type" type="xs:string" minOccurs="1"/>
      <xs:element name="Description" type="xs:string" minOccurs="1"/>
      <xs:element name="infFile" type="xs:string" minOccurs="1"/>
         <xs:element name="DriverPath" type="xs:string" minOccurs="1"/>
      <xs:element name="Version" type="xs:string" minOccurs="1"/>
      <xs:element name="supportedPlatformSet" type="supportedPlatformSetType" minOccurs="1"/>
      <xs:element name="arguments" type="argumentsType" minOccurs="0"/>
      <xs:element name="sizeRequiredMB" type="xs:integer" minOccurs="1"/>
   </xs:all>
</xs:complexType>
<xs:complexType name="supportedPlatformSetType">
   <xs:sequence>
      <xs:element name="platform" type="platformType" minOccurs="0" maxOccurs="unbounded"/>
   </xs:sequence>
</xs:complexType>
<xs:simpleType name="platformType">
   <xs:restriction base="xs:string">
      <xs:enumeration id="R" value="R-Class"/>
      <xs:enumeration id="C" value="C-Class"/>
      <xs:enumeration id="Z" value="Z-Class"/>
      <xs:enumeration id="Xc" value="Proteous"/>
      <xs:enumeration id="M3" value="Mobile-3"/>
   </xs:restriction>
</xs:simpleType>
</xs:schema>
```

APPENDIX B

Exemplary Device Driver Configuration Files and Deployment Configuration Files The following is an exemplary device driver configuration file, such as a file named "DriverConfig.xml":

```xml
<?xml version="1.0" encoding="utf-8"?>
<DeviceDriverConfigurations xsi:noNamespaceSchemaLocation="DriverConfig.xsd"
xmlns:xsi="http://www.w3.org/2001/XMLSchema-instance">>
  <Drivers>
    <Class name="R">
      <Platform id="32" name="MERCURY"></Platform>
      <Platform id="33" name="PLUTO"></Platform>
<Driver id="1" Type="VGA" Description="ATI Radeon X1270" InfName="CL_89620_WR.INF" ></Driver>
      <Driver id="2" Type="LAN" Description="Realtek PCI GBE Family Controller" InfName="rt86win7_WR.inf"></Driver>
      <Driver id="3" Type="AUDIO" Description="Realtek High Definition Audio" InfName="hdart_WR.inf"></Driver>
    </Class>
      <Class name="C">
      <Platform id="38" name="EUROPA" Class="C"></Platform>
      <Driver id="1" Type="VGA" Description="VIA Chrome9 HCM IGP WDDM 1.1" InfName="dc06w7r_WC.inf" ></Driver>
      <Driver id="2" Type="AUDIO" Description="VIA High Definition Audio" InfName="viahdb_WC.inf"></Driver>
      <Driver id="3" Type="LAN" Description="VIA Velocity-Family Gigabit Ethernet Adapter" InfName="netvg62_WC.inf" ></Driver>
    </Class>
    <Class name="Z">
      <Platform id="50" name="MIRANDAS" ></Platform>
      <Platform id="51" name="MIRANDAD"></Platform>
      <Platform id="52" name="MOBILEIII"></Platform>
      <Driver id="1" Type="VGA" Description="AMD Radeon HD 6310 Graphics" InfName="CW113134_WZ.INF" ></Driver>
      <Driver id="2" Type="AUDIO" Description="Realtek High Definition Audio" InfName="hdart_WZ.inf" ></Driver>
      <Driver id="3" Type="AUDIO" Description="AMD High Definition Audio Device" InfName="AtihdW73_WZ.INF" ></Driver>
      <Driver id="4" Type="LAN" Description="Realtek PCIe GBE Family Controller" InfName="rt86win7_WZ.inf" ></Driver>
      <Driver id="5" Type="USB3.0" Description="Renesas Electronics USB 3.0 Root Hub" InfName="nusb3hub_WZ.inf" ></Driver>
      <Driver id="6" Type="USB3.0" Description="Renesas Electronics USB 3.0 Host Controller" InfName="nusb3xhc_WZ.inf"></Driver>
      <Driver id="7" Type="WLAN" Description="NULL" InfName="netathrx_WZ.inf"></Driver>
      <Driver id="8" Type="CHIPSET" Description="AMD IO Driver" InfName="amdio_WZ.inf" ></Driver>
      Driver id="9" Type="CHIPSET" Description="NULL" InfName="SZCCID_WZ.INF" ></Driver>
      <Driver id="10" Type="CHIPSET" Description="NULL" InfName="RTSUSTOR_WZ.inf" ></Driver>
      <Driver id="11" Type="CHIPSET" Description="NULL" InfName="BisonC07_WZ.inf" ></Driver>
      <Driver id="12" Type="CHIPSET" Description="NULL" InfName="netathr_WZ.inf"></Driver>
      <Driver id="13" Type="BLUETOOTH" Description="NULL" InfName="btmaud_WZ.inf" ></Driver>
      <Driver id="14" Type="BLUETOOTH" Description="NULL" InfName="btmaux_WZ.inf" ></Driver> <Driver id="15" Type="BLUETOOTH" Description="NULL" InfName="ibtfltcoexhs_WZ.inf" ></Driver>
<Driver id="16" Type="BLUETOOTH" Description="NULL" InfName="netwlv32_WZ.inf" ></Driver>
<Driver id="17" Type="BLUETOOTH" Description="NULL" InfName="netwns32_WZ.inf" ></Driver>
    </Class>
    <CommonDriversSet>
      <CommonDriver>
        <DriverID>1</DriverID>
        <DriverType>AUDIO</DriverType>
        <DriverDescription>Realtek High Definition Audio</DriverDescription>
        <DriverInfName>hdart.inf</DriverInfName>
        <SupportedPlatforms>
          <Platform>
            <PlatformID>50</PlatformID>
            <PlatformName>MIRANDA</PlatformName>
          </Platform>
          <Platform>
            <PlatformID>51</PlatformID>
            <PlatformName>MOBILEIII</PlatformName>
          </Platform>
          <Platform>
            <PlatformID>43</PlatformID>
            <PlatformName>PROTEUS</PlatformName>
          </Platform>
        </SupportedPlatforms>
```

```xml
    </CommonDriver>
    <CommonDriver>
      <DriverID>2</DriverID>
      <DriverType>LAN</DriverType>
      <DriverDescription>Realtek PCIc GBE Family Controller</DriverDescription>
      <DriverInfName>rt86win7.inf</DriverInfName>
      <SupportedPlatforms>
        <Platform>
          <PlatformID>50</PlatformID>
          <PlatformName>MIRANDA</PlatformName>
        </Platform>
        <Platform>
          <PlatformID>51</PlatformID>
          <PlatformName>MOBILEIII</PlatformName>
        </Platform>
        <Platform>
          <PlatformID>32</PlatformID>
          <PlatformName>MERCURY</PlatformName>
        </Platform>
      </SupportedPlatforms>
    </CommonDriver>
  </CommonDriversSet>
  </Drivers>
</DeviceDriverConfigurations>
```

The following is an exemplary deployment configuration file, such as a deployment XML configuration file used for device deployment configuration job and autoupdate package:

```xml
<?xml version="1.0" encoding="utf-8"?>
<DeviceDeploymentConfigurations xsi:noNamespaceSchemaLocation="DrvInstall.xsd"
xmlns:xsi="http://www.w3.org/2001/XMLSchema-instance">
  <Application>
      <Name>ConfigurationManager</Name>
      <Description>Device configuration Manager for thin clients</Description>
      <Version>1.0.0.18</Version>
      <Package>
          <fileName>wcm.msi</fileName>
          <installPackage>
              <msi>
                <arguments>
                    <arg>-i</arg>
                    <arg>Path="C:\CustomPath"</arg>
                </arguments>
              </msi>
          </installPackage>
          <sizeRequiredMB>5</sizeRequiredMB>
      </Package>
  </Application>
  <Application>
      <Name>MangementAgent</Name>
      <Description>Device Management Agent for thin clients</Description>
      <Version>6.0.1.5</Version>
      <Package>
          <fileName>setup.exe</fileName>
          <installPackage>
              <setup>
                  <path>setupfiles</path>
                  <arguments>
                      <arg>Path="C:\Program Files\Agent"</arg>
                      <arg>Reboot=No</arg>
                      <arg>/s</arg>
                  </arguments>
              </setup>
          </installPackage>
          <sizeRequiredMB>10</sizeRequiredMB>
      </Package>
  </Application>
  <Application>
    <Name>WES7SecurityUpdate</Name>
    <Description>Indian Rupee Symbol update</Description>
    <Package>
        <fileName>Windows6.1-KB2526967-x86.msu</fileName>
        <installPackage>
            <msu>
```

```
                    <arguments>
                        <arg>/q</arg>
                        <arg>/i</arg>
                    </arguments>
                </msu>
            </installPackage>
            <sizeRequiredMB>10</sizeRequiredMB>
        </Package>
    </Application>
    <Application>
        <Name>Windows Embedded component update</Name>
        <Description>Windows Embedded dialog filter</Description>
        <Version>6.1.7601.17514~1.0</Version>
        <Package>
            <fileName>winemb-dialog-filter.cab</fileName>
            <installPackage>
                <cab>
                    <path>c:\Windows\setup</path>
                    <arguments>
                        <arg>/online</arg>
                        <arg>PackagePath=c:\winemb-dialog-filter.cab</arg>
                    </arguments>
                </cab>
            </installPackage>
            <sizeRequiredMB>5</sizeRequiredMB>
        </Package>
    </Application>
    <Application>
        <Name>printer configuration set</Name>
        <Description> printer drivers for all standard printers </Description>
        <Version>1.0</Version>
        <Package>
            <fileName>AutoUnattended.xml</fileName>
            <installPackage>
                <xml>
                    <path>C:\windows\setup</path>
                    <arguments>
                        <arg>/online</arg>
                    </arguments>
                </xml>
            </installPackage>
            <sizeRequiredMB>100</sizeRequiredMB>
        </Package>
    </Application>
    <DeviceDriver>
        <Type>VGA</Type>
        <Description>ATI Radeon X1270</Description>
        <infFile>"CL_89620_WR.INF"</infFile>
        <DriverPath>ATIVGA\Data</DriverPath>
        <Version>6.3.2</Version>
        <supportedPlatformSet>
            <platform>R-Class</platform>
            <platform>Z-Class</platform>
        </supportedPlatformSet>
        <arguments>
            <arg></arg>
        </arguments>
        <sizeRequiredMB>12</sizeRequiredMB>
    </DeviceDriver>
    <DeviceDriver>
        <Type>LAN</Type>
        <Description>Realtek PCI GBE Family Controller</Description>
        <infFile>"rt86win7_WR.inf"</infFile>
        <DriverPath>rt86win7\Data</DriverPath>
        <Version>3.3.5</Version>
        <supportedPlatformSet>
            <platform>R-Class</platform>
        </supportedPlatformSet>
        <arguments>
            <arg></arg>
        </arguments>
        <sizeRequiredMB>8</sizeRequiredMB>
    </DeviceDriver>
</DeviceDeploymentConfigurations>
```

APPENDIX C

Exemplary Specification

The following is an exemplary specification used in conjunction with a windows embedded standard release.

1.0 Background

This Product Requirements Document relates to Windows Embedded Standard 7 (WES7) WFR1, and includes the following features:

RemoteFX (RDP 7.1) support

SCCM support

Intelligent driver installation (based on hardware detection)

Support for Wyse Configuration Management (Project Pyramid)

View 4.5/ICA 12.0 support

Microsoft's Windows Embedded Standard 7 SP1 support

SKU differentiation feature 2.0 Business Drivers

The following are the business drivers for the WES 7 release. These business drivers (feature buckets) will set the baseline for specific features within the release.

1) Richest User-Experiences—With WES 7's release achieving a reasonably good out-of-box experience, it is now time to move beyond that and enable the richest possible user experience on thin clients. With Microsoft's RemoteFX technology supported in WES 7 WFR1, users will be able to achieve local-like, full fidelity virtual desktop experiences when using Wyse's WES 7 WFR1. In addition, due to Microsoft's planned for a feature called "SKU differentiation"—which turns off the features in the image based on the type of WES 7 SKU (E,P,C) purchased—customers will be guaranteed those features in Wyse's SKU selection (WES 7 E) to be present and work.

2) Manageability—The WES 7 based thin clients preferably are able to be easily managed by the IT administrator. With the introduction of support for Wyse Configuration Manager, IT administrators will be able to deploy WES 7 WFR1 thin clients in their environment that seamlessly integrate within their Active Directory environment and pull the configurations of each specific user or user group and apply those settings upon boot. This allows Wyse to ship only one image out of the factory and all future customizations can be applied via configuration files specific to users/user groups. In addition general SCCM support (non-Wyse configuration management related) makes it easier for clients to be managed via management tools that are used for PCs today. Finally, integration of Wyse configuration management support with WDM and SCCM (via plug-ins) makes it valuable for WES 7 WFR1 thin clients to be managed and customized regardless of the management systems IT administrators use for Thin Clients.

3) Personalization—Upon a user logging into their IT environment, WES 7 thin clients preferably are able to gather the user specific profile's preferences, either locally and/or from the IT network. The user experience preferably is completely personal, and there should be no down time for the user to get their local/network preferences applied and running 3.0 Requirements 1) Richest User-Experiences a. Microsoft's RemoteFX client (RDP 7.1) preferably is qualified on supported WES 7 hardware images and with the appropriate Microsoft backend. The user experience deltas for RemoteFX preferably is clearly stipulated to customers when using various Microsoft backends (Terminal Services, Remote Desktop Services, Virtual Desktop using Srv 2003, and Srv 2008 R2 and Srv 2008 R2 SP1).

b. When using the Microsoft's latest backend supporting RemoteFX, users preferably are able to achieve local PC level experiences such as playing full screen high fidelity video using media player 12, flash video via browser, and running several productivity applications such as outlook, adobe reader, and messenger applications.

c. Experience with the most common resource intensive applications preferably is qualified. Examples of such applications are Google Earth, CAD applications, Video/Media editing applications, Content creation applications etc.

d. Experiences deltas when using RemoteFX with various WES 7 hardware (R, C, Xc) preferably are also qualified.

e. WES 7 WFR1 preferably supports Microsoft's SP1 release of WES 7.

2) Manageability a. WES 7 WFR 1 thin clients preferably are able to apply configurations when using 1) ftp server, 2) WDM server, and 3) SCCM server.

b. Configurations can be applied 1) globally, 2) based on MAC, or 3) based on user credentials (either domain/non-domain). WES 7 WFR1 preferably get and apply global, MAC based and User based configuration files from FTP/WDM/SCCM management tools c. The last 5 snapshots applied to any thin client preferably are stored at all times on the thin client. When using WDM/SCCM as the management tool—the last 5 snapshots applied for a specific user preferably are also stored (either on thin client or backend).

d. Upon imaging a thin client and booting it for the first time (manufacturing line scenario), WES 7 WFR 1 thin clients preferably detect the hardware the image is running on and install only those device drivers specific to the hardware. All other device drivers on the image preferably are deleted.

e. Detection, patching, imaging of WES 7 WFR 1 thin clients preferably are supported and qualified with SCCM 2007. In addition, WES 7 WFR1 images preferably support all SCCM perquisites (carry forward from WES 7)

3) Personalization:

a. All user based, MAC based or global settings preferably should take no more than 10 seconds (beyond regular OS boot time) to apply.

i. Before applying any setting on WES 7 WFR 1 thin clients, a check is preferably performed to see if the same setting with same value has been applied previously.

b. When applying the user specific settings for the first time on a particular device, the end user preferably sees his desktop only after all the customizations/settings have been applied.

i. User related settings preferably are able to be applied when the WES 7 devices are domain joined as well as non-domain joined.

c. Settings that are device based preferably are persistent, settings that are user based preferably are volatile. Volatile implies that write filter exclusions for those settings are not applied.

4) Miscellaneous:

a. Powershell preferably is not present for default user b. Prep-4-man (field version) preferably is present in the WES 7 WFR 1 image c. Folder system preferably is compressed (both existing and new)

d. The WES 7 image preferably is compressed at the OS level based on the guidelines provided by Microsoft to Wyse—while resulting in no visible performance degradation across R, C, Xc, Miranda and Mobile3 platforms.

e. The issues with shift key method of bypassing auto-login preferably are fixed when using a USB keyboard
   i. Potential fixes could be to give a visible indication for user to hit shift during boot for 3 seconds or so. (during OS startup process); or
   ii. Building a small application that allows the user to tell the OS to by-pass auto-login 1) the next time it restarts or the 2) when the user logs off
f. Imaging or loading Wyse WES 7 is preferably for Wyse hardware
g. Non-wyse WES 7 images are preferably not allowed to install on Wyse hardware
4.0 Supported Hardware
The WES 7 image preferably is supported on the following hardware platforms:
R90LE7
R90L7
C90LE7
X90C7
as well as
Miranda
Mobile 3
This release preferably will support the following minimal memory configuration for all devices:
2/4 GB Flash
1/2 GB Ram for custom images

APPENDIX D

Exemplary Specification for Windows Embedded Standard 7 (WES 7)—WFR2

1 Introduction
1.1 Executive Summary
The WES 7 WFR2 is based on Microsoft's Windows Embedded Standard 7 (WES 7) Service Pack 1 (SP1) which is the latest version of Windows Embedded OS along with Wyse's custom components.
WES 7 SP1 is based on Windows 7 SP1 and has several new features such as:
RDP 7.1
Remote FX
Remote FX USB
2 Supported Hardware Platforms
The following hardware platforms can be supported by WES 7 WFR1: R90LE7, R90L7, C90LE7, X90C7, Z90S7, Z90D7, X90M7.
Minimum RAM configuration: 1 GB
Recommended RAM 2 GB

APPENDIX E

Exemplary Specification for Drvmgmt.exe (Driver Management Application Used to Handle the Driver-Store and Intelligent Third Party Driver Installation Based on the Hardware Platform)

1 Overview
As there is an increasing need of Multiple Hardware Platforms support with Windows Embedded standard 7 Thin Client Image, the "Intelligent Third party Device Driver installation based on the hardware platform using Driver-Store" is introduced.
Drvmgmt.exe application is designed to automate the image build process with intelligent third party Device driver installation based on the hardware platform using Driver-store 1.1 Scope
This appendix outlines the "Intelligent Third party Device Driver installation based on the hardware platform using Driver-Store" features to be added to the image build process.
2 Driver-Store with Windows Embedded Standard 7
Windows Embedded Standard 7 introduces a driver-store, a trusted cache of in-box and third-party drivers that are stored on a local hard disk. When a third-party driver is installed on Windows Embedded Standard 7, Setup automatically copies the driver package into the driver-store and then installs the driver from the driver package in the driver-store. A driver package that has been copied into the driver-store is said to be staged.
Drivers can be staged without immediately being installed on the system so that they are available for installation later. Adding a driver package to the driver-store, either during installation or separately, requires administrator rights. After a driver package is in the driver-store, however, a standard user can install the driver.
2.1 Where to Find More Information
http://msdn.microsoft.com/en-us/library/ff544868 (VS.85).aspx
3 Why drvmgmt?
As in the builds process to integrate the "Intelligent Third party Device Driver installation based on the hardware platform using Driver-Store" concept, the following operations are performed:
   Uninstall the base Microsoft drivers which conflicts with third party vendor drivers
   Add the all third party drivers into the driver-store
   Install the driver
   Check the driver existence
   Re-configure the Devices from Driver-store (Optional)
   Clear the non present hardware device drivers from driver-store
To make the image build process easy and to reduce the user intervention while image build process, the driver management application drvmgmt.exe is useful
Functional block diagram of drvmgmt.exe with WES 7: See, for example, FIG. 8A.
4 Drvmgmt.exe Modules: (See, e.g., FIG. 9J)
   Uninstall: Uninstall the Microsoft compatible drivers from driver-store based on the Driver description given in command line
   Rescan: simulates operation of Devmgmt.msc→select root node→scan for hardware changes programmatically
   Install: The Install function installs a driver package from specified inf path
   CheckDriver: The CheckDriver function verifies the requested driver is installed or not and return the status to the main program.
   Add: Add the drivers to driver-store based the INF file specified in the command line
   Enumerate: List the all drivers that are currently installed on the target hardware
   Verify: Verify the list of drivers that are currently installed on the target hardware with reference drivers list given in the file named WyseDrivers.ini based on the hardware model
   Clear: Verify the Drivers integrity and clear the non present hardware drivers from driver-store
Drvmgmt.exe can be a console based application which executes the respective modules based command line option given by the user and the detailed design as shown below:

4.1 Uninstall (See, e.g., FIG. 9H)
Usage: drvmgmt.exe/uninstall "driver description"
Uninstall the Microsoft compatible drivers from driver-store based on the Driver description given in command line 4.2 Rescan (See, e.g., FIG. 9E)
Usage: drvmgmt.exe/rescan
It simulates operation of Devmgmt.msc→select root node→scan for hardware changes programmatically 4.3 Enumerate (See, e.g., FIG. 9F)
List the all drivers that are currently installed on the target hardware and also load the Drivers to InsDevDrv Device list 4.4 Verify (See, e.g., FIG. 9G)
Verify module enumerate all drivers that are currently installed on the target hardware with reference drivers list given in the file named WyseDrivers.ini based on the hardware model 4.5 Clear (See, e.g., FIG. 9I)
Verify the Drivers integrity and clear the non present hardware drivers from driver-store 4.6 Add (See, e.g., FIG. 9B)
Add the drivers to driver-store based the INF file specified in the command line 4.7 Install (See, e.g., FIG. 9C)
The Install function installs a driver package from specified inf path 4.8 CheckDriver (see, e.g., FIG. 9D)
The CheckDriver function verifies the requested driver is installed or not and return the status to the main program Note that the processes described above preferentially support Windows embedded standard 7 builds.

What is claimed is:

1. A method for deploying and updating a client device, the method comprising:
    obtaining, from a configuration repository, a first deployment configuration file for deploying a first software component at the client device;
    disabling a write-filter on the client device, wherein the write-filter is enablable to prohibit a file stored on the client device with the write-filter enabled from persisting across a reboot of the client device;
    deploying, on the client device while the write-filter is disabled, the first software component based on the first deployment configuration file;
    after deploying the first software component, updating on the client device, including:
    determining whether an autoupdate is available;
    obtaining, from the configuration repository, a second deployment configuration file for updating the first software component at the client device; and
    updating, on the client device while the write-filter is disabled, the first software component based on the second deployment configuration file.

2. The method of claim 1, wherein the first software component is selected from: an application and a device driver.

3. The method of claim 1, wherein the determining whether the autoupdate is available comprises:
    determining whether the configuration repository stores a deployment configuration file for updating the first software component.

4. The method of claim 1, further comprising:
    storing the first deployment configuration file in a location of a memory of the client device that is exempt from the write-filter.

5. The method of claim 1, further comprising:
    deleting from a memory of the client device the second deployment configuration file.

6. The method of claim 1, wherein the first deployment configuration file and the second deployment configuration file are extensible markup language (XML) files.

7. An article of manufacture comprising a non-transitory computer-readable medium storing instructions for deploying and updating software components on a client device having a write-filter, the instructions, when executed by a processor, for causing the processor to:
    obtain, from a configuration repository, a first deployment configuration file for deploying a first software component at the client device;
    disable a write-filter on the client device, wherein the write-filter is enablable to prohibit a file stored on the client device with the write-filter enabled from persisting across a reboot of the client device;
    deploy, on the client device while the write-filter is disabled, the first software component based on the first deployment configuration file;
    after the first software component is deployed, update the client device, including instructions to:
    determine whether an update is available at the configuration repository;
    obtain, from the configuration repository, a second deployment configuration file for updating the first software component at the client device; and
    update, on the client device while the write-filter is disabled, the first software component based on the second deployment configuration file.

8. The article of manufacture of claim 7, wherein the first software component is selected from: an application and a device driver.

9. The article of manufacture of claim 7, wherein the instructions to determine whether the update is available comprise instructions to:
    determine whether the configuration repository stores a deployment configuration file for updating the first software component.

10. The article of manufacture of claim 7, further comprising instructions to:
    store the first deployment configuration file in a location of a memory of the client device that is exempt from the write-filter.

11. The article of manufacture of claim 7, further comprising instructions to:
    delete from a memory of the client device the second deployment configuration file.

12. The article of manufacture of claim 7, wherein the first deployment configuration file and the second deployment configuration file are extensible markup language (XML) files.

13. A client device comprising:
    a processor having access to a memory, wherein the memory stores instructions executable by the processor, the instructions, when executed by the processor, cause the processor to:
    obtain, from a configuration repository, a first deployment configuration file for deploying a first software component at the client device;
    disable a write-filter on the client device, wherein the write-filter is enablable to prohibit a file stored on the client device with the write-filter enabled from persisting across a reboot of the client device;
    deploy, on the client device while the write-filter is disabled, the first software component based on the first deployment configuration file;

after the first software component is deployed, update the client device, including instructions to:
determine whether an update is available at the configuration repository;
obtain, from the configuration repository, a second deployment configuration file for updating the first software component at the client device; and
update, on the client device while the write-filter is disabled, the first software component based on the second deployment configuration file.

14. The client device of claim 13, wherein the first software component is selected from: an application and a device driver.

15. The client device of claim 13, wherein the instructions to determine whether the update is available comprise instructions to:
determine whether the configuration repository stores a deployment configuration file for updating the first software component.

16. The client device of claim 13, further comprising instructions to:
store the first deployment configuration file in a location of a memory of the client device that is exempt from the write-filter.

17. The client device of claim 13, further comprising instructions to:
delete from a memory of the client device the second deployment configuration file.

18. The client device of claim 13, wherein the first deployment configuration file and the second deployment configuration file are extensible markup language (XML) files.

19. The client device of claim 13, wherein the first software component is executable on an embedded operating system executing on the processor.

20. The client device of claim 13, further comprising instructions to:
when the first software component is a device driver, verify installation of the first software component.

* * * * *